United States Patent
Odaira et al.

(10) Patent No.: US 10,697,764 B2
(45) Date of Patent: *Jun. 30, 2020

(54) SAMPLE SHAPE MEASURING APPARATUS FOR CALCULATING A SHAPE OF A SAMPLE DISPOSED BETWEEN AN ILLUMINATION OPTICAL SYSTEM AND AN OBSERVATION OPTICAL SYSTEM

(71) Applicant: OLYMPUS CORPORATION, Tokyo (JP)

(72) Inventors: Mayumi Odaira, Akiruno (JP); Yoshimasa Suzuki, Kawasaki (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,145

(22) Filed: May 13, 2019

(65) Prior Publication Data

US 2019/0265024 A1    Aug. 29, 2019

Related U.S. Application Data

(63) Continuation of application No. PCT/JP2016/084154, filed on Nov. 17, 2016.

(51) Int. Cl.
*G01B 11/24* (2006.01)
*G01B 9/02* (2006.01)
(Continued)

(52) U.S. Cl.
CPC .......... *G01B 11/24* (2013.01); *G01B 9/02042* (2013.01); *G01B 9/02043* (2013.01);
(Continued)

(58) Field of Classification Search
CPC ..... G01B 11/2441; G01B 11/26; G01B 11/24; G01B 11/254; G01B 11/2518;
(Continued)

(56) References Cited

U.S. PATENT DOCUMENTS 5,831,736 A * 11/1998 Lichtman ............... G01B 11/24
356/613
5,929,983 A * 7/1999 Lu ........................ G01B 11/26
250/559.29
(Continued)

FOREIGN PATENT DOCUMENTS

JP    2004-109348 A    4/2004
JP    2004-163129 A    6/2004
(Continued)

OTHER PUBLICATIONS

International Preliminary Report on Patentability dated May 31, 2019, together with the Written Opinion received in related International Application No. PCT/JP2016/084154.

(Continued)

*Primary Examiner* — Michael P LaPage
(74) *Attorney, Agent, or Firm* — Scully, Scott, Murphy & Presser, P.C.

(57) ABSTRACT

A sample shape measuring method includes a step of preparing illumination light passing through a predetermined illumination region, a step of applying the illumination light to a sample, and a predetermined processing step. The predetermined illumination region is set so as to include an optical axis at a pupil position of an illumination optical system. Light transmitted through the sample is incident on the observation optical system. The predetermined processing step includes a step of receiving light emerged from the observation optical system, a step of obtaining a quantity of light of the received light, a step of calculating a difference or a ratio between the quantity of light and a reference quantity of light, and a step of calculating an amount of tilt in a surface of the sample from the difference or the ratio.

21 Claims, 38 Drawing Sheets

(51) Int. Cl.
*G01B 9/04* (2006.01)
*G01B 11/25* (2006.01)
*G01B 11/26* (2006.01)

(52) U.S. Cl.
CPC .............. *G01B 9/04* (2013.01); *G01B 11/254* (2013.01); *G01B 11/2513* (2013.01); *G01B 11/2518* (2013.01); *G01B 11/26* (2013.01)

(58) Field of Classification Search
CPC .. G01B 11/2513; G01B 9/04; G01B 9/02043; G01B 9/02042; G01B 9/0203; G02B 21/0024; G02B 21/00
See application file for complete search history.

(56) References Cited

U.S. PATENT DOCUMENTS

| | | | |
|---|---|---|---|
| 7,277,566 | B2 | 10/2007 | Miyawaki et al. |
| 9,291,450 | B2 | 3/2016 | Takahashi |
| 2005/0195387 | A1* | 9/2005 | Zhang ................. G01B 11/002 356/138 |
| 2006/0250914 | A1* | 11/2006 | Stallinga .............. G11B 7/0945 369/53.19 |
| 2009/0231573 | A1* | 9/2009 | Urashima .............. G01B 11/26 356/139.1 |

FOREIGN PATENT DOCUMENTS

| | | |
|---|---|---|
| JP | 2005-208027 A | 8/2005 |
| JP | 2008-20498 A | 1/2008 |
| JP | 2009-8643 A | 1/2009 |
| JP | 2009-168582 A | 7/2009 |
| JP | 2014-109492 A | 6/2014 |

OTHER PUBLICATIONS

International Search Report and Written Opinion dated Feb. 7, 2017 received in PCT/JP2016/084154.

* cited by examiner

FIG.32

| BRIGHTNESS | INCLINATION ANGLE |
|---|---|

| | −50 | −49 | −48 | −47 | −46 | −45 | −44 | −43 | −42 | −41 | −40 |
|---|---|---|---|---|---|---|---|---|---|---|---|
| $n_{AVE}=1.34$ | 3.0374 | 3.0176 | 2.9985 | 2.9800 | 2.9621 | 2.9447 | 2.9278 | 2.9114 | 2.8955 | 2.8800 | 2.8649 |
| $n_{AVE}=1.35$ | 3.6280 | 3.5861 | 3.5457 | 3.5067 | 3.4690 | 3.4325 | 3.3972 | 3.3629 | 3.3296 | 3.2972 | 3.2657 |
| $n_{AVE}=1.36$ | 4.2488 | 4.1828 | 4.1193 | 4.0580 | 3.9988 | 3.9417 | 3.8864 | 3.8328 | 3.7808 | 3.7304 | 3.6814 |

. . .

| | −6 | −5 | −4 | −3 | −2 | −1 | 0 | 1 | 2 | 3 | 4 | 5 | 6 |
|---|---|---|---|---|---|---|---|---|---|---|---|---|---|
| $n_{AVE}=1.34$ | 2.4749 | 2.4650 | 2.4551 | 2.4452 | 2.4352 | 2.4253 | 2.4153 | 2.4053 | 2.3953 | 2.3852 | 2.3751 | 2.3649 | 2.3546 |
| $n_{AVE}=1.35$ | 2.4700 | 2.4502 | 2.4304 | 2.4106 | 2.3908 | 2.3710 | 2.3512 | 2.3313 | 2.3114 | 2.2915 | 2.2715 | 2.2514 | 2.2312 |
| $n_{AVE}=1.36$ | 2.4650 | 2.4353 | 2.4057 | 2.3761 | 2.3466 | 2.3171 | 2.2875 | 2.2580 | 2.2284 | 2.1988 | 2.1692 | 2.1394 | 2.1095 |

. . .

| | 38 | 39 | 40 | 41 | 42 | 43 | 44 | 45 | 46 | 47 | 48 | 49 | 50 |
|---|---|---|---|---|---|---|---|---|---|---|---|---|---|
| $n_{AVE}=1.34$ | 1.9372 | 1.9184 | 1.8991 | 1.8791 | 1.8583 | 1.8367 | 1.8143 | 1.7910 | 1.7667 | 1.7414 | 1.7148 | 1.6871 | 1.6580 |
| $n_{AVE}=1.35$ | 1.4315 | 1.3969 | 1.3613 | 1.3246 | 1.2866 | 1.2475 | 1.2070 | 1.1650 | 1.1216 | 1.0765 | 1.0297 | 0.9811 | 0.9305 |
| $n_{AVE}=1.36$ | 0.9711 | 0.9246 | 0.8770 | 0.8283 | 0.7785 | 0.7276 | 0.6755 | 0.6222 | 0.5679 | 0.5125 | 0.4560 | 0.3988 | 0.3409 |

SAMPLE SHAPE MEASURING APPARATUS FOR CALCULATING A SHAPE OF A SAMPLE DISPOSED BETWEEN AN ILLUMINATION OPTICAL SYSTEM AND AN OBSERVATION OPTICAL SYSTEM

CROSS-REFERENCE TO RELATED APPLICATION

The present application is a continuation application of International Application No. PCT/JP2016/084154 filed on Nov. 17, 2016, the entire contents of which are incorporated herein by reference.

BACKGROUND OF THE INVENTION

Field of the Invention

The present invention relates to a method and an apparatus for measuring a tilt and a shape at a surface of a sample.

Description of the Related Art

As examples of an apparatus for measuring a three-dimensional shape of a sample, an apparatus disclosed in Japanese Patent Application Laid-open No. 2014-109492 and an apparatus disclosed in Japanese Patent Application Laid-open No. 2008-20498 are available.

In the apparatus of Japanese Patent Application Laid-open No. 2014-109492, the three-dimensional shape of a sample is measured by a fringe projection method. In the apparatus of Japanese Patent Application Laid-open No. 2014-109492, image pickup means includes a projection unit, a light-receiving unit, an illumination light output unit, a stage, and a measurement control unit. The projection unit includes a pattern generating unit, and a pattern generated by the pattern generating unit is projected onto a sample. The pattern projected onto the sample is picked up by the light-receiving unit, whereby a fringe image is obtained. In the apparatus of Japanese Patent Application Laid-open No. 2014-109492, the three-dimensional shape of a sample is measured using the fringe image.

In the apparatus of Japanese Patent Application Laid-open No. 2008-20498, a phenomenon in which an image contrast is higher in front or at back of the focus position than at the focus position is utilized. This phenomenon is caused by interference between non-diffracted light and diffracted light. In the apparatus of Japanese Patent Application Laid-open No. 2008-20498, a differential image is obtained from images in front or at back of the focus position. Then, the contrast value of the differential image is calculated, and the position where the contrast value is largest is set as the focus position. In the apparatus of Japanese Patent Application Laid-open No. 2008-20498, by detecting the focus position for each position of the sample surface, it is possible to measure the three-dimensional shape of a sample.

SUMMARY OF THE INVENTION

A sample shape measuring method according to the present invention comprises:
a step of preparing illumination light passing through a predetermined illumination region;
a step of applying the illumination light to a sample; and
a predetermined processing step, wherein
the predetermined illumination region is set so as to include an optical axis at a pupil position of an illumination optical system,
the illumination light is transmitted through the sample,
light transmitted through the sample is incident on an observation optical system,
light incident on the observation optical system passes through a transmission part that is set at a pupil position of the observation optical system or a transmission part that is set at a position of a conjugate image of a pupil of the observation optical system,
the transmission part is set such that a part of light that reached the pupil of the observation optical system or a part of light that reached the conjugate image is transmitted through, and
the predetermined processing step includes:
a step of receiving light emerged from the observation optical system;
a step of obtaining a quantity of light of the received light;
a step of calculating at least one of a difference and a ratio between the quantity of light and a reference quantity of light;
a step of calculating an amount of tilt in a surface of the sample from at least one of the difference and the ratio; and
a step of calculating a shape of the sample from the amount of tilt.

Moreover, a sample shape measuring apparatus according to the present invention comprises:
an illumination optical system; an observation optical system; a detecting element; and a processing apparatus, wherein
the illumination optical system includes a light source and a condenser lens,
the observation optical system includes an objective lens, an aperture member, and an imaging lens,
a sample is disposed between the illumination optical system and the observation optical system,
illumination light applied to the sample by the illumination optical system is transmitted through the sample,
light transmitted through the sample is incident on the observation optical system,
the detecting element receives light emerged from the observation optical system, and
the processing apparatus
obtains a quantity of light based on the received light,
calculates at least one of a difference and a ratio between the quantity of light and a reference quantity of light,
calculates an amount of tilt in a surface of the sample based on at least one of the difference and the ratio, and
calculates a shape of the sample from the amount of tilt.

BRIEF DESCRIPTION OF THE DRAWINGS

FIG. 32 is an example of a lookup table;

DETAILED DESCRIPTION OF THE INVENTION

Embodiments and examples of a sample shape measuring method and a sample shape measuring apparatus will be described below in detail by referring to the accompanying diagrams. However, the present invention is not restricted to the embodiments and the examples described below.

Firstly, a measurement principle in a sample shape measuring method of the present embodiment will be described below. In the sample shape measuring method of the present embodiment, a part of light from a sample is shielded. For this, a light-shielding part which shields a part of imaging light is disposed at a pupil position of an observation optical system or at a position conjugate with a pupil position of the observation optical system.

Figure 1:
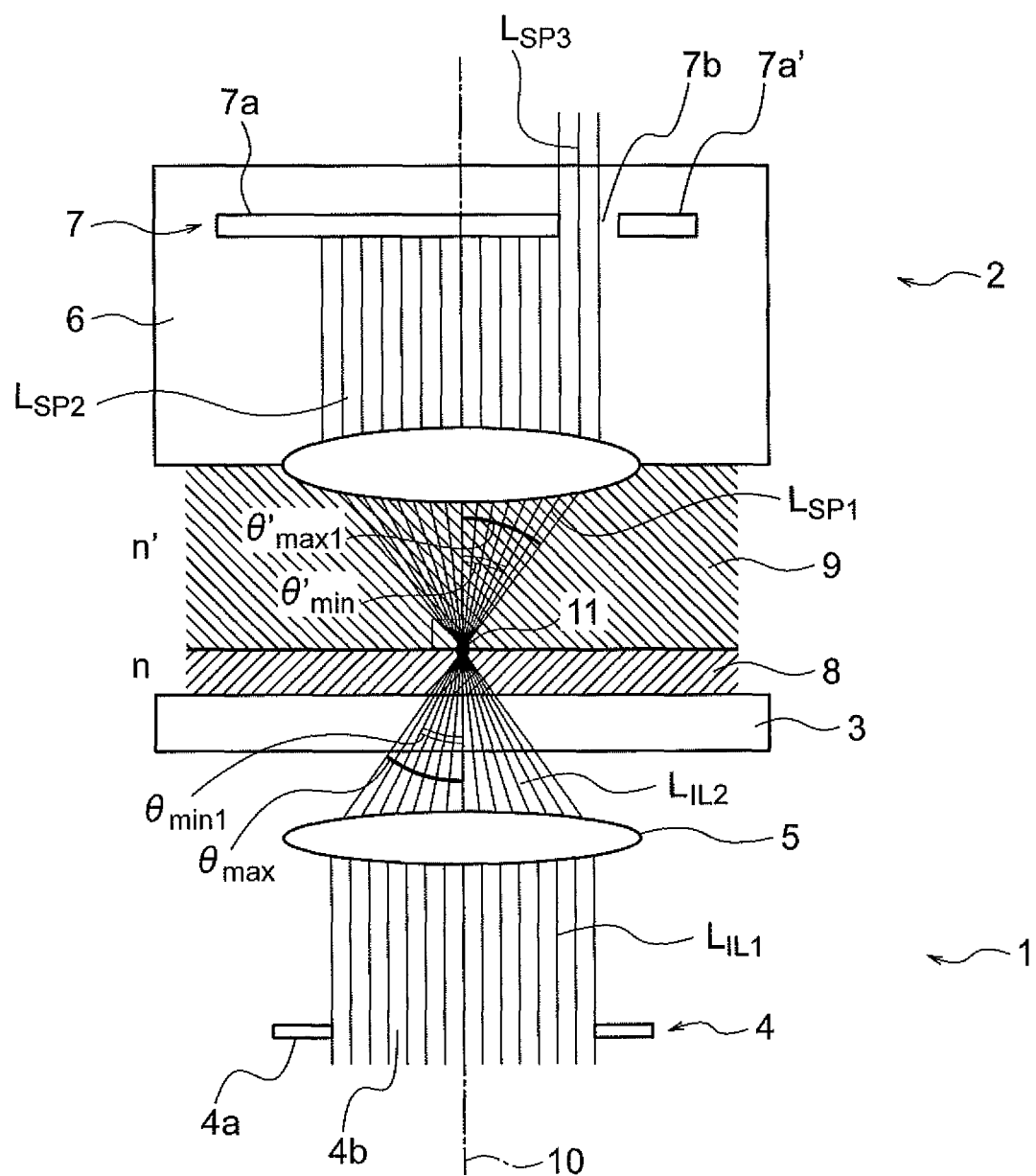
FIG. 1 is a diagram showing a state of illumination light and a state of imaging light in a first state.

First, the relation between illumination light and imaging light in a first state will be described. The state of illumination light and the state of imaging light in the first state are shown in FIG. 1. In the first state, the surface of a sample is flat, and the normal to the surface of the sample (hereinafter referred to as "normal to the surface") is parallel to the optical axis.

As shown in FIG. 1, an illumination optical system 1 and an observation optical system 2 are disposed to be opposed to each other with a stage 3 interposed therebetween. The illumination optical system 1 includes a stop 4 and a condenser lens 5. The observation optical system 2 includes an objective lens 6. The objective lens 6 has an aperture member 7. The stage 3 holds a sample 8.

The stop 4 has a light-shielding part 4a and a transmission part 4b. For the stop 4, for example, a circular metal plate or transparent plate is used. When a metal plate is used for the stop 4, the light-shielding part 4a is formed by a metal plate. Since no metal plate exists in the transmission part 4b, it is only a space. When a transparent plate is used for the stop 4, the light-shielding part 4a is formed by application of light-shielding paint or affixing of a light-shielding member. The transparent plate alone exists in the transmission part 4b.

An outer shape of the stop 4 and a shape of the transmission part 4b may not be circular. The outer shape of the stop 4 and the shape of the transmission part 4b may be rectangular, oval, or polygonal. Moreover, a position of the stop 4 coincides with a pupil position of the condenser lens 5.

Illumination light $L_{IL1}$ is incident on the stop 4. The illumination light $L_{IL1}$ is a parallel light flux, and is formed such that an optical axis 10 is included in the light flux. Accordingly, illumination is carried out in the same manner as in bright field illumination. In a case in which it is possible to make a size of the illumination light $L_{IL1}$ to be the same as a size of the transmission part 4b, the stop 4 may not be disposed in an optical path of the illumination optical system 1.

The illumination light $L_{IL1}$ travels through an optical path of the illumination optical system 1 toward the sample 8. The condenser lens 5 is disposed in the optical path of the illumination optical system 1. The illumination light $L_{IL1}$ passing through the transmission part 4b is incident on the condenser lens 5. The illumination light $L_{IL1}$ is focused at the condenser lens 5. The illumination light $L_{IL1}$ which is focused, reaches the stage 3.

A sample 8 is placed on the stage 3. A liquid immersion medium 9 (hereinafter referred to as "immersion liquid 9") fills in between the sample 8 and the objective lens 6. Here, the sample 8 is a liquid having a refractive index of n, and the immersion liquid 9 is a liquid having a refractive index of n'. Furthermore, n>n' holds.

Illumination light $L_{IL2}$ is incident on an observation point 11 on the sample 8. Accordingly, the observation point 11 is illuminated. The illumination light $L_{IL2}$ is transmitted through the sample 8. Light transmitted through the sample 8 (hereinafter referred to as 'imaging light') reaches the objective lens 6. Imaging light $L_{SP1}$ is incident on the objective lens 6. The objective lens 6 is provided with the aperture member 7. Imaging light $L_{SP1}$ reaches the aperture member 7.

For the aperture member 7, for example, a circular metal plate is used. The aperture member 7 is composed of a light-shielding part 7a and a transmission part 7b. The light-shielding part 7a is formed of a metal plate. Nothing exists in the transmission part 7b. In FIG. 1, for indicating the transmission part 7b, a light-shielding part 7a' is illustrated even on a right side of the transmission part 7b. However, the light-shielding part 7a' is no required necessarily.

The aperture member 7 is disposed so as to include the optical axis 10. Therefore, the optical axis 10 is included in the light-shielding part 7a whereas the optical axis 10 is not included in the transmission part 7b. The transmission part 7b is formed at a position away from the optical axis 10.

Since the aperture member 7 is disposed in the optical path, imaging light $L_{SP1}$ is divided into imaging light $L_{SP2}$ shielded by the light-shielding part 7a and imaging light $L_{SP3}$ transmitted through the transmission part 7b.

For the aperture member 7, a transparent plate may be used. In this case, the light-shielding part 7a is formed, for example, by applying light shielding paint or adhesion of a light shielding member. On the other hand, application of light shielding paint or affixing of a light-shielding member part is not performed in the transmission part 7b. Therefore, the transparent plate alone exists in the transmission part 7b.

An outer shape of the aperture member 7 may not be a circular. The outer shape of the aperture member 7 may be a rectangular, oval, or a polygonal. Moreover, a position of the aperture member 7 coincides with a pupil position of the objective lens 6.

The pupil position of the condenser lens 5 and the pupil position of the objective lens 6 are conjugate. Accordingly, a position of the stop 4 and a position of the aperture member 7 are also conjugate.

Figure 2A:
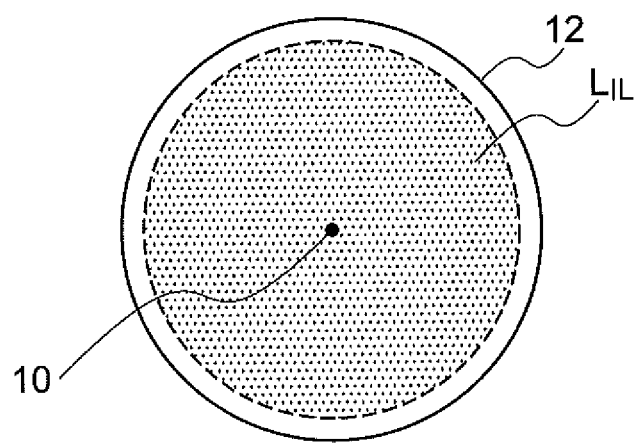
FIG. 2A is a diagram showing a state of the illumination light in the first state.

The state of illumination light in a first state is shown in FIG. 2A. As mentioned above, the position of the stop 4 and the position of the aperture member 7 are conjugate. Therefore, an image of the transmission part 4b is formed at the position of the aperture member 7.

In FIG. 2A, an outer edge of the image of the transmission part 4b is shown by a circle of a dashed line. In the stop 4, the illumination light $L_{IL1}$ passes through the transmission part 4b. Therefore, the circle of a dashed line shown in FIG. 2A can be said to indicate an outer edge of the illumination light $L_{IL1}$ at the position of the aperture member 7. A circle of a solid line is an edge 12 of a pupil of the objective lens 6.

As shown in FIG. 2A, the circle indicated by the dashed line is smaller than the circle indicated by the solid line. This signifies that a position and a light flux diameter of the illumination light $L_{IL1}$ are set such that the illumination light $L_{IL1}$ passes through an inner side of the pupil of the objective lens 6 and a range narrower than the pupil of the objective lens 6.

The position and the light flux diameter of the illumination light $L_{IL1}$ is determined by a size and a position of the transmission part 4b. A size of the transmission part 4b is set to be such that an area of the illumination light $L_{IL1}$ becomes smaller than an area of the pupil at the pupil position of the objective lens 6.

In this way, the position of the transmission part 4b is set such that the illumination light $L_{IL1}$ is positioned at an inner side of the pupil at the pupil position of the objective lens 6. Accordingly, when the transmission part 4b is projected on the pupil position of the objective lens 6, the image of the transmission part 4b is formed only on the inner side of the pupil of the objective lens 6, and is not formed on the outer side of the pupil of the objective lens 6.

Imaging light $L_{SP1}$ transmitted through the sample 8 reaches the objective lens 6. As mentioned above, the position and the light flux diameter of the illumination light $L_{IL1}$ are set such that the illumination light $L_{IL1}$ passes through the inner side of the pupil of the objective lens 6 and the range narrower than the pupil of the objective lens 6. Accordingly, the whole of imaging light $L_{SP1}$ that reaches the objective lens 6 is incident on the objective lens 6.

Of imaging light $L_{SP1}$ incident on the objective lens 6, imaging light $L_{SP2}$ reaches the light-shielding part 7a. Accordingly, imaging light $L_{SP2}$ is shielded at the light-shielding part 7a. Of imaging light $L_{SP1}$, imaging light $L_{SP3}$ passes through the transmission part 7b. Imaging light $L_{SP3}$ emerges from the aperture member 7.

Figure 2B:
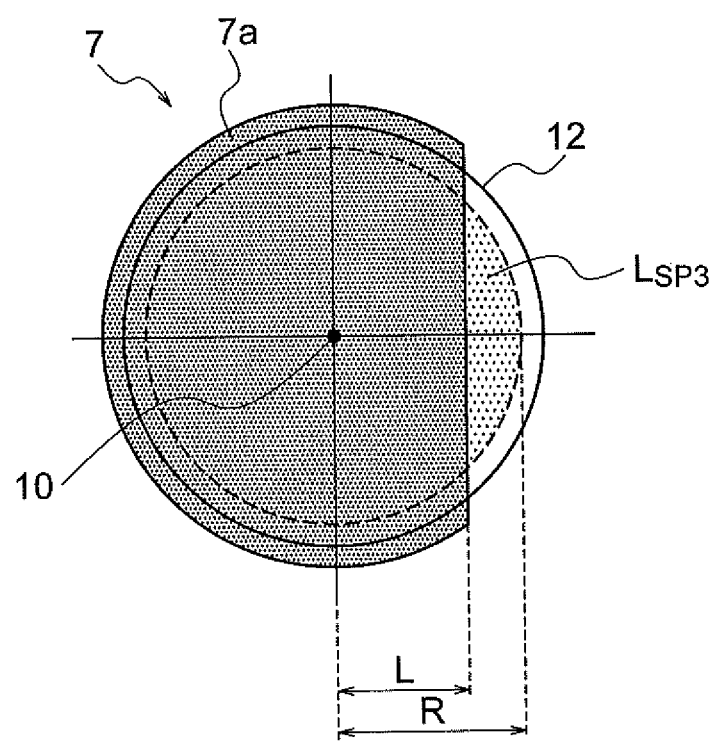
FIG. 2B is a diagram showing a state of the imaging light in the first state.

The state of imaging light in the first state is shown in FIG. 2B. As shown in FIG. 2B, a shape of a region indicating imaging light $L_{SP3}$ is bow-shaped. In FIG. 2B, the light-shielding part 7a' is omitted.

In FIG. 2B, R denotes a radius of the image of the transmission part 4b. It is possible to replace the radius of the image of the transmission part 4b by a radius of the illumination light $L_{IL1}$ at a position of the aperture member 7. Moreover, L denotes the shortest distance of distance from the optical axis 10 up to an outer edge of the light-shielding part 7a.

In the first state, Equation (1) below holds for two outermost light rays. An outermost light rayon an observation side is a light ray positioned at the outermost side, of light rays incident on the observation optical system. An outermost light ray on an illumination side is a light ray positioned at the outermost side, of light rays emerged from the illumination optical system.

$$\theta'_{max1} = \sin^{-1}\left(\frac{n}{n'}\sin\theta_{max}\right) \quad (1)$$

where, $\theta'_{max1}$ is an angle formed between an outermost light ray on the observation side in the first state and the optical axis, $\theta_{max}$ is an angle formed between the outermost light ray on the illumination side and the optical axis, n is a refractive index of the sample, and n' is a refractive index of the immersion liquid.

Here, an area S of the imaging light that emerges from the objective lens is represented by Equation (2) below.

$$S = R^2\cos^{-1}\left(\frac{L}{R}\right) - L^2\tan\left(\cos^{-1}\left(\frac{L}{R}\right)\right) \quad (2)$$

Moreover, R and L are represented by Equations (3) and (4) below, respectively.

$$R = f\tan\theta'_{max1} \quad (3)$$

$$L = f\tan\theta'_{min} \quad (4)$$

where, f is a focal length of the objective lens.

Figure 3:
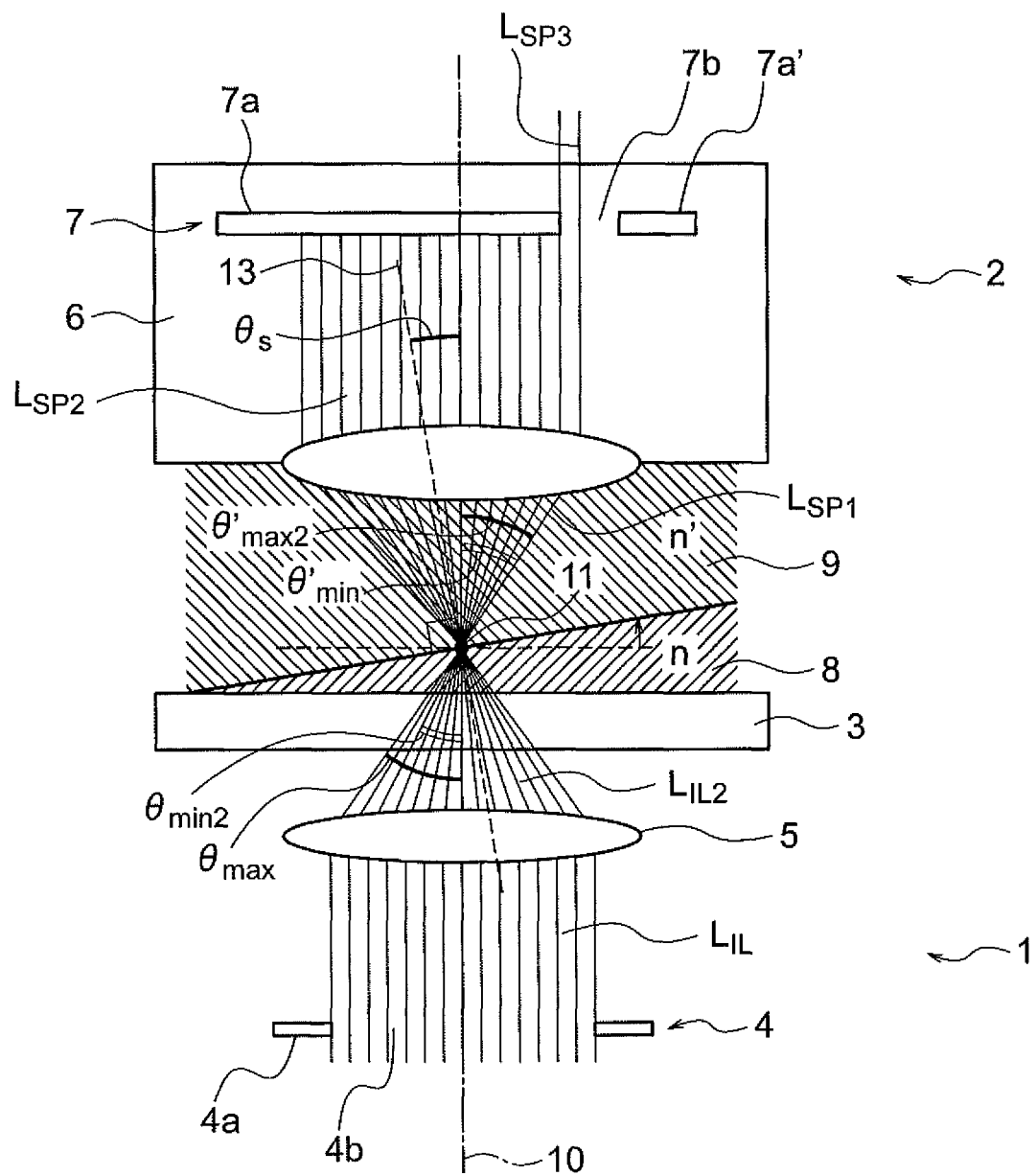
FIG. 3 is a diagram showing a state of illumination light and a state of imaging light in a second state.

Next, the relation between illumination light and imaging light in the second state will be described. The state of illumination light and the state of imaging light in the second state are shown in FIG. 3. In the second state, the surface of the sample is flat whereas the normal to the surface is non-parallel to the optical axis.

In a state in which the normal to the surface is non-parallel to the optical axis, the surface of the sample is inclined. As shown in FIG. 3, since the angle formed between the normal to the surface 12 and the optical axis 10 is $\theta_s$, it follows that the surface of the sample 8 is inclined by an inclination angle $\theta_s$. It is assumed that the angle is positive when the normal to the surface 12 is positioned in a counter-clockwise direction with respect to the optical axis 10, and the angle is negative when the normal to the surface 12 is positioned in a clockwise direction. In the second state, $\theta_s$ is a positive value.

Imaging light $L_{SP1}$ transmitted through the sample 8 reaches the objective lens 6. As mentioned above, the position and the light flux diameter of the illumination light $L_{IL1}$ are set such that the illumination light $L_{IL1}$ passes through the inner side of the pupil of the objective lens 6 and the range narrower than the pupil of the objective lens 6. Accordingly, the whole of imaging light $L_{SP1}$ that reaches the objective lens 6 is incident on the objective lens 6.

Of imaging light $L_{SP1}$ incident on the objective lens 6, imaging light $L_{SP2}$ reaches the light-shielding part 7a. Accordingly, imaging light $L_{SP2}$ is shielded at the light-shielding part 7a. Of imaging light $L_{SP1}$, imaging light $L_{SP3}$ passes through the transmission part 7b. Imaging light $L_{SP3}$ is emerged from the aperture member 7.

Here, in the second state, the surface of the sample 8 is inclined by an inclination angle $+\theta_s$. In this case, the angle of refraction at the surface of the sample 8 becomes large. Thus, the position of imaging light $L_{SP1}$ incident on the objective lens 6 is shifted in a further leftward direction within a paper surface compared with the first state.

Therefore, a part of imaging light $L_{SP3}$ that reaches the transmission part 7b in the first state reaches the light-shielding part 7a, in the second state. As a result, a size of a light flux of imaging light $L_{SP3}$ in the second state becomes smaller compared with the first state.

Figure 4A:
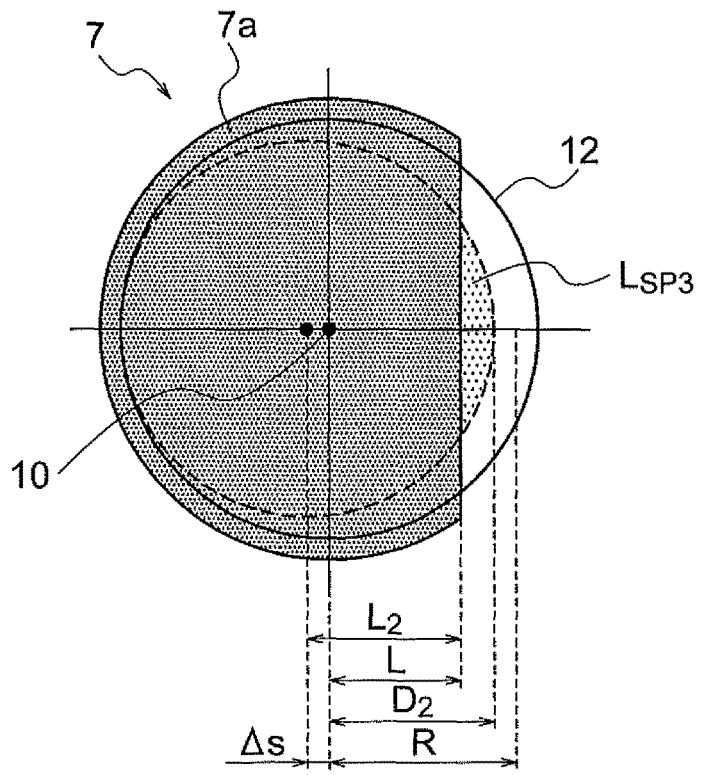
FIG. 4A is a diagram showing a state of the illumination light in the second state.
Figure 4B:
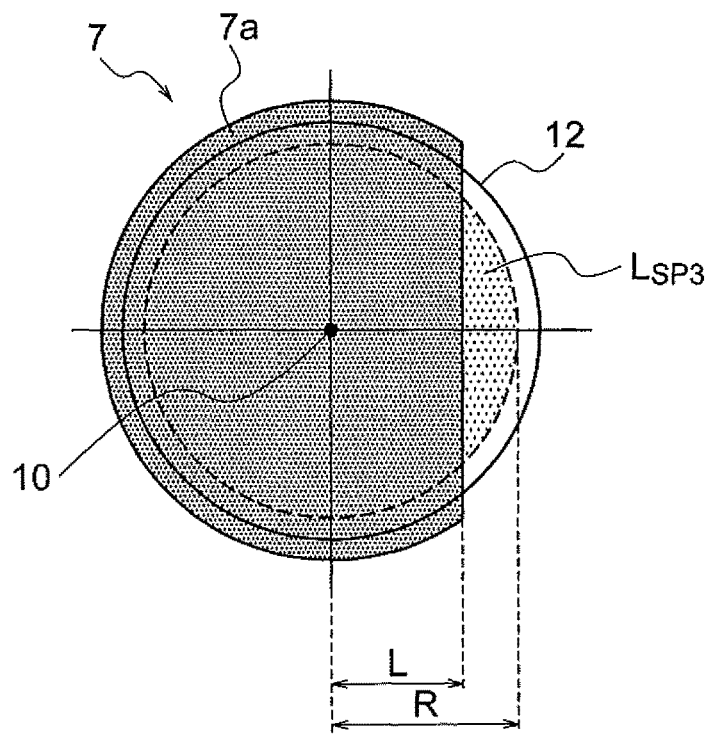
FIG. 4B is a diagram showing a state of the imaging light in the second state.

The state of the imaging light in the second state is shown in FIG. 4A. Moreover, for comparison, the state of the imaging light in the first state is shown in FIG. 4B. As shown in FIG. 4A, a shape of a region indicating imaging light $L_{SP3}$ is an bow-shaped.

As can be understood from the comparison between FIG. 4A and FIG. 4B, a center of imaging light $L_{SP1}$ in the second state is shifted by $\Delta S$ in a leftward direction within the paper surface than a center of imaging light $L_{SP1}$ in the first state. Consequently, a size of the light flux of imaging light $L_{SP3}$ in the second state becomes smaller compared with the first state. Accordingly, in the second state, a quantity of light passing through the transmission part 7b decreases from the first state.

In the second state, Equation (5) below holds for two outermost light rays.

$$\theta'_{max2} = \sin^{-1}\left(\frac{n}{n'}\sin(\theta_{max} + \theta_s)\right) - \theta_s \quad (5)$$

where, $\theta'_{max2}$ is an angle formed between an outermost light ray on an observation side in the second state and the optical axis, $\theta_s$ is an angle formed between the normal to the surface of the sample and the optical axis, $\theta_{max}$ is the angle formed between the outermost light ray on the illumination side and the optical axis, n is the refractive index of the sample, and n' is the refractive index of the immersion liquid, and the angle is positive when the normal to the surface of the sample is positioned in a counter-clockwise direction with respect to the optical axis, and the angle is negative when the normal to the surface of the sample is positioned in a clockwise direction with respect to the optical axis.

For example, when the sample is inclined in the direction shown in FIG. 3, the rotation direction of the normal to the surface is a positive direction and $\theta_s$ has a positive value.

Here, the area S of the imaging light transmitted through the objective lens is represented by Equation (6) below.

$$S = R^2\cos^{-1}\left(\frac{L_2}{R}\right) - L_2^2\tan\left(\cos^{-1}\left(\frac{L_2}{R}\right)\right) \quad (6)$$

Moreover, $D_2$, $L_2$, and $\Delta s$ are represented by Equations (7), (8), and (9) below, respectively.

$$D_2 = f\tan\theta'_{max2} \quad (7)$$

$$L_2 = L + \Delta s \quad (8)$$

$$\Delta s = R - D_2 \quad (9)$$

where, f is the focal length of the objective lens, and

ΔS is a difference in a center of the pupil of the objective lens and a center of an image of the pupil of the condenser lens.

Figure 5:
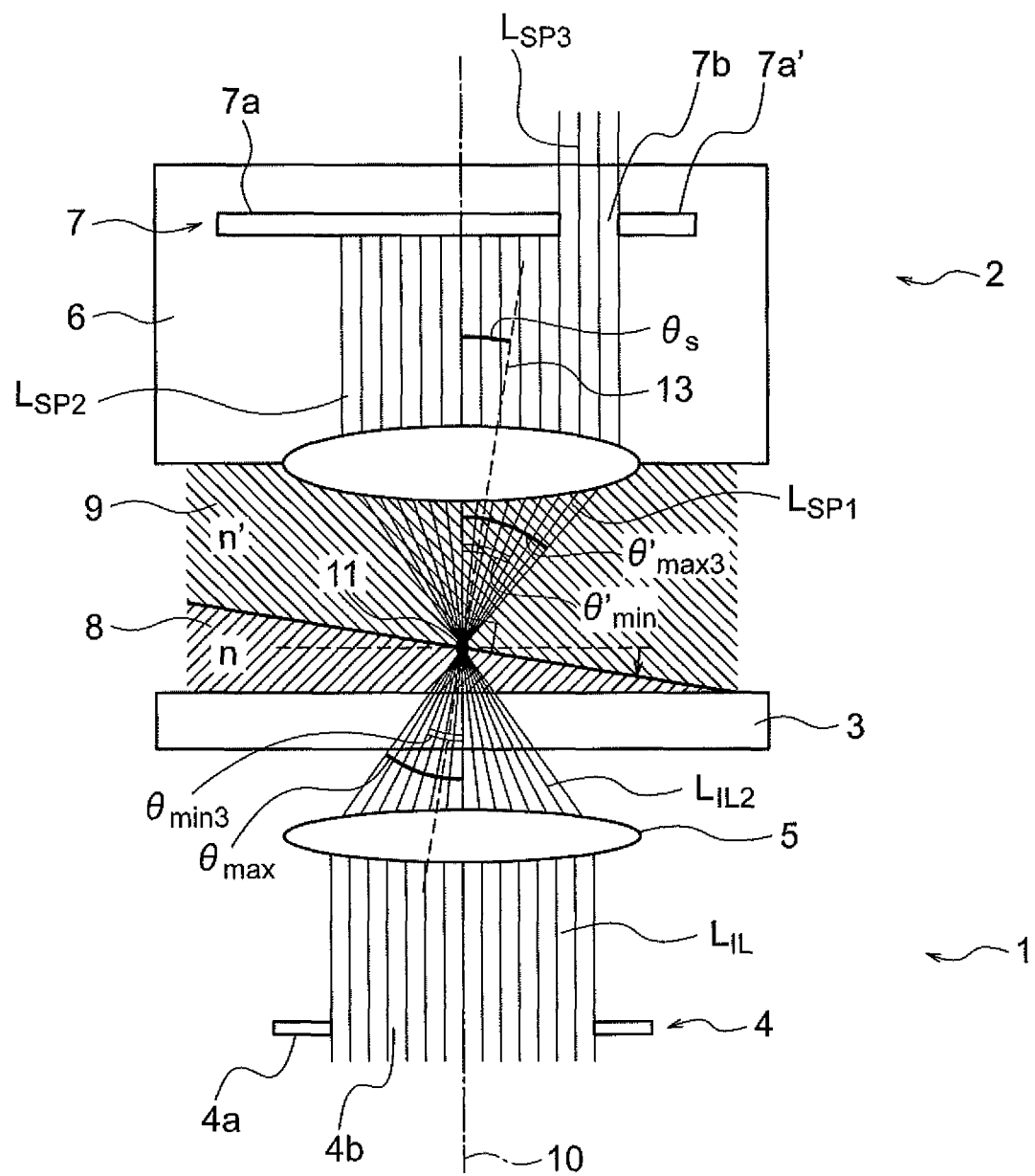
FIG. 5 is a diagram showing a state of illumination light and a state of imaging light in a third state.

Next, the relation between illumination light and imaging light in the third state will be described. The state of illumination light and the state of imaging light in the third state are shown in FIG. 5. In the third state, the surface of the sample is flat whereas the normal to the surface is non-parallel to the optical axis.

Also in the third state, the normal to the surface is non-parallel to the optical axis. As shown in FIG. 5, since the angle formed between the normal 12 and the optical axis 10 is $\theta_s$, it follows that the surface of the sample 8 is inclined by an inclination angle $\theta_s$. However, unlike the second state, $\theta_s$ is a negative value in the third state.

Imaging light $L_{SP1}$ transmitted through the sample 8 reaches the objective lens 6. As mentioned above, the position and the light flux diameter of the illumination light $L_{IL1}$ are set such that the illumination light $L_{IL1}$ passes through the inner side of the pupil of the objective lens 6 and the range narrower than the pupil of the objective lens 6. Accordingly, the whole of imaging light $L_{SP1}$ that reaches the objective lens 6 is incident on the objective lens 6.

Of imaging light $L_{SP1}$ incident on the objective lens 6, imaging light $L_{SP2}$ reaches the light-shielding part 7a. Accordingly, imaging light $L_{SP2}$ is shielded at the light-shielding part 7a. Of imaging light $L_{SP1}$, imaging light $L_{SP3}$ passes through the transmission part 7b. The imaging light $L_{SP3}$ emerges from the aperture member 7.

Here, in the third state, the surface of the sample 8 is inclined by an inclination angle $-\theta_s$. In this case, an angle of refraction at the surface of the sample 8 becomes small. Thus, the position of imaging light $L_{SP1}$ incident on the objective lens 6 is shifted in a further rightward direction within the paper surface compared with the first state.

Therefore, a part of imaging light $L_{SP2}$ that reaches the light-shielding part 7a in the first state reaches the transmission part 7b in the third state. As a result, a size of a light flux of imaging light $L_{SP3}$ in the third state becomes larger compared with the first state.

Figure 6A:
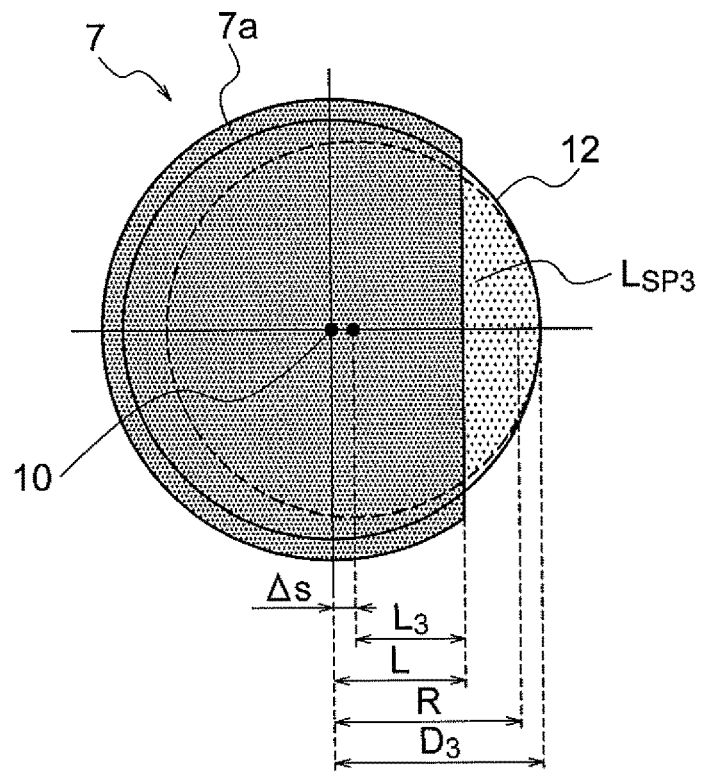
FIG. 6A is a diagram showing a state of the illumination light in the third state.
Figure 6B:
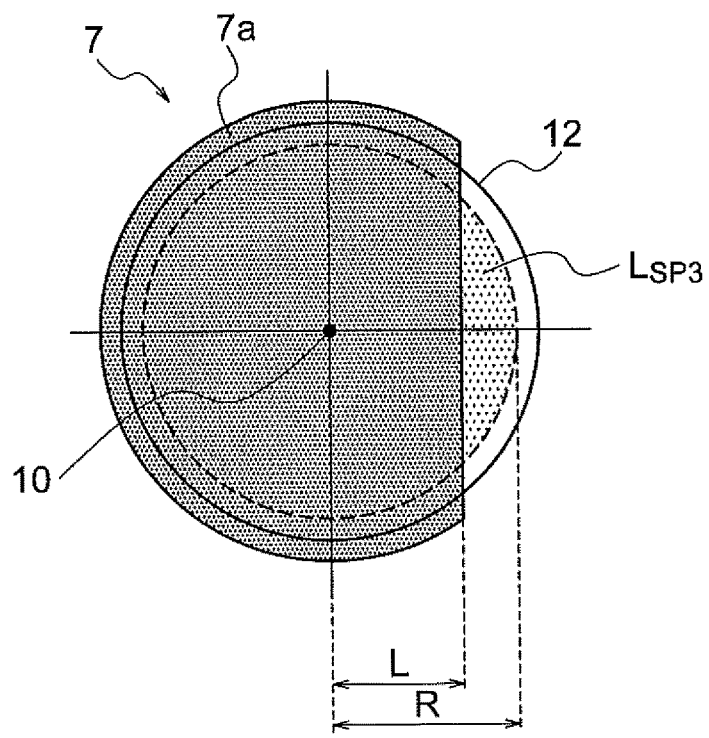
FIG. 6B is a diagram showing a state of the imaging light in the third state.

The state of the imaging light in the third state is shown in FIG. 6A. Moreover, for comparison, the state of the imaging light in the first state is shown in FIG. 6B. As shown in FIG. 6A, a shape of a region indicating imaging light $L_{SP3}$ is an bow-shaped.

As can be understood from comparison between FIG. 6A and FIG. 6B, a center of imaging light $L_{SP1}$ in the third state is shifted by ΔS in a rightward direction within the paper surface, than the center of imaging light $L_{SP1}$ in the first state. Consequently, a size of the light flux of imaging light $L_{SP3}$ in the third state becomes larger compared with the first state. Accordingly, in the third state, a quantity of light passing through the transmission part 7b increases from the first state.

In the third state, Equation (10) below holds for two outermost light rays.

$$\theta'_{max3} = \sin^{-1}\left(\frac{n}{n'}\sin(\theta_{max} - \theta_s)\right) + \theta_s \quad (10)$$

where, $\theta'_{max3}$ is an angle formed between an outermost light ray on the observation side in the third state and the optical axis, $\theta_s$ is the angle formed between the normal to the surface of the sample and the optical axis, $\theta_{max}$ is the angle formed between the outermost light ray on the illumination side and the optical axis, n is the refractive index of the sample, and n' is the refractive index of the immersion liquid, and the angle is positive when the normal to the surface of the sample is positioned in a counter-clockwise direction with respect to the optical axis, and the angle is negative when the normal to the surface of the sample is positioned in a clockwise direction with respect to the optical axis.

For example, when the sample is inclined in the direction shown in FIG. 5, the rotation direction of the normal to the surface is a negative direction and $\theta_s$ has a negative value.

Here, the area S of the imaging light transmitted through the objective lens is represented by Equation (11) below.

$$S = R^2 \cos^{-1}\left(\frac{L_3}{R}\right) - L_3^2 \tan\left(\cos^{-1}\left(\frac{L_3}{R}\right)\right) \quad (11)$$

Moreover, $D_3$, $L_3$, and ΔS are represented by Equations (12), (13), and (14) below, respectively.

$$D_3 = f \tan \theta'_{max3} \quad (12)$$

$$L_3 = L - \Delta s \quad (13)$$

$$\Delta s = D_3 - R \quad (14)$$

where, f is the focal length of the objective lens, and

ΔS is the difference in the center of the pupil of the objective lens and the center of the image of the pupil of the condenser lens.

Figure 7:
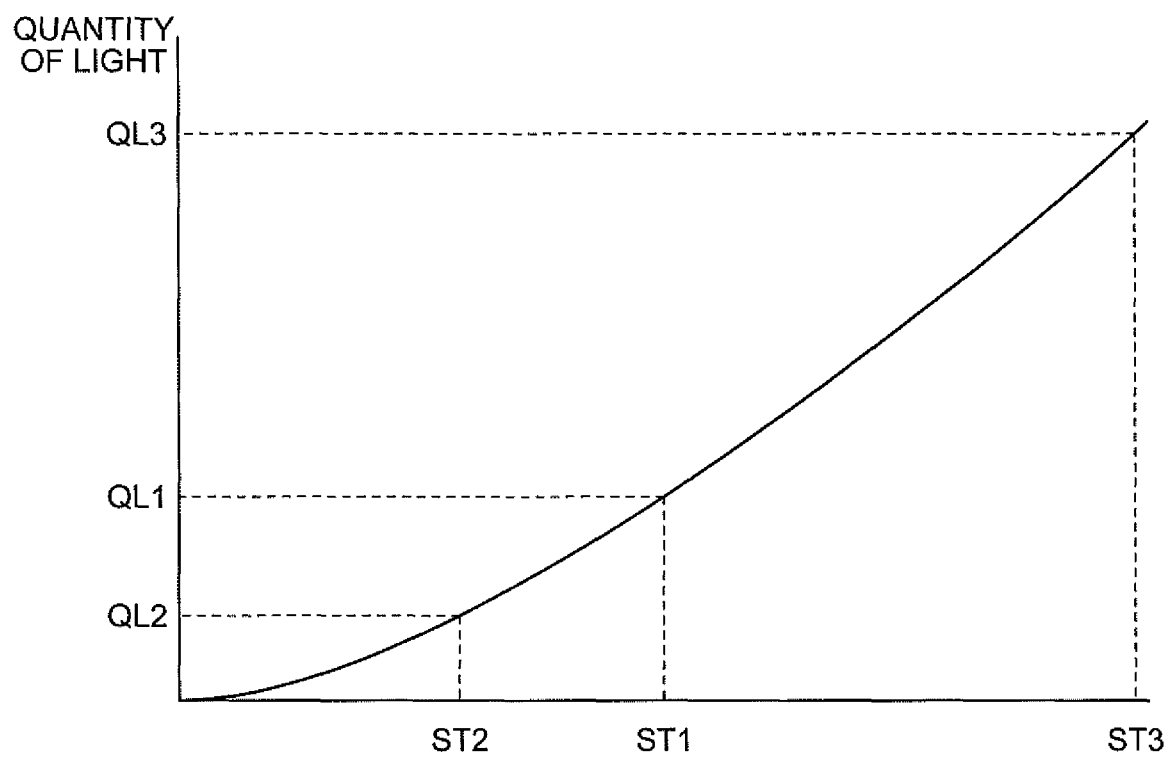
FIG. 7 is a graph showing a difference in a quantity of light in the three states.

The area S indicates a quantity of light of imaging light $L_{SP3}$ when passed through the transmission part 7b. A graph representing a difference of a quantity of light in the three states is shown in FIG. 7. As shown in FIG. 7, a quantity of light QL1 in a first state ST1, a quantity of light QL2 in a second state ST2, and a quantity of light QL3 in a third state ST3 differ. Moreover, the quantity of light increases for the state in an order of the second state ST2, the first state ST1, and the third state ST3.

In the abovementioned examples, the position and the light flux diameter of the illumination light are set such that the illumination light passes through an inner side of the pupil of the objective lens and the range narrower than the pupil of the objective lens. However, the position and the light flux diameter of the illumination light may be set such that the illumination light passes through the entire range of the pupil of the objective lens.

Moreover, the aperture member may be disposed at a position of a conjugate image of the pupil of the objective lens. The position of the aperture member is not required to coincide perfectly with the position of the conjugate image or the pupil position of the objective lens. The aperture member is to be positioned near the pupil of the objective lens or near the conjugate image.

In this way, in the principle of measurement in the sample shape measuring method of the present embodiment, illumination which is almost identical to the bright field illumination is carried out, and a part of the light that reached the pupil of the observation optical system or a part of the light that reached the conjugate image of the pupil of the observation optical system is merely transmitted. Thus, in derivation of the distribution of the amount of tilt in the surface of the sample, light transmitted through the sample, that is, light transmitted through the sample is merely utilized, and the contrast of an image or the interference between non-diffracted light and diffracted light is not utilized. Therefore, according to the sample shape measuring method of the present embodiment, even for a sample in which the reflectance of the surface is low and the surface shape is smooth, it is possible to measure the amount of tilt in the surface of the sample with high accuracy. Furthermore, it is possible to measure the surface shape of the sample with high accuracy by using the measured amount of tilt.

The sample shape measuring method of the present embodiment will be described below. In the following description, instead of the aperture member 7, a pupil 7 of an objective lens is used.

The sample shape measuring method of the present embodiment includes a step of preparing illumination light passing through a predetermined illumination region, a step of applying the illumination light to a sample, and a predetermined processing step. The predetermined illumination region is set so as to include an optical axis at a pupil position of an illumination optical system. The illumination light is transmitted through the sample. Light transmitted through the sample is incident on an observation optical system. Light incident on the observation optical system passes through a transmission part that is set at a pupil position of the observation optical system or a transmission part that is set at a position of a conjugate image of a pupil of the observation optical system. The transmission part is set such that a part of light that reached the pupil of the observation optical system or a part of light that reached the conjugate image is transmitted through. The predetermined processing step includes a step of receiving the light emerged from the observation optical system, a step of obtaining a quantity of light of the received light, a step of calculating at least one of a difference and a ratio between the quantity of light and a reference quantity of light, and a step of calculating an amount of tilt in at a surface of the sample from at least one of the difference and the ratio.

Figure 8:
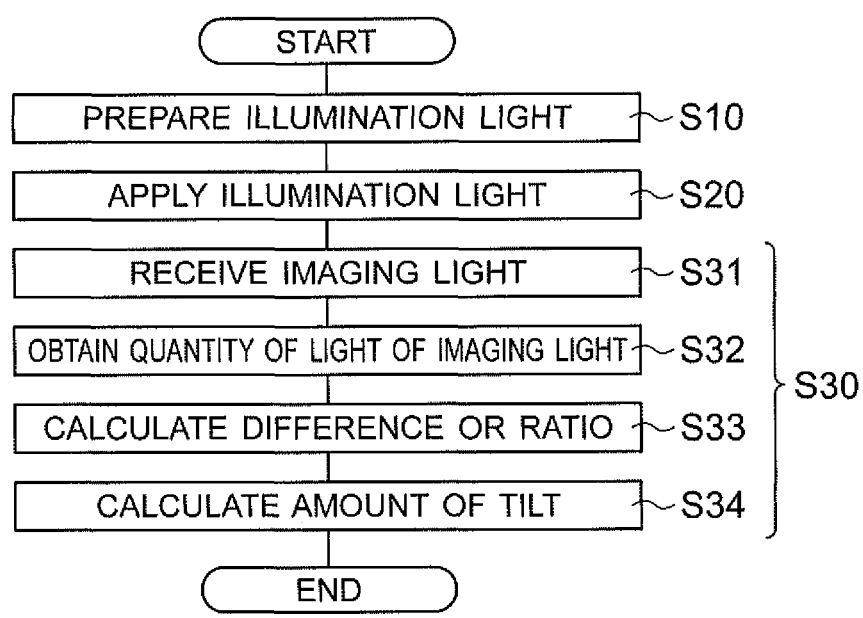
FIG. 8 is a flowchart of a measuring method of the present embodiment.

The sample shape measuring method of the present embodiment (hereinafter, referred to as 'measuring method of the present embodiment') will be described below. FIG. 8 is a flowchart of the measuring method of the present embodiment. The measuring method of the present embodiment includes step S10 of preparing illumination light, step S20 of applying the illumination light, and predetermined processing step S30. Predetermined processing step S30 includes step S31 of receiving imaging light, step S32 of obtaining the quantity of light of the imaging light, step S33 of calculating the difference or the ratio, and step S34 of calculating the amount of tilt.

In the measuring method of the present embodiment, first of all, step S10 is executed. Step S10 is a step of preparing the illumination light. In step S10, a predetermined illumination region is set in an illumination optical system. The predetermined illumination region is a region where illumination light passes through. The predetermined illumination region is a region which is determined by the transmission part 4b shown in FIG. 1. The predetermined illumination region is set by disposing the stop 4 in the optical path of the illumination optical system 1. Here, the stop 4 is disposed so as to include the optical axis 10. Accordingly, in the measuring method of the present embodiment, the bright field illumination is carried out.

Furthermore, the stop 4 is disposed at the pupil position of the illumination optical system 1, specifically, the pupil position of the condenser lens 5. The position of the pupil of the condenser lens 5 is conjugate to the pupil position of the observation optical system 2, specifically, the position of the pupil 7 of the objective lens. Therefore, an image of the predetermined illumination region is formed at the position of the pupil 7 of the objective lens. Here, the image of the predetermined illumination region is formed only at an inner side of the pupil 7 of the objective lens.

Moreover, the image of the predetermined illumination region is formed such that an area of an image of the predetermined illumination region becomes smaller than an area of the pupil 7 of the objective lens. However, the image of the predetermined illumination region may be formed such that the area of the image of the predetermined illumination region becomes same as the area of the pupil 7 of the objective lens.

The area of the image of the predetermined illumination region can be deemed as a light flux diameter of the illumination light at the position of the pupil 7 of the objective lens. In a case in which the light flux diameter is smaller than a pupil diameter of the objective lens, a light intensity varies according to a movement of the illumination light. At this time, the light intensity varies in both of the direction of movement of the illumination light in a direction approaching the optical axis and the direction of movement of the illumination light in a direction away from the optical axis.

Whereas, in a case in which the light flux diameter of the illumination light at the pupil position of the objective lens is same as a pupil diameter of the objective lens, the light intensity varies in a case of approaching the optical axis. However, the light intensity does not vary in the direction away from the optical axis. In this case, by rotating the predetermined illumination region 180 degrees around the optical axis, the light intensity varies even in the direction away from the optical axis.

In this way, the predetermined illumination region is set so as to include the optical axis at the pupil position of the illumination optical system and is set such that the area of the illumination light becomes smaller than the area of the pupil at the pupil position of the observation optical system. The predetermined illumination region may be set such that the illumination light passes through the entire range of the pupil of the observation optical system.

When step S10 is finished, step S20 is executed. Step S20 is a step of applying illumination light. In step S20, illumination light is applied to a sample. The illumination light applied to the sample is transmitted through the sample. The sample is illuminated whereby imaging light emerges from the sample. The light transmitted through the sample is incident on the observation optical system.

The light incident on the observation optical system passes through a transmission part that is set at the pupil position of the observation optical system. The transmission part is set such that a part of light that has reached the pupil of the observation optical system is transmitted through the transmission part. The transmission part may be set at a position conjugate with the pupil position of the observation optical system.

When step S20 is finished, step S30 is executed. Step S30 is a step of performing predetermined processing. In step S30, step S31, step S32, step S33, and step S34 are executed.

In step S30, first, step S31 is executed. Step S31 is a step of receiving imaging light. The imaging light is the light transmitted through the observation optical system.

When step S31 is finished, step S32 is executed. Step S32 is a step of obtaining the quantity of light of the imaging light. The quantity of light of the imaging light is the quantity of light received in step S31.

When step S32 is finished, step S33 is executed. Step S33 is a step of calculating the difference or the ratio. In step S33, the difference or the ratio between the quantity of light received in step S31, that is, the quantity of light of the imaging light and a reference quantity of light is calculated.

When step S33 is finished, step S34 is executed. Step S34 is a step of calculating the amount of tilt. In step S34, the amount of tilt in the surface of the sample is calculated from the result of calculation in step S33.

In step S33, at least one of the difference and the ratio between the quantity of light of the imaging light and the reference quantity of light is calculated.

In this way, in the measuring method of the present embodiment, the illumination which is almost identical to the bright field illumination is carried out, and a part of the light that reached the pupil position of the observation optical system or a part of the light that reached the conjugate image of the pupil of the observation optical system is merely transmitted. Thus, in derivation of the distribution of the amount of tilt in the surface of the sample, light transmitted through the sample, that is, light transmitted through the sample is merely utilized, and the contrast of an image or the interference between non-diffracted light and diffracted light is not utilized. Therefore, according to the measuring method of the present embodiment, even for a sample in which the reflectance of the surface is low and the surface shape is smooth, it is possible to measure the amount of tilt in the surface of the sample with high accuracy. Furthermore, as will be described later, by using the measured amount of tilt, it is possible to measure the surface shape of the sample with high accuracy.

The sample shape measuring apparatus of the present embodiment includes an illumination optical system, an observation optical system, a detecting element, and a processing apparatus. The illumination optical system includes a light source and a condenser lens. The observation optical system includes an objective lens, an aperture member, and an imaging lens. A sample is disposed between the illumination optical system and the observation optical system. Illumination light applied to the sample by the illumination optical system is transmitted through the sample. Light transmitted through the sample is incident on the observation optical system. The detecting element receives light emerged from the observation optical system. The processing apparatus obtains a quantity of light based on the received light, calculates at least one of a difference and a ratio between the quantity of light and a reference quantity of light, calculates an amount of tilt in a surface of the sample based on at least one of the difference and the ratio, and calculates a shape of the sample from the amount of tilt.

Figure 9:
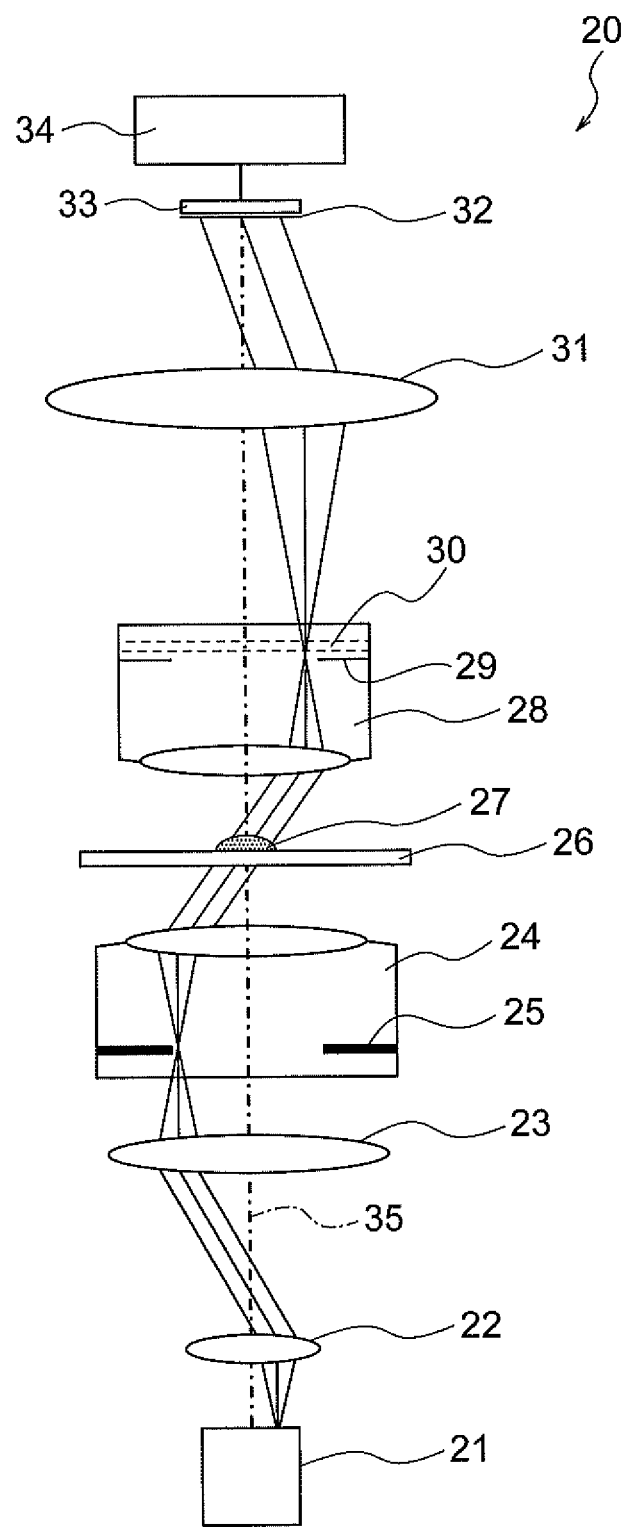
FIG. 9 is a diagram illustrating a structure of a sample shape measuring apparatus according to the present embodiment.

Referring to FIG. 9, the sample shape measuring apparatus of the present embodiment will be described below. FIG. 9 is a diagram illustrating a configuration of the sample shape measuring apparatus of the present embodiment.

A sample shape measuring apparatus 20 is an upright microscope, for example, which includes an illumination optical system and an observation optical system. The illumination optical system includes alight source 21, a condenser lens 24, and a stop 25. The illumination optical system includes a lens 22 and a lens 23 as needed. Meanwhile, the objective optical system includes an objective lens 28, an aperture member 30, and an imaging lens 31. The aperture member 30 is disposed at a position of a pupil 29 of the objective lens. The aperture member 30 corresponds to the aperture member 7 in FIG. 1.

Light emitted from the light source 21 passes through the lens 22 and the lens 23, and reaches the condenser lens 24. At the condenser lens 24, the stop 25 is provided. Herein, the condenser lens 24 and the stop 25 are integrally configured. However, the stop 25 and the condenser lens 24 may be configured as separate bodies. A metal plate is used in the stop 25.

Moreover, in place of the condenser lens 24, a condenser unit having a reflecting surface may be used. The condenser unit may include, for example, a conical mirror and a concave mirror. The conical mirror is disposed on the optical axis. The concave mirror has an annular reflecting surface and is disposed to surround the conical mirror.

The stop 25 and the light source 21 are conjugate. Therefore, the illumination light emitted from the light source 21 is collected at the position of the stop 25. That is, an image of the light source 21 is formed at the position of the stop 25.

Illumination light emerged from the opening of the stop 25 is incident on the condenser lens 24. Here, the position of the stop 25 coincides with a focal position of the condenser lens 24 (or the pupil position of the condenser lens 24). Therefore, illumination light emerged from the condenser lens 24 becomes parallel light.

The stop 25 has a transmission part. As shown in FIG. 9, the transmission part includes an optical axis 35. Accordingly, in the sample shape measuring apparatus 20, illumination almost identical to the bright field illumination is carried out.

Illumination light emerged from the condenser lens 24 reaches a sample 27. The sample 27 is placed on a holding member 26. The sample 27 is a cell, for example, which is colorless and transparent. The holding member 26 has a holding part. In a slide glass, a surface of the slide glass corresponds to the holding part. In a petri dish, a concave portion of the petri dish corresponds to the holding part. In a micro-well plate, a concave portion of each well corresponds to the holding part.

The light passing through the sample 27, i.e., imaging light enters a microscope objective lens 28 (hereinafter, referred to as an "objective lens"). The objective lens 28 is a microscope objective lens for bright-field observation, for example. Therefore, only a lens is present in the optical path of the objective lens 28, and no optical member to change the intensity or the phase of light, such as a phase plate or a modulation plate, is not present in the optical path.

As shown in FIG. 9, parallel light passing through the sample 27 is collected at a pupil 29 of the objective lens. As just described, the pupil 29 of the objective lens is conjugate to the stop 25. Therefore, an image of the stop 25 is formed at the position of the pupil 29 of the objective lens.

As mentioned above, the stop 25 has the transmission part. The illumination light passes through the transmission part. Accordingly, the image of the stop 25 formed at the position of the pupil 29 of the objective lens becomes an image of the illumination light. As shown in FIG. 9, illumination light that has passed near an edge of the transmission part passes an inner side of the pupil 29 of the objective lens and through a range narrower than the pupil 29 of the objective lens.

As just described, the position of the transmission part is set such that the illumination light is positioned at the inner side of the pupil at the position of the pupil 29 of the objective lens. Therefore, when the transmission part is projected on the position of the pupil 29 of the objective lens, an image of the transmission part is formed only on the inner side of the pupil 29 of the objective lens, and is not formed on an outer side of the pupil 29 of the objective lens.

The aperture member 30 is disposed at the position of the pupil 29 of the objective lens. In FIG. 9, for indicating clearly the position of the pupil 29 of the objective lens, the pupil 29 of the objective lens and the aperture member 30 are drawn separately.

In the aperture member 30, a light-shielding part and a transmission part are provided. The transmission part is set such that a part of light that reached the pupil of the observation optical system is transmitted through. In FIG. 9, the pupil position of the observation optical system is the position of the pupil 29 of the objective lens. The specific structure of the aperture member 30 will be described later.

The imaging light emerged from the objective lens 28 enters the imaging lens 31. Then, an optical image of the sample 27 is formed at an image position 32 by the imaging light emerged from the imaging lens 31.

A detecting element 33 is disposed at the image position 32. The detecting element 33 is a photoelectric conversion element. Examples of the detecting element 33 include photodiode, CCD, and COMS.

The light intensity of an optical image is converted by the detecting element 33 into an electric signal. The converted electric signal is transmitted as image data of the sample 27 to the processing apparatus 34. The image data represents the quantity of light of the optical image.

In the processing apparatus 34, processing is executed in accordance with the flowchart shown in FIG. 8. That is, in the processing apparatus 34, the quantity of light of the imaging light is obtained (step S32), the difference or the ratio between the quantity of light and the reference quantity of light is calculated (step S33), and the amount of tilt in the surface of the sample is calculated from the calculation result (step S34).

Figure 10:
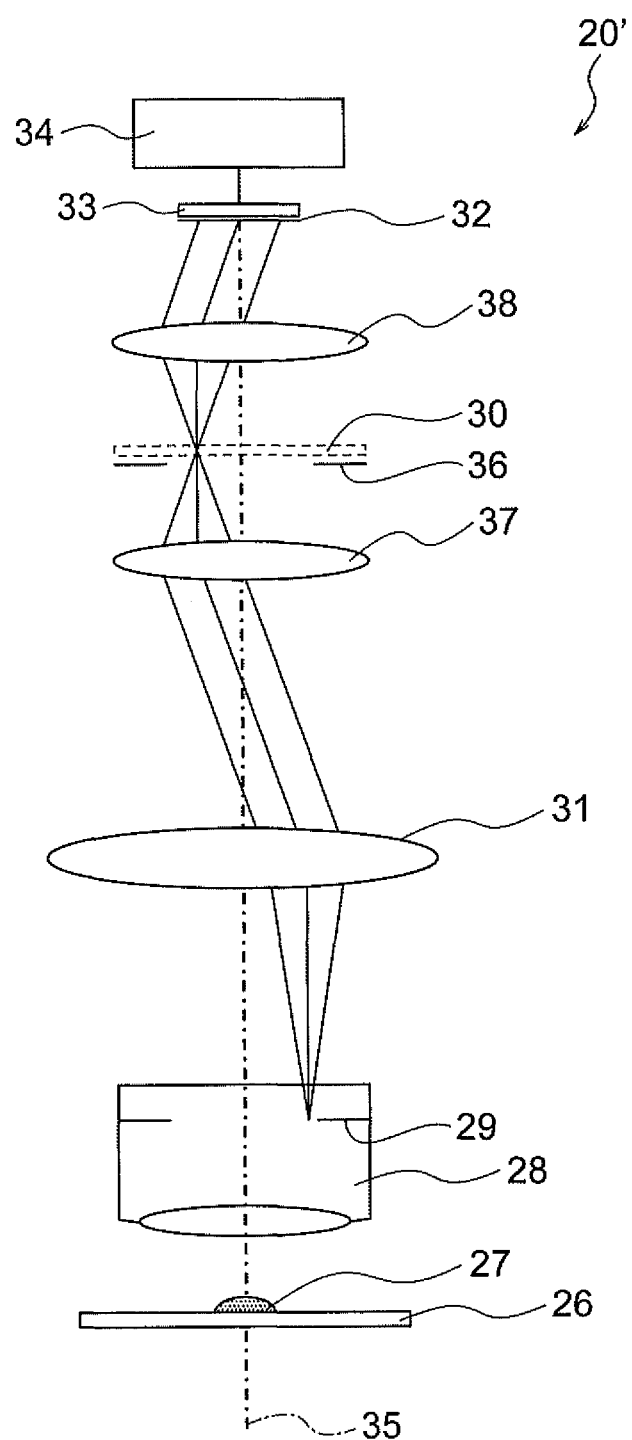
FIG. 10 is a diagram illustrating another sample shape measuring apparatus.

FIG. 10 is a diagram illustrating another sample shape measuring apparatus. In FIG. 10, the illumination optical system is omitted. In a sample shape measuring apparatus 20', the aperture member 30 is disposed at a position of a conjugate image 36 of the pupil 29 of the objective lens (hereinafter, referred to as 'conjugate image 36'). In FIG. 10, for indicating clearly a position of the conjugate image 36, the position of the conjugate image 36 and the aperture member 30 are drawn separately.

In a case in which the pupil 29 of the objective lens is positioned at an interior of the objective lens 28, the aperture member 30 has to be disposed at the interior of the objective lens 28. At this time, it is preferable that the aperture member 30 can be disposed at the interior of the objective lens 28 without any difficulty. However, according to the position of the pupil 29 of the objective lens, sometimes it is not possible to dispose the aperture member 30 at the interior of the objective lens 28.

In the sample shape measuring apparatus 20', a lens 37 is disposed between the imaging lens 31 and the image position 32. Accordingly, the conjugate image 36 is formed at an exterior of the objective lens 28. Therefore, it is not indispensable to provide the aperture member 30 at the interior of the objective lens 28. As a result, it is possible to use an objective lens for bright-field observation as it is, in the sample shape measuring apparatus of the present embodiment.

In the sample shape measuring apparatus 20', for forming an optical image of the sample 27, a lens 38 is disposed between the lens 37 and the detecting element 33. Accordingly, a part of light that reached the conjugate image 36 is detected by the detecting element 33.

Figure 11A:
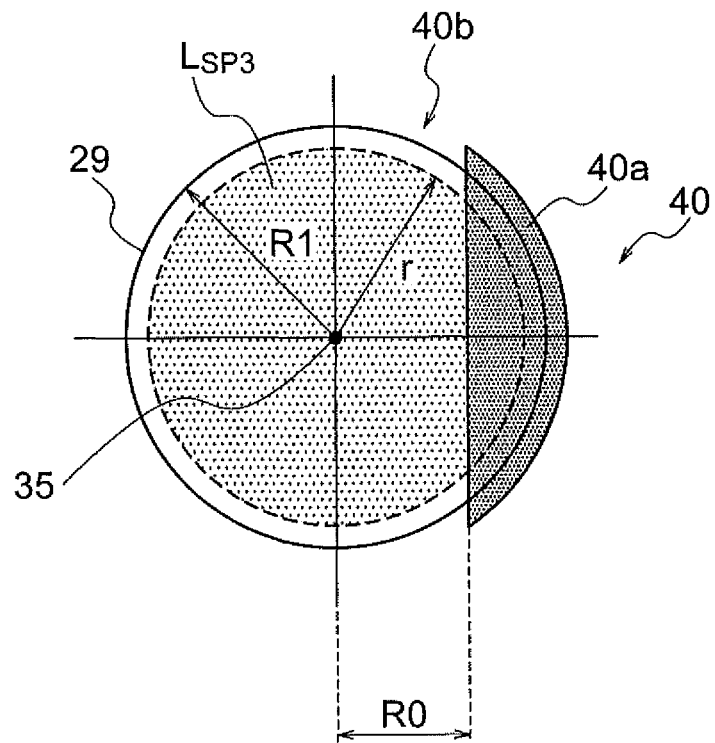
FIG. 11A is a diagram illustrating an aperture member of an illustrative embodiment 1.
Figure 11B:
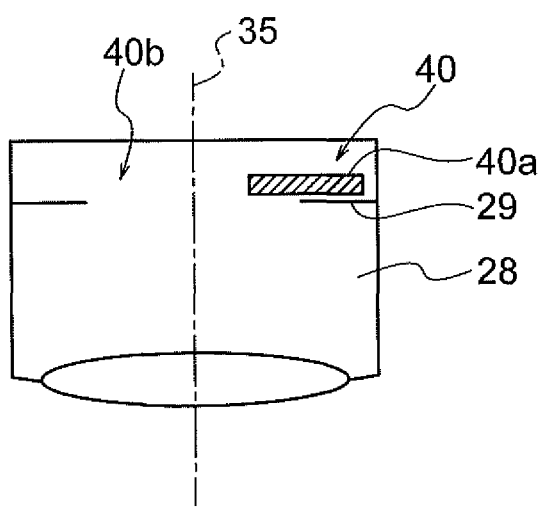
FIG. 11B is a diagram illustrating an arrangement of the aperture member of the illustrative embodiment 1.

Illustrative embodiments of the aperture member 30 shown in FIG. 8 and FIG. 9 will be described below. FIG. 11A is a diagram illustrating an aperture member of a illustrative embodiment 1, and FIG. 11B is a diagram illustrating an arrangement of the aperture member of the illustrative embodiment 1.

An aperture member 40 of the illustrative embodiment 1 has a light-shielding part 40a and a transmission part 40b. A shape of the aperture member 40 is a shape of a portion cut out from a circular-shaped member. The cut-out portion is the transmission part 40b. A shape of the light-shielding part 40a is an bow-shaped.

Figure 12:
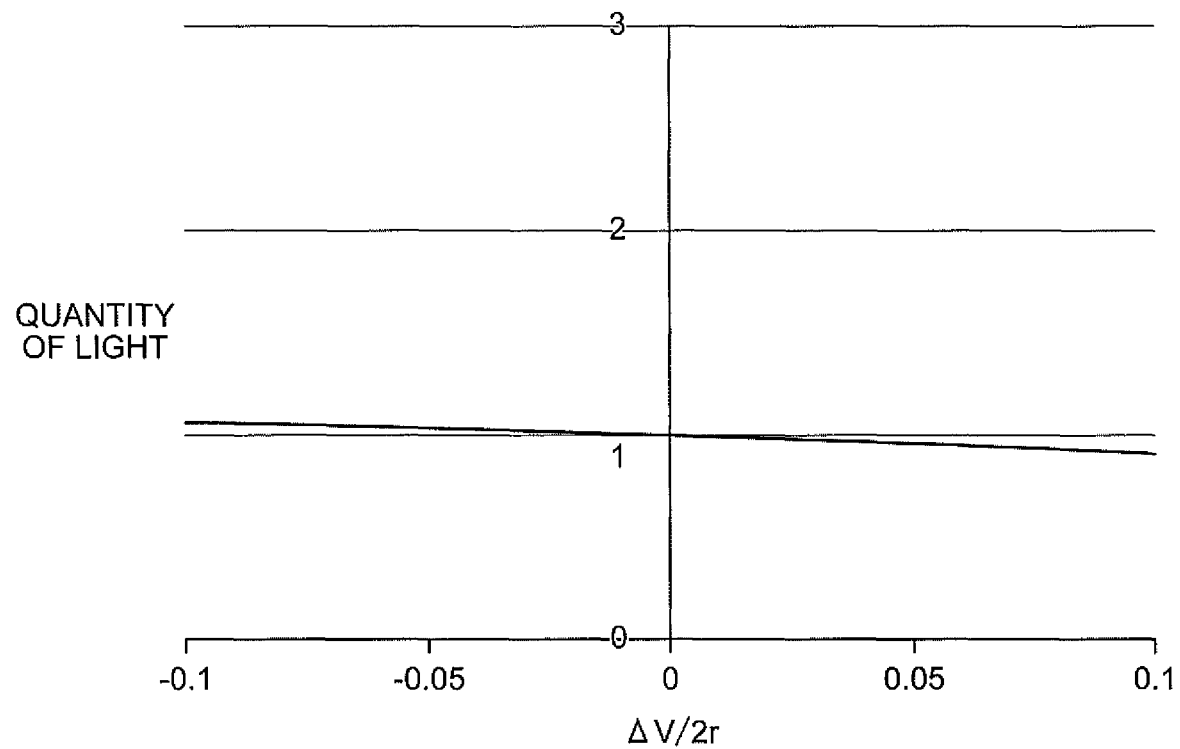
FIG. 12 is a graph showing a variation in a quantity of light at the aperture member of the illustrative embodiment 1.

An incident position of imaging light $L_{SP1}$ relative to the objective lens 28 varies according to the amount of tilt in the surface of the sample. Due to the variation, a quantity of light of imaging light $L_{SP3}$ that passes through the transmission part 40b varies. A graph showing the variation in the quantity of light at the aperture member of the illustrative embodiment 1 is shown in FIG. 12. In FIG. 12, a curve indicating a relationship of the quantity of light and $\Delta v/2r$ (hereinafter, referred to as 'characteristic curve') is shown.

In FIG. 12, a horizontal axis of the graph indicates an amount of shift in the incident position of imaging light $L_{SP1}$ relative to the objective lens 28. The amount of shift is obtained from $\Delta V$ which is a difference between a center of imaging light $L_{SP3}$ and the optical axis 35. A shape of imaging light $L_{SP3}$ is assumed to be a circle. In FIG. 12, $\Delta V$ is normalized by 2r. Here, r denotes a radius when imaging light $L_{SP3}$ is assumed to be a circle.

In the aperture member 40, an area of the transmission part 40b is extremely large as compared to an area of the light-shielding part 40a. In this case, an amount of variation in imaging light $L_{SP3}$ relative to the quantity of light when $\Delta V$ is zero ($\Delta V=0$) is small. Consequently, the inclination of the characteristic curve becomes small.

Figure 13A:
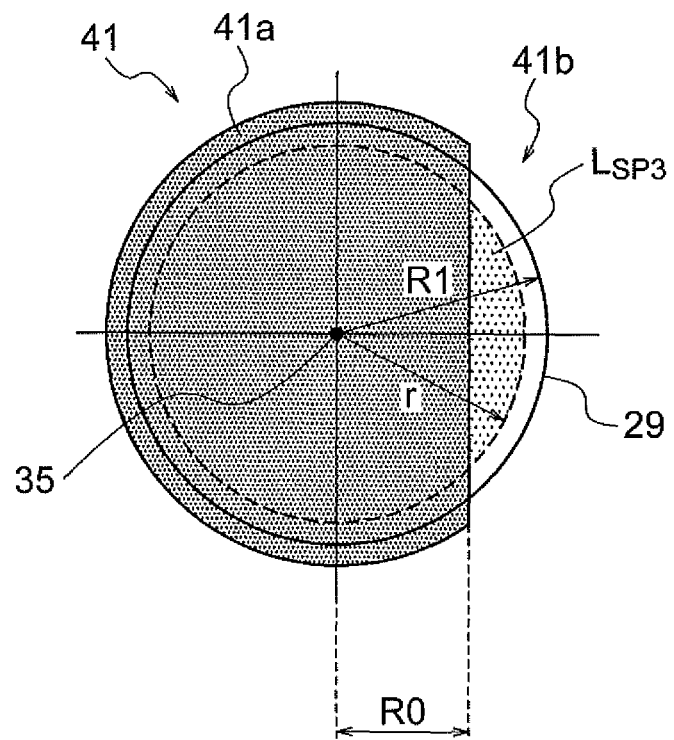
FIG. 13A is a diagram illustrating an aperture member of an illustrative embodiment 2.
Figure 13B:
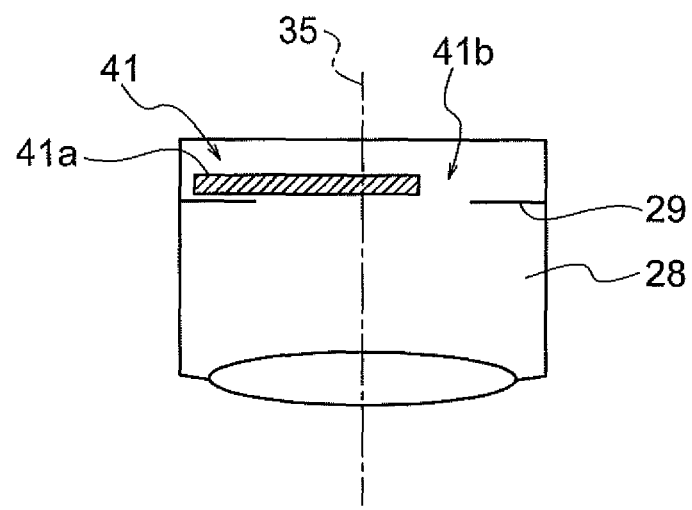
FIG. 13B is a diagram illustrating an arrangement of the aperture member of the illustrative embodiment 2.

FIG. 13A is a diagram illustrating an aperture member of an illustrative embodiment 2, and FIG. 13B is a diagram illustrating an arrangement of the aperture member of the illustrative embodiment 2.

An aperture member 41 of the illustrative embodiment 2 has a light-shielding part 41a and a transmission part 41b. A shape of the aperture member 41 is a shape of a portion cut out from a circular-shaped member. The cut-out portion is the transmission part 41b. A shape of the transmission part 41b is an bow-shaped.

Figure 14:
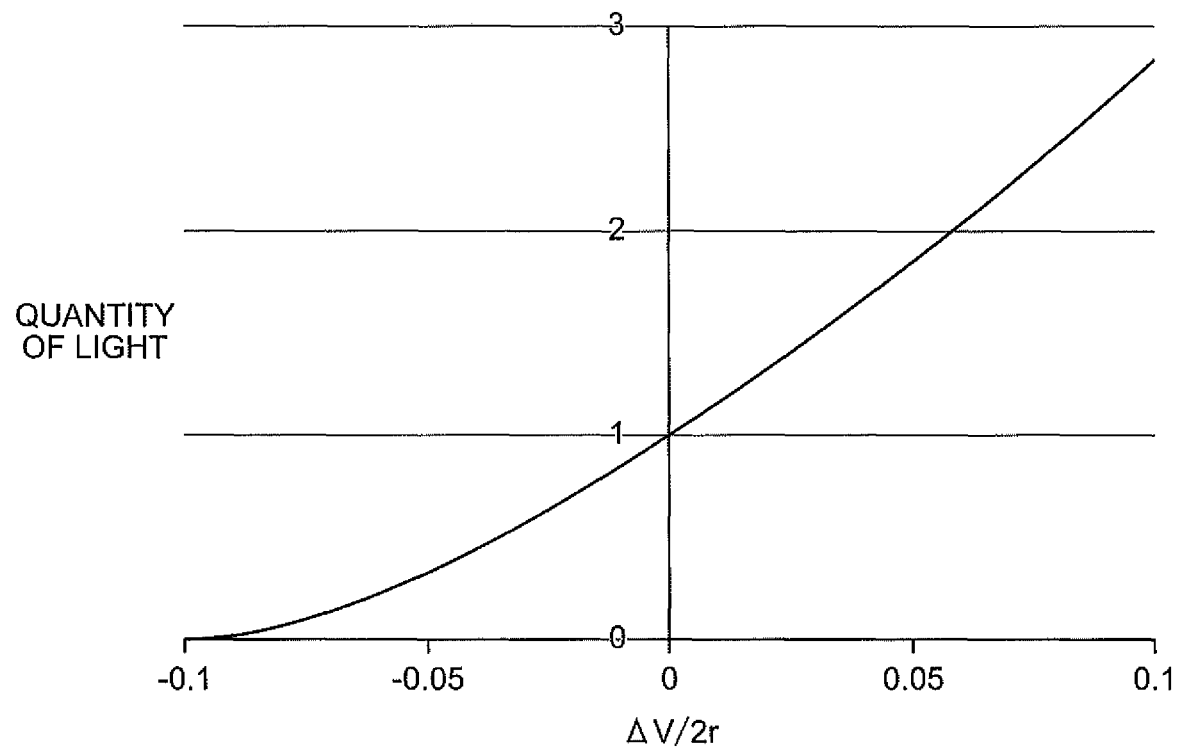
FIG. 14 is a graph showing a variation in a quantity of light at the aperture member of the illustrative embodiment 2.

A graph showing a variation in the quantity of light at the aperture member of the illustrative embodiment 2 is shown in FIG. 14. In the aperture member 41, an area of the transmission part 41b is extremely small as compared to an area of the light-shielding part 41a. In this case, an amount of variation in imaging light $L_{SP3}$ relative to the quantity of light when $\Delta V$ is zero ($\Delta V=0$) is large. Consequently, the inclination of the characteristic curve becomes large.

Figure 15A:
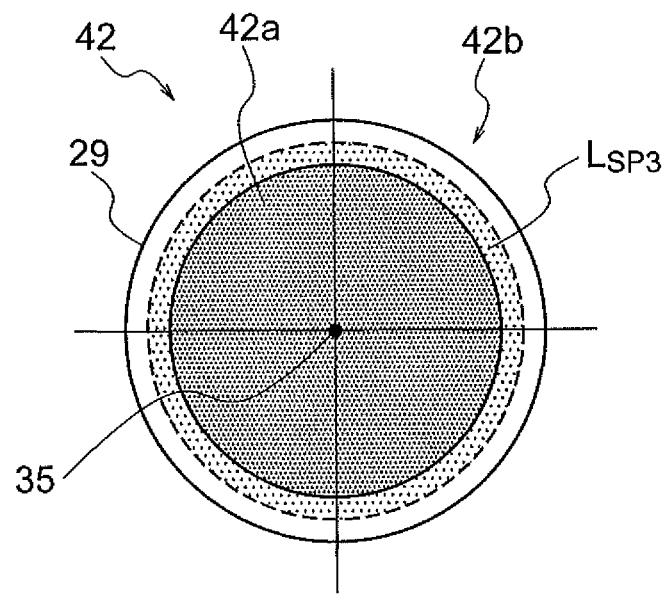
FIG. 15A is a diagram illustrating an aperture member of an illustrative embodiment 3.
Figure 15B:
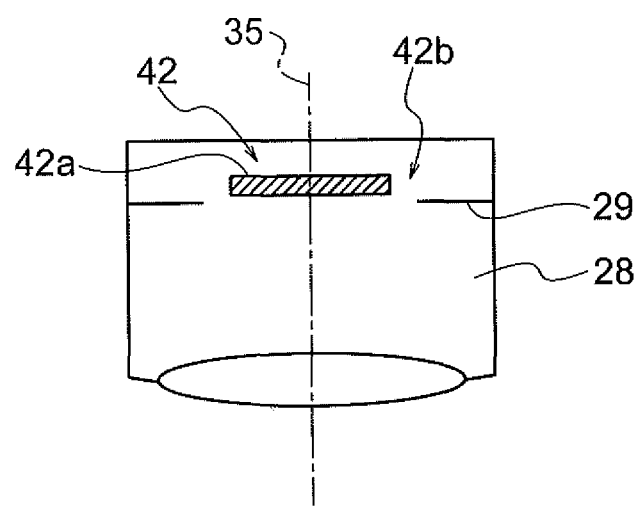
FIG. 15B is a diagram illustrating an arrangement of the aperture member of the illustrative embodiment 3.

FIG. 15A is a diagram illustrating an aperture member of a illustrative embodiment 3, and FIG. 15B is a diagram illustrating an arrangement of the aperture member of the illustrative embodiment 3.

An aperture member 42 of the illustrative embodiment 3 has a light-shielding part 42a and a transmission part 42b. A shape of the aperture member 42 is a circular shape, and a diameter of the circle is smaller than a diameter of the pupil 29 of the objective lens. A circular-shaped portion is the light-shielding part 42a.

In this way, in the sample shape measuring apparatus of the present embodiment, the illumination which is almost identical to the bright field illumination is carried out, and a part of the light that reached the pupil of the observation optical system or a part of the light that reached the conjugate image of the pupil of the observation optical system is merely transmitted. Thus, in derivation of the distribution of the amount of tilt in the surface of the sample, light emerged from the sample, that is, light transmitted through the sample is merely utilized, and the contrast of an image or the interference between non-diffracted light and diffracted light is not utilized. Therefore, according to the sample measuring apparatus of the present embodiment, even for a sample in which the reflectance of the surface is low and the surface shape is smooth, it is possible to measure the amount of tilt in the surface of the sample with high accuracy. Furthermore, as will be described later, by using the measured amount of tilt, it is possible to measure the surface shape of the sample with high accuracy.

In the sample shape measuring apparatus of the present embodiment, it is preferable that the aperture member have a light-shielding part and a transmission part, the light-shielding part be provided so as to include the optical axis of the objective lens, and the transmission part be provided so as to include an outer side and a part of an inner side of an image of a pupil of the illumination optical system.

As mentioned above, the aperture member 41 has the light-shielding part 41a and the transmission part 41b. The light-shielding part 41a is provided so as to include the optical axis 35. The transmission part 41b is provided so as to include a part of the outer side and a part of the inner side of the pupil of the illumination optical system.

Similarly, the aperture member 42 has the light-shielding part 42a and the transmission part 42b. The light-shielding part 42a is provided so as to include the optical axis 35. The transmission part 42b is provided so as to include an entire outer side and a part of the inner side of the image of the pupil of the illumination optical system.

In this way, in the sample shape measuring apparatus of the present embodiment, the transmission part is provided so as to include at least a part of the outer side and a part of the inner side of the image of the pupil of the illumination optical system.

By using the aperture member 41 or the aperture member 42, even for a sample in which the reflectance of the surface is low and the surface shape is smooth, it is possible to measure the amount of tilt in the surface of the sample with high accuracy. Furthermore, by using the measured amount of tilt, it is possible to measure the surface shape of the sample with high accuracy.

In the sample shape measuring apparatus of the present embodiment, it is preferable that the aperture member have a light-shielding part and a transmission part, the light-shielding part be provided so as to include an optical axis of the objective lens, and the transmission part be eccentric with respect to the optical axis, and be provided so as to include a part of an edge of an image of a pupil of the illumination optical system.

As mentioned above, the aperture member 41 has the light-shielding part 41a and the transmission part 41b. The light-shielding part 41a is provided so as to include the optical axis 35. The transmission part 41b is provided at a position eccentric with respect to the optical axis 35. Moreover, the transmission part 41b is provided so as to include the outer side and a part of the inner side of the image of the pupil of the illumination optical system.

By using the aperture member 41, even for a sample in which the reflectance of the surface is low and the surface shape is smooth, it is possible to measure the amount of tilt in the surface of the sample with high accuracy. Furthermore, by using the measured amount of tilt, it is possible to measure the surface shape of the sample with high accuracy.

In the sample shape measuring apparatus of the present embodiment, it is preferable that the aperture member have a light-shielding part and a transmission part, the light-shielding part be provided so as to include an optical axis of the objective lens, and the transmission part be provided so as not to include the optical axis but to include an entire edge of an image of a pupil of the illumination optical system.

As mentioned above, the aperture member 42 includes the light-shielding part 42a and the transmission part 42b. the light-shielding part 42a is provided so as to include the optical axis 35. The transmission part 42b is provided at a position not including the optical axis. The transmission part 42b is provided so as to include the entire edge of the image of the pupil of the illumination optical system.

By using the aperture member 42, even for a sample in which the reflectance of the surface is low and the surface shape is smooth, it is possible to measure the amount of tilt in the surface of the sample with high accuracy. Furthermore, by using the measured amount of tilt, it is possible to measure the surface shape of the sample with high accuracy.

In the sample shape measuring apparatus of the present embodiment, it is preferable that the following conditional expression be satisfied:

$$R0 < Rill \times \beta < R1$$

where,

R0 denotes a length from the optical axis of the objective lens up to a predetermined position, R1 denotes a length from the optical axis of the objective lens up to an outer edge of the transmission part, and denotes a length on a line connecting the optical axis of the objective lens and the predetermined position, and here the predetermined position is a position at which a length from the optical axis of the objective lens is the minimum, from among positions on an inner edge of the light-shielding part, Rill denotes a radius of the pupil of the illumination optical system, and $\beta$ denotes a value obtained by dividing a focal length of the objective lens by a focal length of the condenser lens.

By satisfying the conditional expression, even for a sample in which the reflectance of the surface is low and the surface shape is smooth, it is possible to measure the amount of tilt in the surface of the sample with high accuracy. Furthermore, by using the measured amount of tilt, it is possible to measure the surface shape of the sample with high accuracy.

In the sample shape measuring apparatus of the present embodiment, light that passes through the pupil of the observation optical system is detected. Therefore, the transmission part of the aperture member is positioned at the inner side of the pupil of the observation optical system. Moreover, the edge of the image of the pupil of the illumination optical system is included in the transmission part. This signifies that the edge of the image of the pupil of the illumination optical system is positioned at the inner side of the pupil of the observation optical system.

In the sample shape measuring apparatus of the present embodiment, it is possible to use an optical system of a microscope. In the optical system of the microscope, a microscope objective lens is used as the observation optical system, and a condenser lens is used as the illumination optical system. Moreover, in the optical system of the microscope, it is possible to use a plurality of microscope objective lenses and a plurality of condenser lenses. Accordingly, there exist a large number of combinations of a numerical aperture of the illumination optical system and a numerical aperture of the observation optical system.

A size of the image of the pupil of the illumination optical system is determined by the numerical aperture of the illumination optical system and the numerical aperture of the observation optical system. Therefore, according to a combination of the illumination optical system and the observation optical system, there is a possibility that the image of the pupil of the illumination optical system is larger than the pupil of the observation optical system. In this case, the edge of the image of the pupil of the illumination optical system is not positioned at the inner side of the pupil of the observation optical system.

In such a case, a light flux diameter of light emitted from the light source 21 is made thin. By making such arrangement, at the pupil position of the observation optical system, the light flux diameter of the illumination light is included in the transmission part. Since a position of the light flux of the illumination light varies in accordance with the amount of tilt in the surface of the sample, it is possible to detect the variation in the amount of tilt in the surface of the sample as a variation in brightness.

As described heretofore, it is possible to replace the image of the pupil of the illumination optical system with a light flux of the illumination light at the pupil position of the observation optical system. Therefore, it is possible to put it in another way as follows.

'The transmission part includes the outer side and a part of the inner side of the image of the pupil of the illumination optical system' can be put in another way as 'the transmission part includes the outer side and a part of the inner side of a light flux of the illumination light at the pupil position of the observation optical system'.

'The transmission part includes a part of the edge of the image of the pupil of the illumination optical system' can be put in another way as 'the transmission part includes a part of the edge of a light flux of the illumination light at the pupil position of the observation optical system'.

'The transmission part is provided so as to include the entire edge of the image of the pupil of the illumination optical system' can be put in another way as 'the transmission part is provided so as to include the entire light flux of the illumination light at the pupil position of the observation optical system'.

'Rill denotes the radius of the pupil of the illumination optical system' can be put in another way as 'Rill denotes a radius of a light flux of the illumination light at the pupil position of the observation optical system'.

In the sample shape measuring apparatus of the present embodiment, it is preferable that the aperture member have a boundary line dividing the light-shielding part and the transmission part, and the boundary line be formed of a line parallel to one straight line orthogonal to the optical axis.

By making such arrangement, it is possible to manufacture the aperture member easily.

Figure 16:
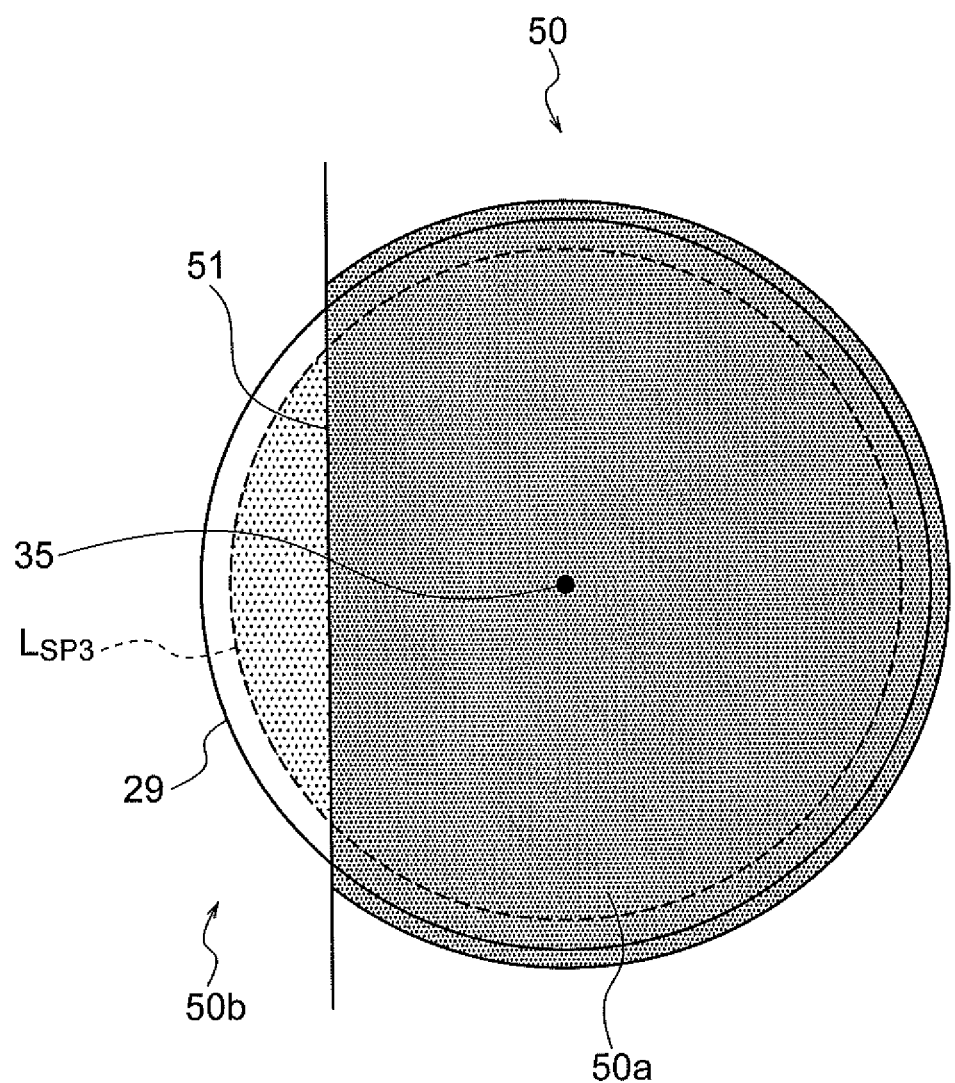
FIG. 16 is a diagram illustrating an example of an aperture member.

FIG. 16 is a diagram illustrating an example of the aperture member. In FIG. 16, a state of an aperture member 50 disposed at the position of the pupil 29 of the objective lens is shown. The aperture member 50 has a light-shielding part 50a and a transmission part 50b. A shape of the aperture member 50 is a shape of a portion cut out from a circular-shaped member. The cut-out portion is the transmission part 50b.

A boundary line 51 is formed between the light-shielding part 50a and the transmission part 50b. The light-shielding part 50a and the transmission part 50b are divided by the boundary line 51. The boundary line 51 is a line parallel with a straight line orthogonal to the optical axis 35.

In the sample shape measuring apparatus of the present embodiment, it is preferable that the aperture member have a boundary line dividing the light-shielding part and the transmission part, and a straight line connecting predetermined two points be located between the boundary line and the optical axis. Here, the predetermined two points are two points at which a predetermined line crosses the outer edge of the pupil of the illumination optical system when the pupil of the illumination optical system is superimposed on the aperture member.

By making such arrangement, it is possible to measure a surface of a sample having a larger amount of tilt.

Figure 17:
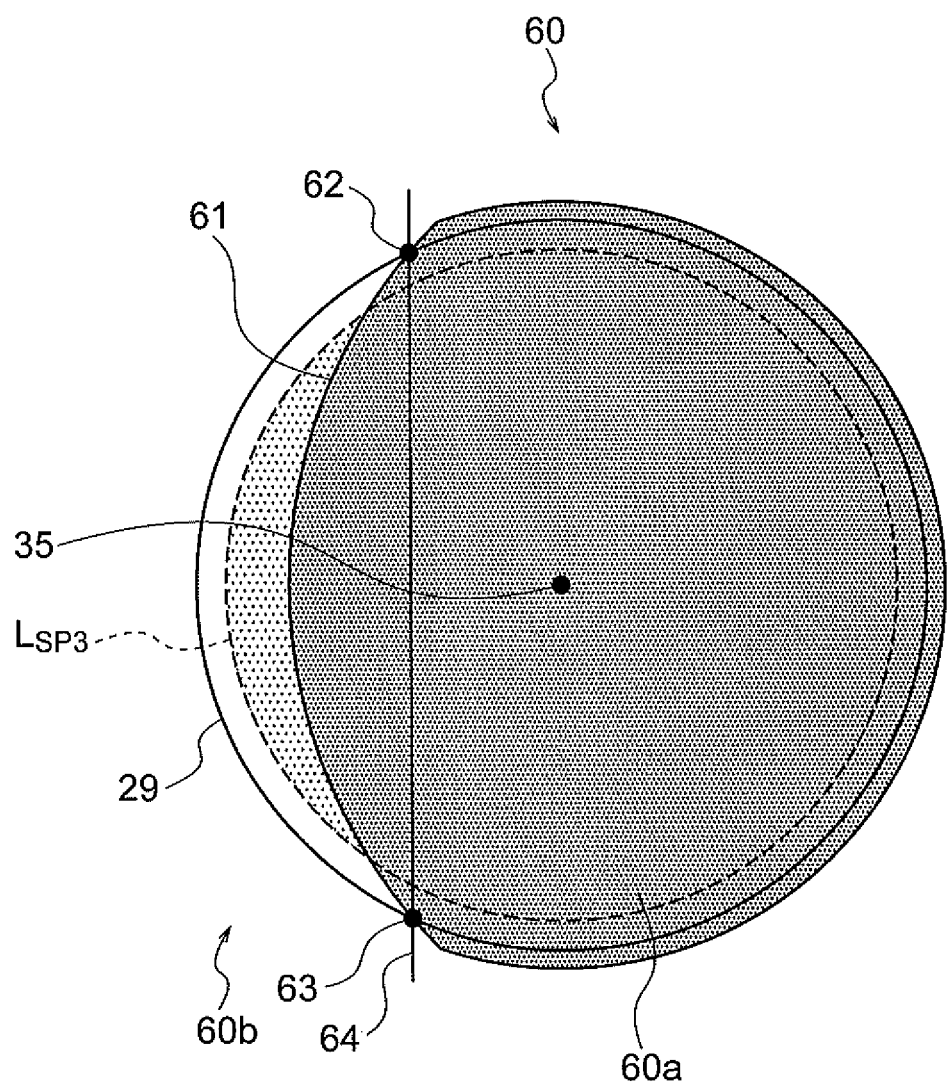
FIG. 17 is a diagram illustrating another example of an aperture member.

FIG. 17 is a diagram illustrating another example of the aperture member. In FIG. 17, a state of an aperture member 60 disposed at a position of the pupil 29 of the objective lens is shown. The aperture member 60 includes a light-shielding part 60a and a transmission part 60b. A shape of the aperture member 50 is a shape of a portion cut out from a circular-shaped member. The cut-out portion is the transmission part 60b.

A boundary line 61 is formed between the light-shielding part 60a and the transmission part 60b. The light-shielding part 60a and the transmission part 60b are divided by the boundary line 61.

When the pupil 29 of the objective lens is superimposed on the aperture member 60, the boundary line 61 and an outer edge of the pupil 29 of the objective lens cross at a point 62 and a point 63. The point 62 and the point 63 are the predetermined two points. A straight line 64 is a straight line (predetermined line) running through the point 62 and the point 63.

The boundary line 61 is formed of an arc. The arc is formed to project from the light-shielding part 60a toward the transmission part 60b. Accordingly, in the aperture member 60, the straight line 64 is positioned between the boundary line 61 and the optical axis 35.

In the aperture member 60, the boundary line 61 is a line formed of a curve. However, the boundary line 61 may be any of a line formed of a plurality of straight lines, a line formed of a plurality of curves, and a line formed of a curve and a straight line.

In the sample shape measuring apparatus of the present embodiment, it is preferable that the aperture member have a boundary line dividing the light-shielding part and the transmission part, and the boundary line be located between a straight line connecting predetermined two points and the optical axis. Here, the predetermined two points are two points at which a predetermined line crosses the outer edge of the pupil of the illumination optical system when the pupil of the illumination optical system is superimposed on the aperture member.

By making such arrangement, it is possible to measure a surface of a sample having a smaller amount of tilt.

Figure 18:
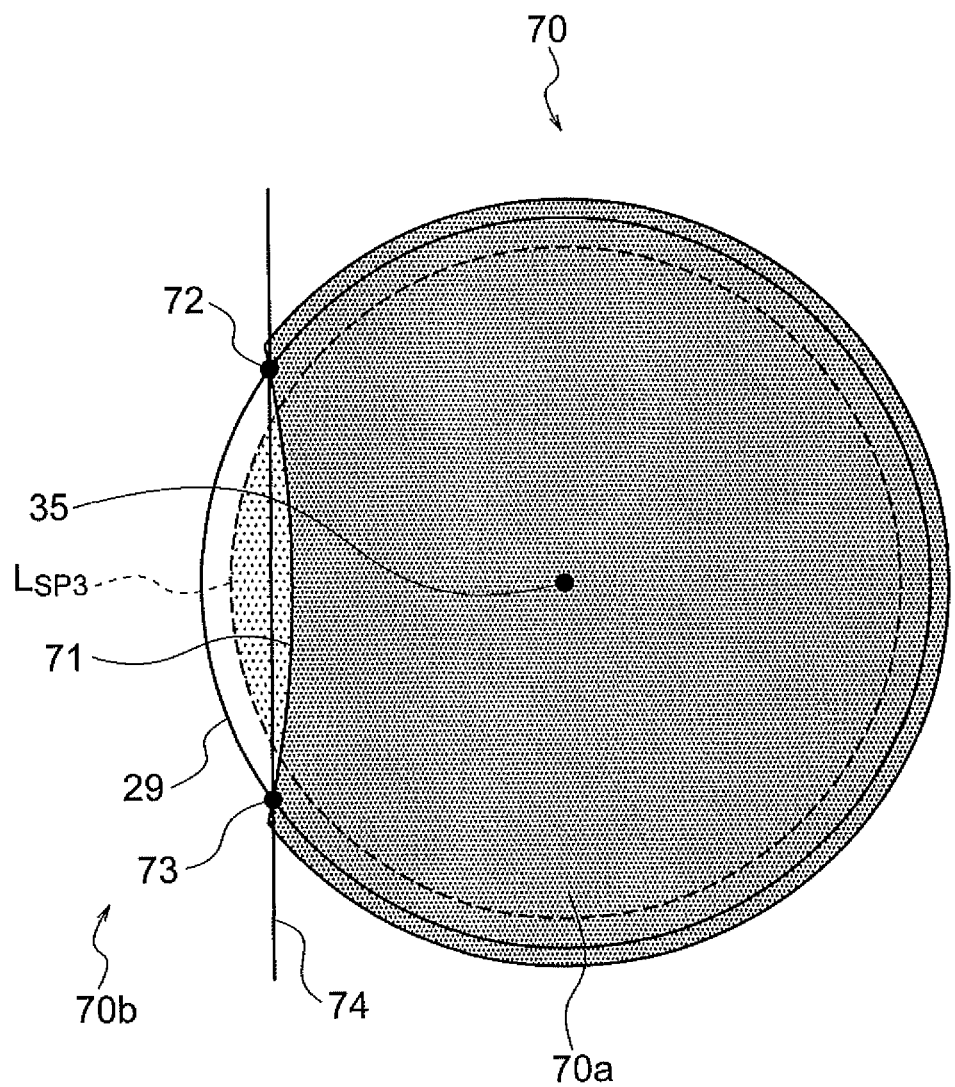
FIG. 18 is a diagram illustrating still another example of an aperture member.

FIG. 18 is a diagram illustrating another example of the aperture member. In FIG. 18, a state of an aperture member 70 disposed at the position of the pupil 29 of the objective lens is shown. The aperture member 70 includes a light-shielding part 70a and a transmission part 70b. A shape of the aperture member 70 is a shape of a portion cut out from a circular-shaped member. The cut-out portion is the transmission part 70b.

A boundary line 71 is formed between the light-shielding part 70a and the transmission part 70b. The light-shielding part 70a and the transmission part 70b are divided by the boundary line 71.

When the pupil 29 of the objective lens is superimposed on the aperture member 70, the boundary line 71 and the outer edge of the pupil 29 of the objective lens cross at a point 72 and a point 73. The point 72 and the point 73 are the predetermined two points. A straight line 74 is a straight line (predetermined line) passing through the point 72 and the point 73.

The boundary line 71 is formed of an arc. The arc is formed to project from the transmission part 70b toward the light-shielding part 70a. Accordingly, in the aperture member 70, the boundary line 71 is positioned between the straight line 74 and the optical axis 35.

In the aperture member 70, the boundary line 71 is a line formed of a curve. However, the boundary line 71 may be any of a line formed of a plurality of straight lines, a line formed of a plurality of curves, and a line formed of a curve and a straight line.

In the sample shape measuring apparatus of the present embodiment, it is preferable that the illumination optical system have a predetermined illumination region, a surface light source be disposed or an image of the surface light source be formed on the predetermined illumination region, and light emerged from the observation optical system be received.

Figure 19:
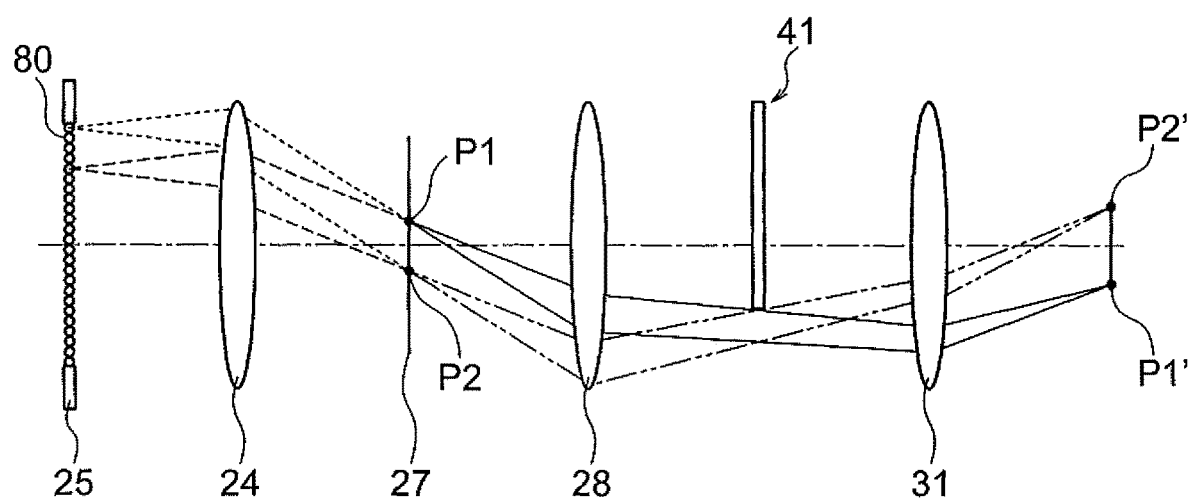
FIG. 19 is a diagram illustrating a state of illumination light.

FIG. 19 shows a state of illumination light. In an illumination optical system shown in FIG. 19, a surface light source 80 is disposed on a predetermined illumination region. The predetermined illumination region is a transmission part of the stop 25. In FIG. 19, illumination light emerged from a partial region (hereinafter, referred to as 'region A') positioned on one side of the surface light source 80 is shown. The illumination light emerged from one end of the region A is indicated by dotted lines, and illumination light emerged from the other end of the region A is indicated by dashed lines.

As shown in FIG. 19, the transmission part of the stop 25 includes the optical axis. Accordingly, the surface light source 80 is disposed in a circular-shaped region including the optical axis.

The illumination light indicated by the dotted lines and the illumination light indicated by the dashed lines are both emerged as parallel light flux from the condenser lens 24. Accordingly, the sample 27 is illuminated by illumination light which is spread.

Although it is omitted in the diagram, illumination light similar to the region A is emitted also from the other side of the planar light source 80. The illumination light emitted from the other side is emerged as a parallel light flux from the condenser lens 24. The illumination light emitted from the other side as well is applied to the sample 27.

Imaging light is transmitted through the sample 27 which is illuminated. In FIG. 19, imaging light directed in a particular direction from a point P1 and a point P2 of the sample 27 are indicated by solid lines and alternate long and two short dashes lines. However, in actuality, imaging lights directed in various directions are emerged from the point P1 and the point P2 of the sample 27.

Figure 20:
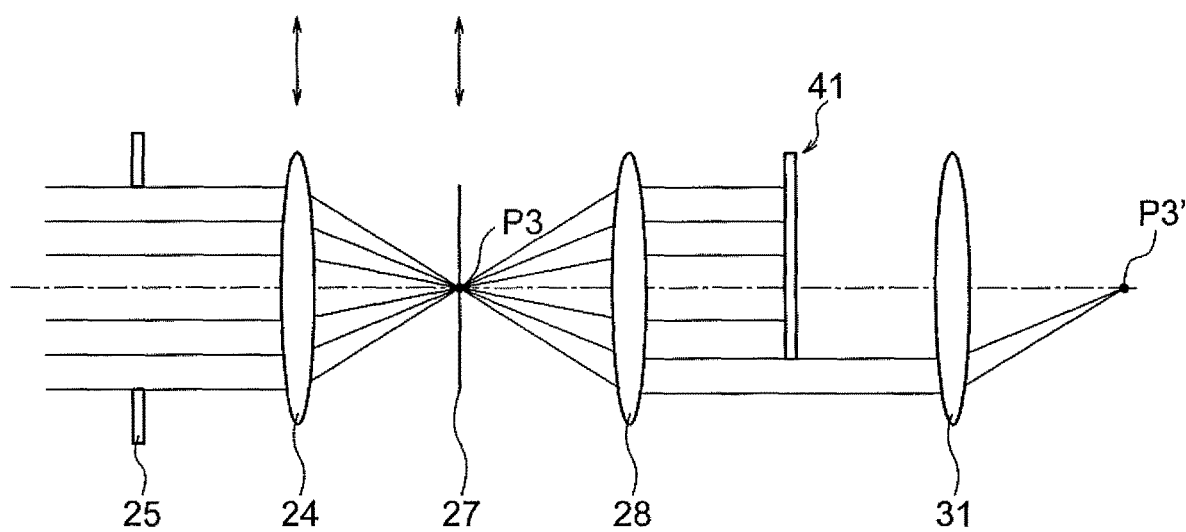
FIG. 20 is a diagram illustrating a state of illumination light.

For instance, a state of imaging light directed in various directions emerging from a point P3 is shown in FIG. 20. Imaging light directed in various directions is emerged from the point P1 and the point P2, similarly as the imaging light emerged from the point P3.

A part of the imaging light emerged from the point P1 of the sample 27 is shielded at the light-shielding part of the aperture member 41. A part of the imaging light emerged from the point P2 of the sample is also shielded at the light-shielding part of the aperture member 41.

On the other hand, the remaining of the imaging light emerged from the point P1 of the sample 27 is focused at an image position by the objective lens 28 and the imaging lens 31. An image P1' of the point P1 is formed at the image position. The remaining of the imaging light emerged from the point P2 of the sample 27 is also focused at an image position by the objective lens 28 and the imaging lens 31. An image P2' of the point P2 is formed at the image position. In such manner, a two-dimensional image is formed at the image position.

At step S31, imaging light is received at a plurality of micro regions. The micro regions are arranged in rows two-dimensionally. Accordingly, the two-dimensional image is divided into the plurality of micro regions. Light is received at each micro region. As a result, it is possible to measure the shape of the surface of the sample over a wide range at one time.

In the sample shape measuring apparatus of the present embodiment, it is preferable that the illumination light which passes through the predetermined illumination region be a parallel light flux.

FIG. 20 is a diagram illustrating a state of the illumination light. In FIG. 20, a parallel light flux is applied to the stop 25. Accordingly, illumination light which passes through the predetermined illumination region also becomes a parallel light flux.

As shown in FIG. 20, the transmission part of the stop 25 includes the optical axis. Accordingly, the parallel light flux passes through a circular-shaped region including the optical axis.

The illumination light is incident on the condenser lens 24. The illumination light incident on the condenser lens 24 is focused at a position of the sample 27. Accordingly, the sample 27 is illuminated by illumination light in the form a point.

Imaging light emerges from the sample 27 that is illuminated. A part of the imaging light emerged from the point P3 of the sample 27 is shielded by the light-shielding part of the aperture member 41. Whereas, the remaining of the imaging light emerged from the point P3 of the sample 27 is focused at an image position by the objective lens 28 and the imaging lens 31. An image P3' of the point P3 is formed at the image position.

In such manner, in a case in which the illumination light passing through the predetermined illumination region is a parallel light flux, the illumination light is applied only to one point of the sample 27. In this case, the imaging light is also the only light from one point of the sample 27. Consequently, when step S30 is executed, only an amount of tilt at one point of the sample 27 is calculated.

In the case in which the illumination light that passes through the predetermined illumination region is a parallel light flux, it is preferable to move the illumination light and the sample relatively in a plane orthogonal to the optical axis.

As mentioned above, in the case in which the illumination light passing through the predetermined illumination region is a parallel light flux, no amount of tilt except at only one point of the sample 27 is calculated. Then, the illumination light and the sample are to be moved relatively in a plane orthogonal to the optical axis. In such manner, it is possible to calculate the amount of tilt at the plurality of positions of the sample 27.

It is preferable that the sample shape measuring apparatus include a first aperture member and a second aperture member that are inserted into and removed from an optical path. The first aperture member has a light-shielding part at a location including an optical axis of the objective lens and a first transmission part at a position eccentric with respect to the optical axis. The second aperture member has a light-shielding part at a location including an optical axis of the objective lens and a second transmission part at a position eccentric with respect to the optical axis. A direction connecting the optical axis and a center of gravity of the first transmission part when the first aperture member is inserted into the optical path and a direction connecting the optical axis and a center of gravity of the second transmission part when the second aperture member is inserted into the optical path intersect.

Figure 21:
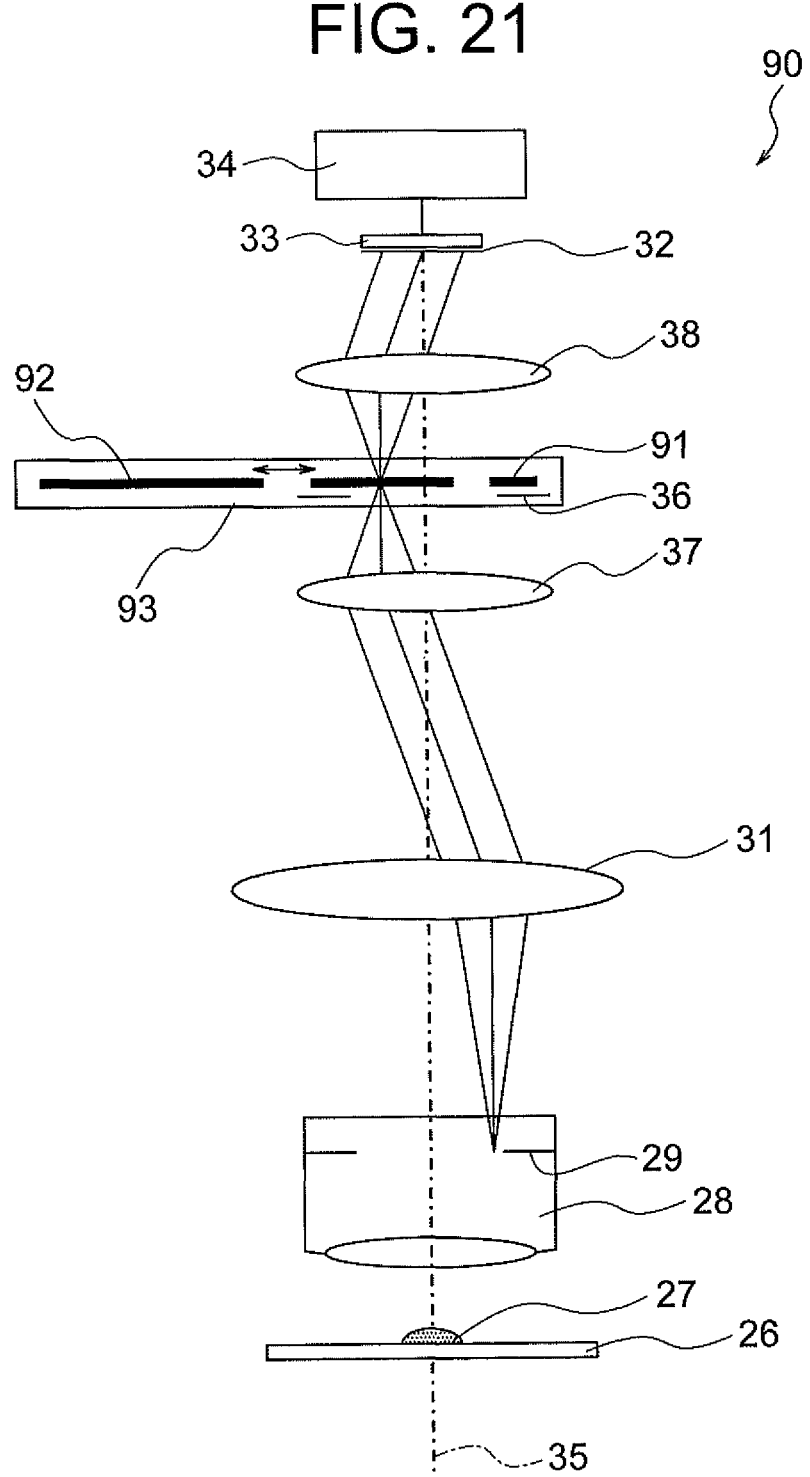
FIG. 21 is a diagram illustrating a structure of another sample shape measuring apparatus according to the present embodiment.

FIG. 21 is a diagram illustrating a structure of another sample shape measuring apparatus of the present embodiment. Same reference numerals are assigned to components identical to those in FIG. 10, and description thereof is omitted.

A sample shape measuring apparatus 90 includes a first aperture member 91 and a second aperture member 92. A transparent plate is used for the first aperture member 91 and the second aperture member 92.

Both the first aperture member 91 and the second aperture member 92 are held by a moving mechanism 93. A slider and a turret are available as the moving mechanism 93, for example. In a case in which the moving mechanism 93 is a slider, the first aperture member 91 and the second aperture member 92 move in a direction orthogonal to the optical axis 35. In a case in which the moving mechanism 93 is a turret, the first aperture member 91 and the second aperture member 92 rotate around an axis parallel to the optical axis 35 as a center.

Figure 22A:
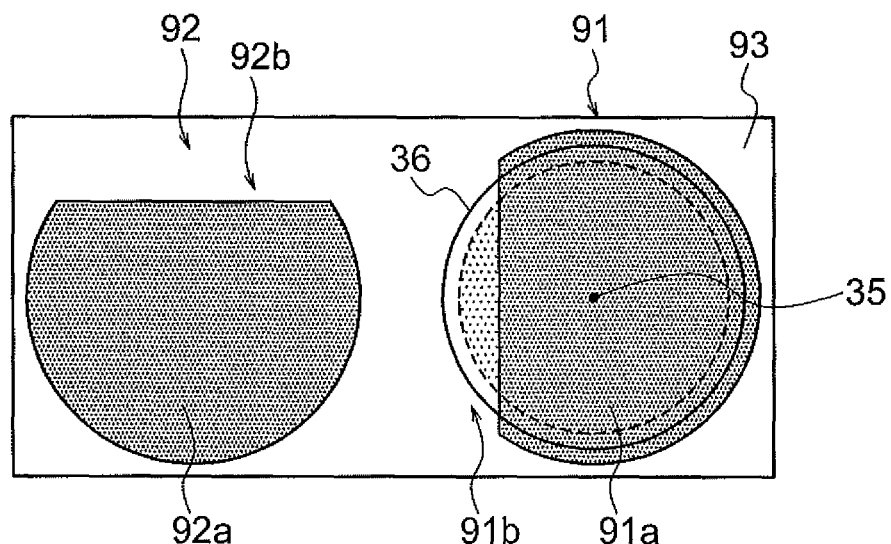
FIG. 22A is a diagram illustrating a state in which a first aperture member is inserted into an optical path.
Figure 22B:
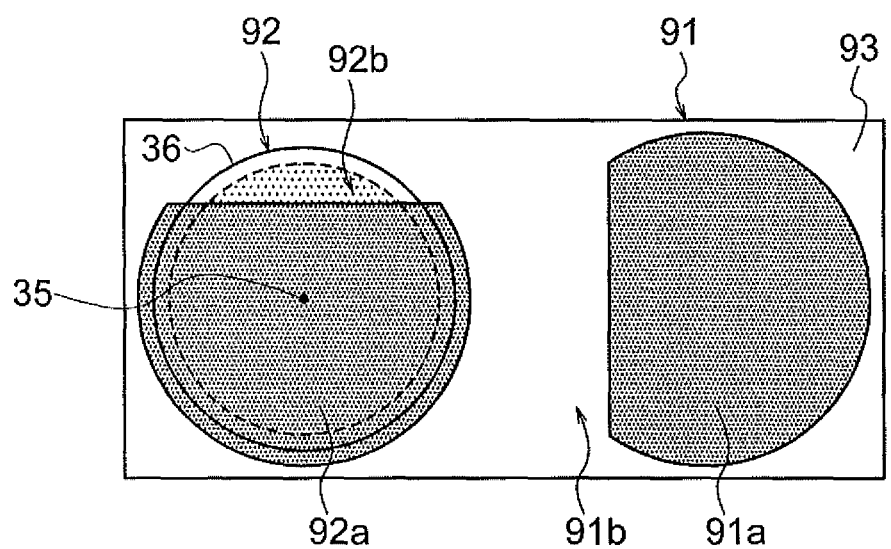
FIG. 22B is a diagram illustrating a state in which a second aperture member is inserted into an optical path.

FIG. 22A is a diagram illustrating a state in which a first aperture member is inserted into an optical path. FIG. 22B is a diagram illustrating a state in which a second aperture member is inserted into an optical path.

The first aperture member 91 has a light-shielding part 91a and a first transmission part 91b. In the first aperture member 91, a location including the optical axis 35 is the light-shielding part 91a. The first aperture member 91 has the first transmission part 91b at a position eccentric with respect to the optical axis 35.

The second aperture member 92 has a light-shielding part 92a and a second transmission part 92b. In the second aperture member 92, a location including the optical axis 35 is the light-shielding part 92a. The second aperture member 92 has the second transmission part 92b at a position eccentric with respect to the optical axis 35.

Moreover, a direction connecting the optical axis 35 and a center of gravity of the first transmission part 91b and a direction connecting the optical axis 35 and a center of gravity of the second transmission part 92b intersect when the first aperture member 91 is inserted into the optical path and when the second aperture member 92 is inserted into the optical path. In FIG. 22A and FIG. 22B, the first transmission part 91b is positioned on one straight line of two straight lines that are orthogonal, and the second transmission part 92b is positioned on the other straight line.

An area of illumination light passing through the first transmission part 91b is equal to an area of illumination light passing through the second transmission part 92b. Accordingly, variation in the area of the illumination light when the inclination angle of the sample is varied, is same when the first aperture member 91 is inserted into the optical path and when the second aperture member 92 is inserted into the optical path.

A spectral transmittance characteristic at the first transmission part 91b is identical to a spectral transmittance characteristic at the second transmission part 92b. In this case, it is possible to carry out the measurement by using one light source. A wavelength band of light emitted from the light source may be wide or may be narrow.

The spectral transmittance characteristic at the first transmission part 91b may differentiate from the spectral transmittance characteristic at the second transmission part 92b. In this case, as a measuring method, a method of carrying out the measurement without changing a wavelength of the illumination light and a method of carrying out the measurement by changing the wavelength of the illumination light are available.

In the method of carrying out the measurement without changing the wavelength of the illumination light, a light source in which a wavelength band of emitted light is wide, is used as a light source. As the light source in which the wavelength band of emitted light is wide, a white light source is available. Moreover, for a detecting element, a plurality of photoelectric conversion elements is used. As a detecting element which includes the plurality of photoelectric conversion elements, a three-plate type camera is available, for example.

The three-plate type camera includes three CCDs. A filter of red color is disposed in a first CCD, a filter of green color is disposed in a second CCD, and a filter of blue color is disposed in a third CCD.

Then, for example, the spectral transmittance characteristic at the first transmission part 91b is matched with spectral transmittance characteristic of the filter of red color and the spectral transmittance characteristic at the second transmission part 92b is matched with spectral transmittance characteristic of the filter of green color.

Moreover, in the measurement, the white light source is disposed in the optical path, and the measurement is carried out by the first CCD when the first aperture member 91 is inserted into the optical path and the measurement is carried out by the second CCD when the second aperture member 92 is inserted into the optical path.

In the method of carrying out the measurement by changing the wavelength of the illumination light, sometimes a plurality of light sources is used or sometimes one light source is used.

In a case of using a plurality of light sources, for example, a second light source is prepared in addition to a first light source. Moreover, a wavelength band of light emitted from the first light source and a wavelength band of light emitted from the second light source are differentiated. Furthermore, a spectral transmittance characteristic at the first transmission part is matched with the wavelength band of the light emitted from the first light source and a spectral transmittance characteristic at the second transmission part 92b is matched with the wavelength of the light emitted from the second light source.

Moreover, in the measurement, when the first aperture member 91 is inserted into the optical path, the measurement is carried out by using the first light source and when the second aperture member 92 is inserted into the optical path, the measurement is carried out by using the second light source.

In a case of using one light source, a plurality of optical filters is prepared. For instance, a first optical filter and a second optical filter are prepared. Moreover, the spectral transmittance characteristic at the first transmission part 91$b$ is matched with a spectral transmittance characteristic of the first optical filter and the spectral transmittance characteristic at the second transmission part 92$b$ is matched with spectral characteristic of the second optical filter.

Moreover, in the measurement, when the first aperture member 91 is inserted into the optical path, the measurement is carried out by using the first optical filter and when the second aperture member 92 is inserted into the optical path, the measurement is carried out by using the second optical filter.

In the sample shape measuring apparatus of the present embodiment, it is possible to detect a variation of the quantity of light of the imaging light in any direction. Therefore, according to the sample shape measuring apparatus of the present embodiment, it is possible to calculate a direction of inclination and the amount of tilt in the surface of the sample.

In the sample shape measuring apparatus of the present embodiment, it is preferable that the aperture member have a light-shielding part at a location including an optical axis of the objective lens, and a first transmission part and a second transmission part at positions eccentric with respect to the optical axis. When the aperture member is inserted into the optical path, a direction connecting the optical axis and a center of gravity of the first transmission part and a direction connecting the optical axis and a center of gravity of the second transmission part intersect.

Figure 23:
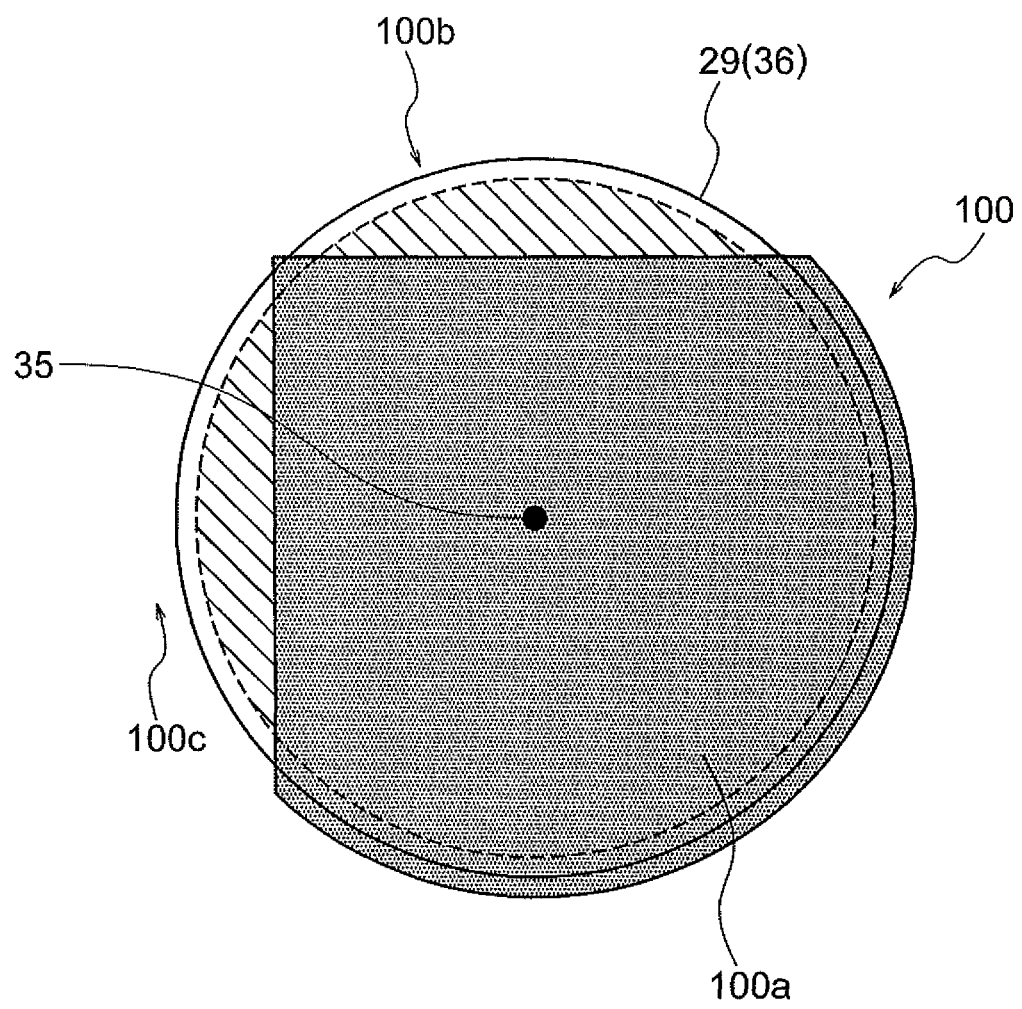
FIG. 23 is a diagram illustrating a state in which an aperture member is inserted into an optical path.

FIG. 23 is a diagram illustrating a state in which the aperture member is inserted into the optical path. An aperture member 100 has a light-shielding part 100$a$, a first transmission part 100$b$, and a second transmission part 100$c$. In the aperture member 100, a location including the optical axis 35 is the light-shielding part 100$a$. The aperture member 100 has the first transmission part 100$b$ and the second transmission part 100$c$ at positions eccentric with respect to the optical axis 35.

Moreover, a direction connecting the optical axis 35 and a center of gravity of the transmission part 100$b$ and a direction connecting the optical axis 35 and a center of gravity of the second transmission part 100$c$ intersect. In FIG. 23, the first transmission part 100$b$ is positioned on one straight line of two straight lines that are orthogonal, and the second transmission part 100$c$ is positioned on the other straight line.

An area of illumination light passing through the first transmission part 100$b$ is equal to an area of illumination light passing through the second transmission part 100$c$. Accordingly, variation in the area S when an inclination angle $\theta_s$ is varied, is same when the illumination light is transmitted through the first transmission part 100$b$ and when the illumination light is transmitted through the second transmission part 100$c$.

It is necessary to differentiate a spectral transmittance characteristic of the first transmission part 100$b$ from a spectral transmittance characteristic of the second transmission part 100$c$. It is possible to carry out the measurement with the aperture member 100 disposed in the optical path all the time either by using a plurality of photoelectric conversion elements in the detecting element or by changing the wavelength of the illumination light.

In the sample shape measuring apparatus of the present embodiment, it is possible to detect a variation of the quantity of light of the imaging light in any direction without moving the aperture member. Therefore, according to the sample shape measuring apparatus of the present embodiment, it is possible to calculate the direction of inclination and the amount of tilt in the surface of the sample.

In the sample shape measuring apparatus of the present embodiment, it is preferable that the aperture member have a light-shielding part at a location including an optical axis of the objective lens and a transmission part at a position eccentric with respect to the optical axis, and a direction connecting the optical axis and a center of gravity of the transmission part be variable.

Figure 24:
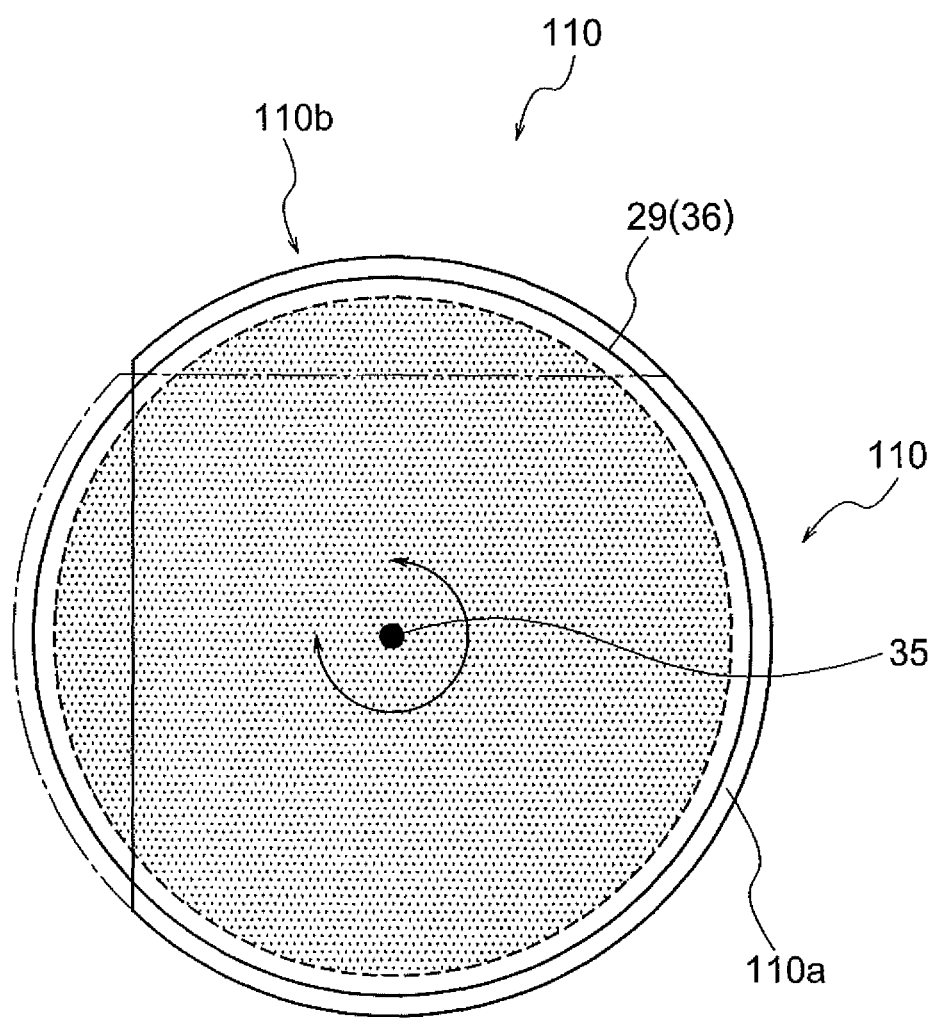
FIG. 24 is a diagram illustrating a state in which an aperture member is inserted into an optical path.

FIG. 24 is a diagram illustrating a state in which the aperture member is inserted into the optical path. An aperture member 110 has a light-shielding part 110$a$. In the aperture member 110, a location including the optical axis 35 is the light-shielding part 110$a$. The aperture member 110 has a transmission part 100$b$ at a position eccentric with respect to the optical axis 35.

In the sample shape measuring apparatus of the present embodiment, the aperture member 110 is rotatable from a position indicated by solid lines to a position indicated by alternate long and short dash lines. In other words, the direction connecting the optical axis and the center of gravity of the transmission part is variable.

By moving the aperture member 110 to the position indicated by the solid lines, it is possible to realize a state identical to that in FIG. 22A. Moreover, by moving the aperture member 110 to the position indicated by the alternate long and short dash lines, it is possible to realize a state identical to that in FIG. 22B.

In the sample shape measuring apparatus of the present embodiment, it is possible to detect a variation of the quantity of light of the imaging light in any direction. Therefore, according to the sample state measuring apparatus of the present embodiment, it is possible to calculate the direction of inclination and the amount of tilt in the surface of the sample.

In the sample shape measuring apparatus of the present embodiment, it is preferable that at least one of a size of the light-shielding part and a numerical aperture on a sample side of the objective lens be variable.

Figure 25A:
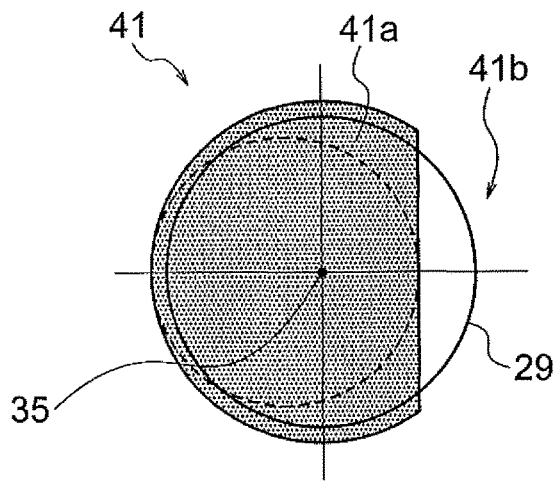
FIG. 25A is a diagram illustrating a state in which a quantity of light is zero.

As shown in FIG. 14, in the aperture member 41, the quantity of light becomes zero when $\Delta V/2r$ is $-0.1$ ($\Delta V/2r=-0.1$). FIG. 25A is a diagram illustrating a state when the quantity of light is zero. In this state, the whole of the imaging light is shielded by the light-shielding part 41$a$ as shown in FIG. 25A. Consequently, in this case, since there is no light flux that passes through the pupil 29 of the objective lens, it is not possible to measure the amount of tilt.

In order to enable to measure of the amount of tilt on a minus side of $\Delta V/2r=-0.1$, it is necessary that a state in which imaging light $L_{SP3}$ is emerged from the aperture member 41 is realized even on the minus side of $\Delta V/2r=-0.1$.

Figure 25B:
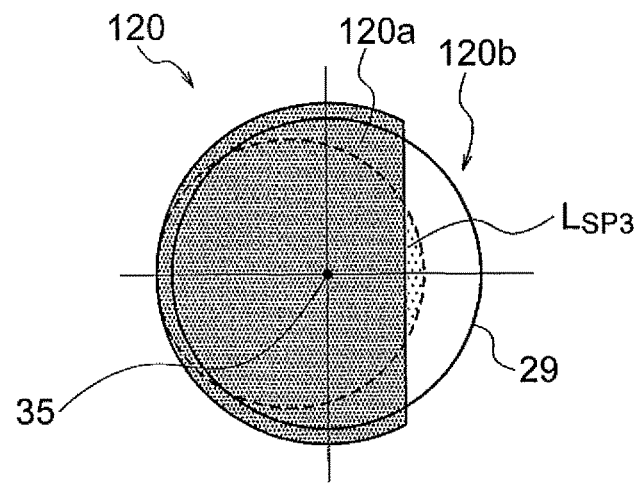
FIG. 25B is a diagram illustrating a state in which an aperture member is replaced.

As a method for realizing the state in which imaging light $L_{SP3}$ emerges from the aperture member 41, a method of changing the size of the light-shielding part or the size of the transmission part is available. For changing the size of the light-shielding part or the size of the transmission part, the aperture member may be replaced. FIG. 25B is a diagram illustrating a state in which the aperture member is replaced.

An aperture member 120 has a light-shielding part 120$a$ and a transmission part 120$b$. A size of the light-shielding part 120$a$ is smaller than a size of the light-shielding part 41$a$. In other words, a size of the transmission part 120$b$ is larger than a size of the transmission part 41$b$.

Then, the aperture member 41 is to be replaced with the aperture member 120, without replacing the objective lens. By making such arrangement, imaging light $L_{SP3}$ reaches the transmission part 120b. In other words, a state in which imaging light $L_{SP3}$ emerges from the aperture member 120 is realized. As a result, it is possible to widen a range in which the amount of tilt can be measured.

The aperture member 41 is disposed at the pupil position of the objective lens. In a case in which the pupil of the objective lens is positioned at the interior of the objective lens, the aperture member 41 is also disposed at the interior of the objective lens. Even in such state, the replacement may be carried out when it is possible to replace the aperture member 41 with the aperture member 120. In a case in which it is difficult to replace the aperture member 41 with the aperture member 120, the replacement of the aperture member 41 and the aperture member 120 may be carried out at the position of the conjugate image of the pupil of the objective lens.

Figure 25C:
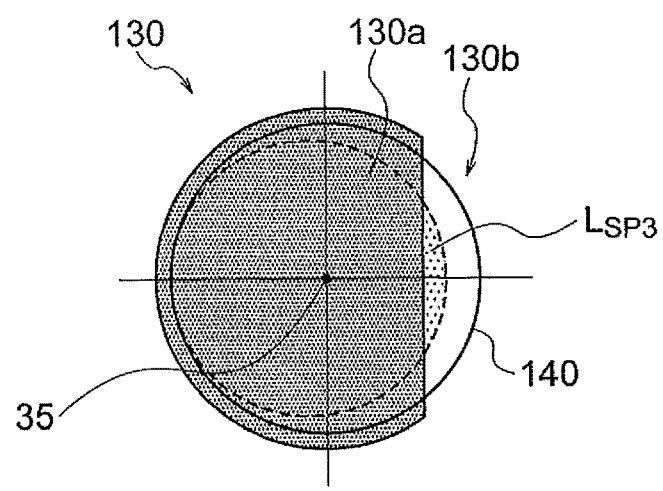
FIG. 25C is a diagram illustrating a state in which an objective lens is replaced.

Another method for realizing the state in which imaging light $L_{SP3}$ emerges from the aperture member 41, a method of changing the numerical aperture on the sample side of the objective lens is available. For changing the numerical aperture on the sample side of the objective lens, the objective lens may be replaced. FIG. 25C is a diagram illustrating a state in which the objective lens is replaced.

Let an objective lens A to be the objective lens having the aperture member 41, and an objective lens B to be an objective lens having an aperture member 130. The numerical aperture on the sample side differs for the objective lens A and the objective lens B.

The aperture member 130 has a light-shielding part 130a and a transmission part 130b. A size of the light-shielding part 130a differs from a size of the light-shielding part 41a. In other words, a size of the transmission part 130b differs from a size of the transmission part 41b.

As mentioned above, the numerical aperture on the sample side differs for the objective lens A and the objective lens B. Consequently, a diameter of a pupil 140 of the objective lens A differs from a diameter of the pupil 29 of the objective lens B. Moreover, a size of the imaging light at a pupil position of the objective lens also differs for the objective lens A and the objective lens B.

Therefore, by replacing the objective lens A with the objective lens B, imaging light $L_{SP3}$ reaches the transmission part 130b. In other words, a state in which imaging light $L_{SP3}$ emerges from the aperture member 130 is realized. As a result, it is possible to widen a range in which the amount of tilt can be measured.

In the sample shape measuring apparatus of the present embodiment, it is preferable that a change in a numerical aperture on a sample side of the objective lens be carried out by one objective lens.

By making such arrangement, it is possible to measure smoothly samples having various amounts of tilt. For changing the numerical aperture on the sample side of the objective lens, a zoom objective lens may be used. In the zoom objective lens, an arrangement is to be made such that the numerical aperture on sample side varies according to a variation in magnification. Or, a liquid crystal may be disposed at the pupil position of the objective lens, and the numerical aperture on sample side of the objective lens may be changed by varying the transmitting region.

In the sample shape measuring apparatus of the present embodiment, it is preferable that a change in a numerical aperture on a sample side of the objective lens be carried out by switching a plurality of objective lenses.

By making such arrangement, it is possible to measure samples having various amounts of tilt. As the plurality of objective lenses, objective lenses with same magnification but different numerical aperture on sample side are available. When such plurality of objective lenses is used, by switching the objective lens, it is possible to change a range of measurement and a sensitivity of measurement without changing the magnification.

In the sample shape measuring apparatus of the present embodiment, it is preferable that a pupil magnification be a ratio of a diameter of a pupil in the illumination optical system and a diameter of a pupil in the observation optical system, a variation in the pupil magnification occur according to a sample, and a step of correcting an error which occurs due to the variation in the pupil magnification be provided.

Figure 26:
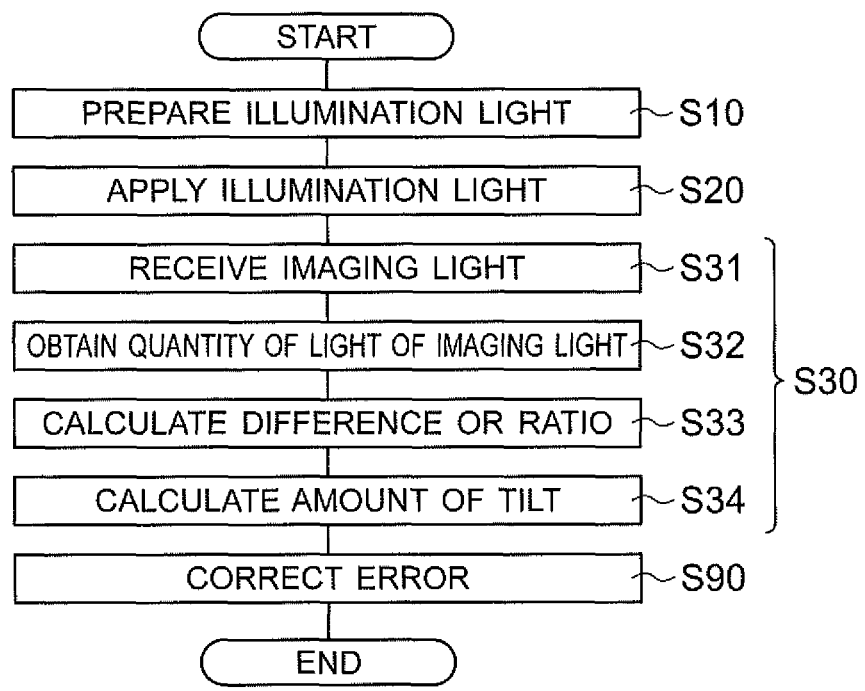
FIG. 26 is a flowchart of a measuring method of the present embodiment.

FIG. 26 is a flowchart of a measuring method of the present embodiment. Same reference numerals are assigned to steps that are same as in the flowchart in FIG. 8, and the description thereof is omitted. The sample shape measuring apparatus of the present embodiment has step S90 of correcting an error.

In the measuring method of the present embodiment, when step S34 is finished, step S90 is executed. Step S90 is a step of correcting the error which occurs due to the variation in the pupil magnification. The pupil magnification is a ratio of a diameter of the pupil in the illumination optical system and a diameter of a pupil in the observation optical system. The variation in the pupil magnification occurs according to a sample.

Figure 27A:
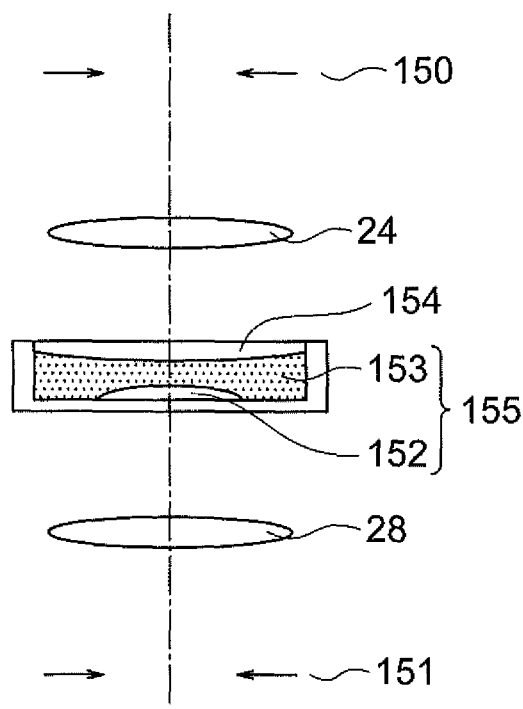
FIG. 27A is a diagram illustrating an optical system when an area of a holding part is small.

The description will be made by using an optical system of an inverted microscope. FIG. 27A is a diagram illustrating an optical system in a case in which an area of a holding part is small. Here, the description will be made by replacing the illumination optical system with the condenser lens 24 and by replacing the observation optical system with the objective lens 28. A pupil 150 of the condenser lens and a pupil 151 of the objective lens are conjugate. The pupil magnification is determined by a ratio of a diameter of the pupil 150 and a diameter of the pupil 151.

As mentioned above, in an observation of a cell 152, the observation is carried out in a state in which the cell 152 is held by a holding part 154 in a liquid 153 such as a culture solution or a preservative solution. In a case in which an area of the holding part 154 is large, a liquid surface of the liquid 153 becomes flat. In this case, a sample part 155 can be deemed as a plane parallel plate. Accordingly, in the case in which the area of the holding part 154 is large, a state in which a plane parallel plate is disposed between the condenser lens 45 and the objective lens 28 is assumed.

Here, the condenser lens 24 and the objective lens 28 are deemed as thin lenses. If so, a magnification of an optical system composed of the condenser lens 24 and the objective lens 28 is expressed by the ratio of the diameter of the pupil 150 and the diameter of the pupil 151. Therefore, a pupil magnification $\beta_p$ is expressed by the following expression (A):

$$\beta_p = f_{ob}/f_c \tag{A}$$

where, $f_{ob}$ denotes a focal length of the objective lens, and
$f_c$ denotes a focal length of the condenser lens.

Figure 27B:
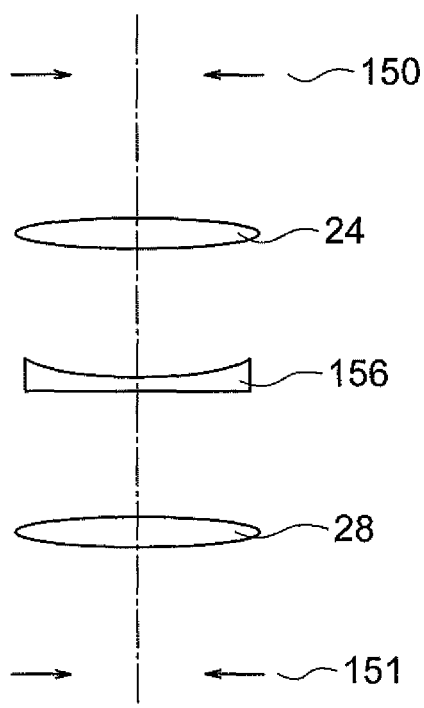
FIG. 27B is a diagram illustrating an optical system when a sample part is replaced with a planoconcave lens.

On the other hand, in a case in which the area of the holding part 154 is small, a liquid surface of the liquid 153 on the condenser lens 24 side becomes a concave surface. In this case, the sample part 155 can be deemed as a planoconcave lens. FIG. 27B is a diagram illustrating an optical system when the sample part is replaced with the planoconcave lens. As shown in FIG. 27B, in the case in which the area of the holding part 154 is small, it becomes a state such that planoconcave lens 156 is disposed between the condenser lens 24 and the objective lens 28.

A focal length of the planoconcave lens 156 is determined by a radius of curvature at a concave surface of the liquid 153 and a refractive index of the liquid 153. Moreover, since the liquid 153 has an affinity for water similar to water, the smaller the area of the holding part 154 is, the smaller the radius of curvature of the concave surface is. Consequently, in a microwell plate having a plurality of the holding parts 154, the radius of curvature of the concave surface is extremely small.

A combined focal length $f_{len\text{-}ob}$ of the objective lens 28 and the planoconcave lens 156 is expressed by the following expression (B):

$$f_{len\text{-}ob} = (f_{len} \times f_{ob})/(f_{len} + f_{ob} - d) \quad (B)$$

where,
$f_{len}$ denotes a focal length of the planoconcave lens,
$f_{ob}$ denotes a focal length of the objective lens, and
d denotes a distance between the objective lens and the planoconcave lens.

In an optical system shown in FIG. 27B, a magnification of an optical system composed of the condenser lens 24, the planoconcave lens 156, and the objective lens 28 represents the ratio of the diameter of the pupil 150 and the diameter of the pupil 151. Accordingly, a pupil magnification $\beta_{p'}$ is expressed by the following expression (C):

$$\begin{aligned}
\beta_{p'} &= f_{len\text{-}ob}/f_c \quad (C)\\
&= \{(f_{len} \times f_{ob})/(f_{len} + f_{ob} - d)\}/f_c\\
&= (f_{len} \times f_{ob})/(f_c \times (f_{len} + f_{ob} - d))\\
&= (\beta_p \times f_{len})/(f_{len} + f_{ob} - d)\\
&= \beta_p/(1 + (f_{ob} - d)/f_{len})
\end{aligned}$$

As mentioned above, since the objective lens 28 and the planoconcave lens 156 are deemed as thin lenses, a thickness of lenses is negligible. If so, the distance d becomes a distance between a principal point of the objective lens 28 and a principal point of the planoconcave lens 156. In a normal observation, since a side of closer to the objective lens 28 than the concave surface of the liquid 153 is observed, $f_{ob} < d$ holds. Moreover, since the concave surface of the liquid 153 has a negative refractive power, $f_{len} < 0$ holds. That is, $((f_{ob} - d)/f_{len}) > 0$ holds.

When this is substituted in expression (C), the pupil magnification $\beta_p{}'$ as shown in the following expression, becomes smaller as compared to the pupil magnification $\beta_p$:

$$\beta_p{}' = \beta_p/(1 + (f_{ob} - d)/f_{len}) < \beta_p.$$

For instance, in the optical system of the inverted microscope, given $f_{ob} = 20$ mm, $f_{len} = -4$ mm, and $d = 21$ mm, the pupil magnification $\beta_p{}'$ becomes smaller as compared to the pupil magnification $\beta_p$ as follows:

$$\beta_p{}' = \beta_p/(1 + (f_{ob} - d)/f_{len}) = 0.80\beta_p.$$

In a case in which the sample part 155 can be deemed as a planoconcave lens, the pupil magnification varies even in an upright microscope. However, in an optical system of the upright microscope, the pupil magnification $\beta_p{}'$ becomes larger as compared to the pupil magnification $\beta_p$.

In this way, the variation in the pupil magnification occurs due to an effect of the negative refractive power of the planoconcave lens 156, or in other words, due to the sample. As the pupil magnification varies, the quantity of light of the imaging light that passes through the pupil 151 of the objective lens varies. Since this variation in quantity of light is not occurred due to the tilt in the surface of the sample, it becomes a measurement error.

To obtain the pupil magnification $\beta_p{}'$, as shown in expression (C), the focal length of the planoconcave lens 156 is necessary. As mentioned above, the focal length of the planoconcave lens 156 is determined by the radius of curvature at the concave surface of the liquid 153 and the refractive index of the liquid 153. Out of these, it is difficult to obtain the radius of curvature at the concave surface of the liquid 153. Consequently, it is not easy to obtain the focal length of the planoconcave lens 156. Therefore, it is difficult to obtain the pupil magnification $\beta_p{}'$ by using expression (C).

However, the pupil magnification $\beta_p{}'$ can be obtained by another method. For instance, information of the pupil of the objective lens can be obtained from a state in which no sample is present and a state in which culture solution alone is present. The information of the pupil of the objective lens can be obtained, for example, using a Bertrand lens. The state in which no sample is present is a state in which the sample part 155 itself is not there. The state in the culture solution is present is a state in which the liquid 153 alone is present in the sample part 155.

The light flux is a parallel light flux between the objective lens and the imaging lens. The Bertrand lens is disposed between the objective lens and the imaging lens. Accordingly, it is possible to form an image of the pupil of the objective lens at an image position formed by the objective lens and the imaging lens.

Figure 28A:
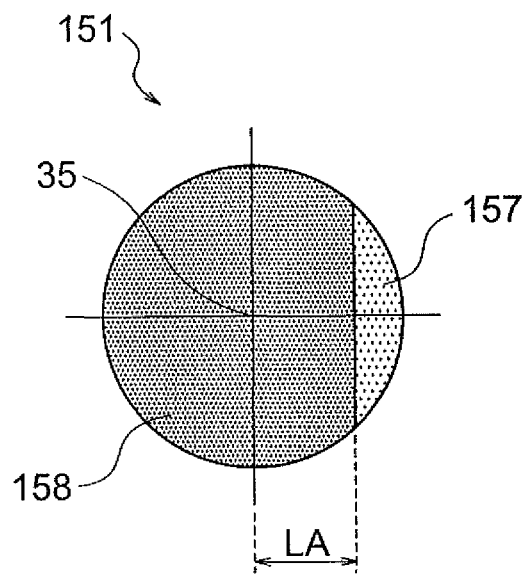
FIG. 28A is a diagram illustrating a state of a pupil of an objective lens and imaging light in a state in which no sample is present.
Figure 28B:
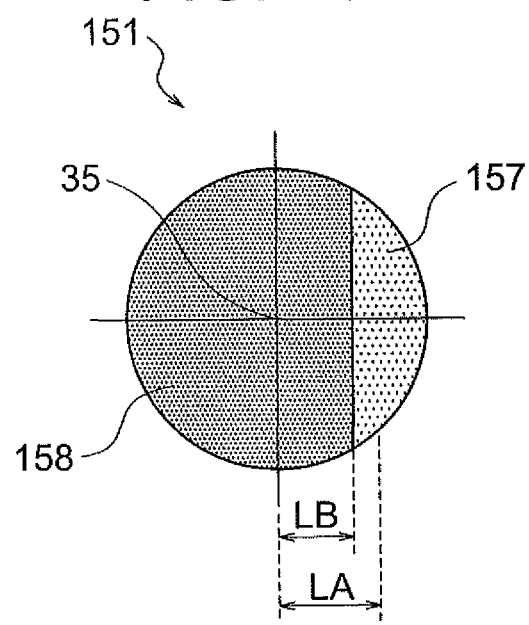
FIG. 28B is a diagram illustrating a state of a pupil of the objective lens and the imaging light in a state in which culture solution alone is present.

FIG. 28A is a diagram illustrating a state of a pupil of an objective lens and an imaging light in a state in which no sample is present. FIG. 28B is a diagram showing a state of the pupil of the objective lens and the imaging light in a state in which culture solution alone is present.

As can be understood from the comparison between FIG. 28A and FIG. 28B, a position of a boundary between a imaging light 157 and a light-shielding part 158 differs between the state in which no sample is present and the state in which culture solution alone is present. Then, by using the difference in position of the boundary, it is possible to obtain the pupil magnification $\beta_p{}'$.

In the state in which no sample is present, it is possible to obtain the pupil magnification $\beta_p$ by expression (A). It is possible to easily obtain the focal length of the condenser lens and the focal length of the objective lens. Therefore, it is possible to easily obtain the pupil magnification $\beta_p$.

On the other hand, in the state in which the culture solution alone is present, it is possible to obtain the pupil magnification $\beta_p{}'$ by the following expression (D):

$$B_p{}' = LB/LA \times \beta_p \quad (D)$$

where,
LA denotes a distance from the optical axis up to a predetermined boundary in the state in which no sample is present, and
LB denotes a distance from the optical axis up to the predetermined boundary in the state in which the culture solution alone is present, and here
the predetermined boundary is a boundary between the imaging light and the light-shielding part.

It is possible to easily obtain the pupil magnification $\beta_p'$, the distance LA and the distance LB. In this way, by using the Bertrand lens, it is possible to easily obtain the pupil magnification $\beta_p'$.

In the sample shape measuring apparatus of the present embodiment, it is preferable that the sample shape measuring apparatus have a holding member and a transparent plane parallel plate, and the holding member have a holding part which holds a liquid, and the transparent plane parallel plate be disposed in contact with a liquid surface of the liquid.

A sample is held by the holding member. In a case in which the sample is a living cell, the sample is held together with the liquid by the holding member. In this case, in order to hold the liquid, the holding member has a holding part.

Figure 29A:
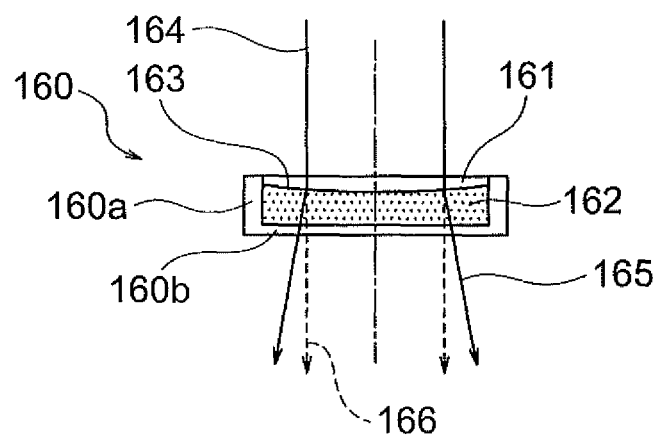
FIG. 29A is a diagram illustrating a state of a liquid when a plane parallel plate is not disposed.
Figure 29B:
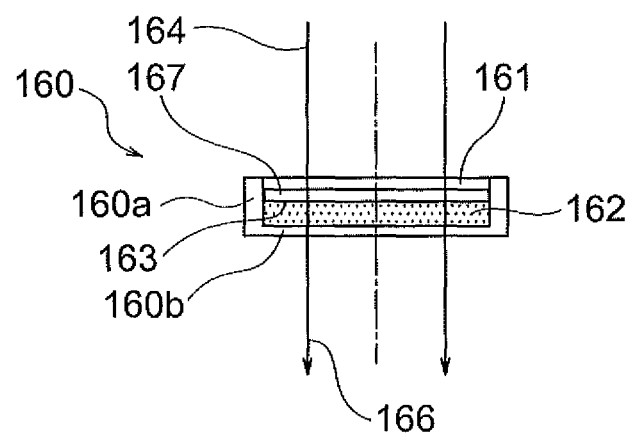
FIG. 29B is a diagram illustrating a state of a liquid when a plane parallel plate is disposed.

FIG. 29A is a diagram illustrating a state of a liquid when a plane parallel plate is not disposed. FIG. 29B is a diagram illustrating a state of a liquid when a plane parallel plate is disposed.

As shown in FIG. 29A, a holding member 160 has a holding part 161. The holding part 161 is a space surrounded by a transparent side surface 160a and a transparent bottom surface 160b. A liquid 162 is held in the holding part 161.

As an area of the holding part 161 becomes small, as shown in FIG. 29A, a liquid surface 163 becomes a concave surface. In this case, the liquid 162 acts as a negative lens. Consequently, a parallel light flux 164 incident on the liquid 162 becomes a divergent light flux 165 and is emerged from the bottom surface 160b, as shown by solid lines.

Whereas, as the area of the holding part 161 becomes large, the liquid surface 163 becomes a flat surface (not shown in the diagram). In this case, since the liquid 162 can be deemed as a plane parallel plate, an effect as a lens does not occur in the liquid 162. Consequently, the parallel light flux 164 incident on the liquid 162 becomes a parallel light flux 166 and is emerged from the bottom surface 160b, as shown by dashed lines.

Apart of the light flux emerged from the bottom surface 160b corresponds to an area of a light flux transmission region. In a case in which the light flux emerged from the bottom surface 160b is the parallel light flux 166, the area of the light flux transmission region becomes a region of the imaging light 157 shown in FIG. 28A. In a case in which the light flux emerged from the bottom surface 160b is the divergent light flux 165, the area of the light flux transmission region becomes a region of the imaging light 157 shown in FIG. 28B.

A shape of the light flux emerging from the bottom surface 160 varies in accordance with the amount of tilt in the surface of the sample. However, as mentioned above, even in a case in which no sample is present, the shape of the light flux emerging from the bottom surface 160b is not same all the time, and may vary according to the shape of the liquid surface 163. Moreover, as mentioned above, a part of the light emerged from the bottom surface 160b corresponds to an area of the light flux transmission region. Consequently, even the area of the light flux transmission region may vary according to the shape of the liquid surface 163.

As mentioned above, the area of the light flux transmission region indicates the amount of tilt in the surface of the sample. Accordingly, even when the amount of tilt in the surface of the sample is the same, a measurement result differs, for example, between a case in which the shape of the liquid surface 163 is a flat shape and a case in which the shape of the liquid surface 163 is a concave shape. In other words, there is a possibility that an error occurs in the measurement result according to the shape of the liquid surface 163.

Then, as shown in FIG. 29B, the transparent plane parallel plate 167 is disposed in contact with the liquid surface 163 of the liquid 162. By making such arrangement, a shape of the liquid surface 163 which was a concave surface becomes a flat surface. As a result, as shown by the solid lines, even in a case in which no sample is present, the parallel light flux 164 incident on the liquid 162 is emerged from the bottom surface 160b becoming the parallel light flux 166 all the time. In other words, no error occurs due to the shape of the liquid surface 163.

In calculation of the amount of tilt, as will be described later, a lookup table including the quantity of light and the amount of tilt as parameters or an expression including the quantity of light and the amount of tilt as parameters is used. In the sample shape measuring apparatus of the present embodiment, since an error is not caused by the shape of the liquid surface 163, it is unnecessary to consider the effect of the shape of the liquid surface 163 even when a lookup table is used or when an expression is used.

In the sample shape measuring apparatus of the present embodiment, it is preferable that a light intensity of illumination light which passes through the transmission part differ at a center and at a periphery.

As mentioned above, the imaging light reaches the transmission part. However, when no sample is present, the illumination light reaches the transmission part. Here, the description is made assuming that no sample is present.

In a case in which the light intensity of illumination light which passes through the transmission part differs at the center and at the periphery, the light intensity of the illumination light which reaches the aperture member differs at the center and at the periphery.

In a large number of light sources, the light intensity emitted from the light source differs at the center and at the periphery. Light emitted from the light source is converted to illumination light having a desired light flux diameter by an illumination optical system. By making an arrangement such that the light intensity of the illumination light reaching the aperture member differs at the center and at the periphery, it is possible to arrange the illumination optical system essentially by lenses only. As a result, it is possible to prepare the illumination light easily.

In such manner, by making an arrangement such that the light intensity of the illumination light passing through the transmission part differs at the center and at the periphery, it is possible to prepare the illumination light easily.

It is preferable that an intensity distribution of the illumination light that reaches the aperture member be distributed axisymmetrically.

By letting the intensity distribution of the illumination light reaching the aperture member to be axisymmetric, even in a case where the transmission part is positioned anywhere on a circumference, the intensity distribution of light passing through the transmission part is same. Consequently, even in the case where the transmission part is positioned anywhere on the circumference, the same measurement result is obtained. As a result, it is possible to measure quickly the amount of tilt of the sample with high repeatability. Moreover, as will be described later, by using the amount of tilt measured, it is possible to measure quickly the surface shape of the sample with high repeatability.

The axisymmetric light intensity distribution is a distribution which is obtained when the light intensity distribution at a cross-section including the optical axis is rotated around the optical axis as an axis of rotation. In this case, the intensity distribution in the illumination light passing through the transmission part becomes same, even in the case where the transmission part is positioned anywhere on the circumference. Accordingly, even in the case where the transmission part is positioned anywhere on the circumference, it is possible to obtain the same measurement result.

Moreover, in a case of calculating the amount of tilt in the surface of the sample using the abovementioned lookup table, it is possible to make the number of lookup tables one.

It is preferable that the light intensity of the illumination light which passes through the transmission part become smaller gradually from the center toward the periphery of the light flux.

Figure 30:
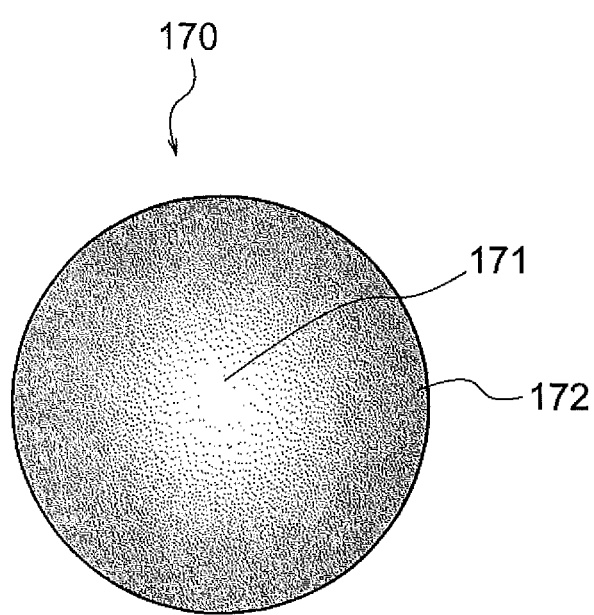
FIG. 30 is a diagram illustrating a light intensity distribution of illumination light that reaches the aperture member.

FIG. 30 is a diagram illustrating a light intensity distribution of illumination light that reaches the aperture member. Illumination light 170 is illumination light having a non-uniformly distributing light intensity. Directly before incidence on the aperture member, the shape of the illumination light 170 is circular.

In the illumination light 170, the light intensity differs between a center 171 of a light flux and a periphery 172 of the light flux. The light intensity in the center 171 is larger than the light intensity in the periphery 172. Moreover, the light intensity is smaller from the center 171 toward the periphery 172.

It is preferable that the light intensity of the illumination light reaching the aperture member become larger gradually from the center toward the periphery of the light flux.

Figure 31:
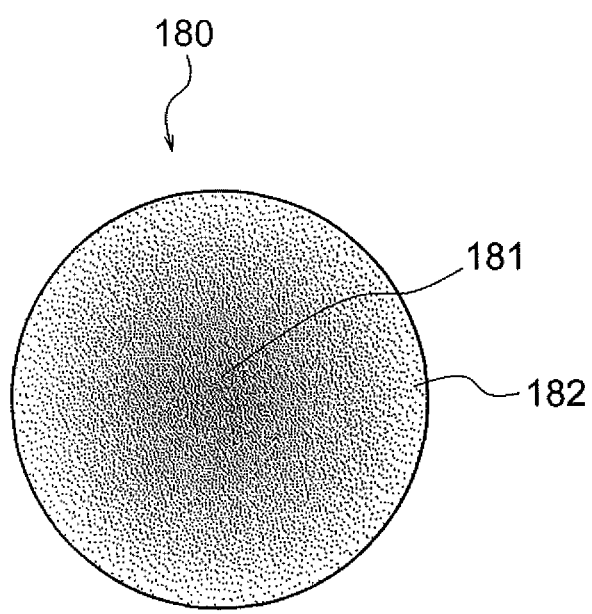
FIG. 31 is a diagram illustrating a light intensity distribution of illumination light that reaches the aperture member.

FIG. 31 is a diagram illustrating a light intensity distribution of illumination light that reaches the aperture member. Illumination light 180 is illumination light having a non-uniformly distributing light intensity. Directly before incidence on the aperture member, the shape of the illumination light 180 is circular.

In the illumination light 180, the light intensity differs between a center 181 of a light flux and a periphery 182 of the light flux. The light intensity in the center 181 is smaller than the light intensity in the periphery 182. In addition, the light intensity increases from the center 181 toward the periphery 182.

In the sample shape measuring apparatus of the present embodiment, it is preferable that the light intensity of the illumination light that passes through the transmission part be substantially same at all positions of the transmission part.

When such arrangement is made, by changing the shape of the transmission part, it is possible to change the range of measurement and the sensitivity of measurement. As a result, it is possible to measure samples having various amounts of tilt easily.

In the sample shape measuring apparatus of the present embodiment, it is preferable that in calculation of the amount of tilt, the amount of tilt be calculated based on a correspondence relation obtained in advance.

As mentioned above, in the sample shape measuring method of the present embodiment, the amount of tilt is calculated based on the quantity of light of the imaging light. Then, the relationship of the quantity of light of the imaging light and the amount of tilt is to be obtained in advance. By doing so, it is possible to calculate the amount of tilt promptly from the quantity of light of the imaging light that is obtained, based on the correspondence relation.

In the sample shape measuring apparatus of the present embodiment, it is preferable that the correspondence relation be represented by a lookup table including the quantity of light and the amount of tilt as parameters.

FIG. 32 is an example of the lookup table. As shown in FIG. 32, the lookup table has brightness and the inclination angle as parameters. The brightness indicates the quantity of light of the imaging light and the inclination angle indicates the amount of tilt in the surface of a sample.

For creating the lookup table, a refractive index of the sample is necessary. In a case in which the sample is a cell, various substances exist in the cell. Therefore, the refractive index of the cell as a whole is a refractive index obtained by averaging the refractive indices of these substances (hereinafter referred to as "average refractive index $n_{AVE}$ of a cell"). The average refractive index $n_{AVE}$ of a cell varies depending on the kinds of substances existing in the cell. Therefore, a value of the average refractive index $n_{AVE}$ of a cell is not restricted to one value.

Moreover, for example, in a case in which the sample is a cell, culture liquid or preservative solution may be present around the cell. Therefore, for creating the lookup table, a refractive index of the culture liquid or a refractive index of the preservative solution become necessary.

The lookup table shown in FIG. 32 is a lookup table in a case where the sample is a cell. In this lookup table, the table is created by setting the refractive index of the culture liquid or the refractive index of the preservative solution as 1.33. Moreover, three refractive indices (1.34, 1.35, and 1.36) are assumed for the average refractive index $n_{AVE}$ of the cell, and results obtained from the refractive indices are summarized in one table.

In step S33, the difference or the ratio between the quantity of light of the imaging light and the reference quantity of light is calculated. The calculated value represents the quantity of light of the imaging light. Then, the brightness in the lookup table is searched for the value matching the calculated value. If the value matching the calculated value is found, the inclination angle corresponding to the found value is obtained from the lookup table. Thus, it is possible to quickly obtain the amount of tilt in the surface of the sample.

On the other hand, the value matching the calculated value may not exist in the lookup table. In this case, two values closest to the calculated value are extracted from among the brightness in the lookup table. Then, the inclination angle is obtained using the extracted two values. Thus, it is possible to obtain the amount of tilt in the surface of the sample.

In the sample shape measuring apparatus of the present embodiment, it is preferable that the correspondence relation be represented by an expression including the quantity of light and the amount of tilt as parameters.

As described above, the area S of the imaging light transmitted through the objective lens and the inclination angle $\theta_s$ are represented by expressions (5) to (14). The area S represents the quantity of light of the imaging light, and the inclination angle $\theta_s$ represents amount of tilt in the surface of the sample.

In step S33, the difference or the ratio between the quantity of light of the imaging light and the reference quantity of light is calculated. The calculated value represents the quantity of light of the imaging light. Then, the inclination angle $\theta_s$ is obtained by substituting the calculated value into the area S. By doing this, it is possible to obtain the amount of tilt in the surface of the sample.

It is preferable that the sample shape measuring apparatus of the present embodiment further include a second light source, a scanning unit which scans a light spot on the sample, a pupil projection optical system, a light-ray separating unit, a confocal lens, a confocal pinhole, and a confocal detector. Light emitted from the second light source passes through the pupil projection optical system and the objective lens, and is incident on the sample. A part of the light from the sample passes through the objective lens, the pupil projection optical system, the scanning unit, the light-ray separating unit, and the confocal lens, a part of the light emerged from the confocal lens passes through the confocal pinhole, and the a confocal detector receives light that has emerged from the confocal pinhole.

Figure 33:
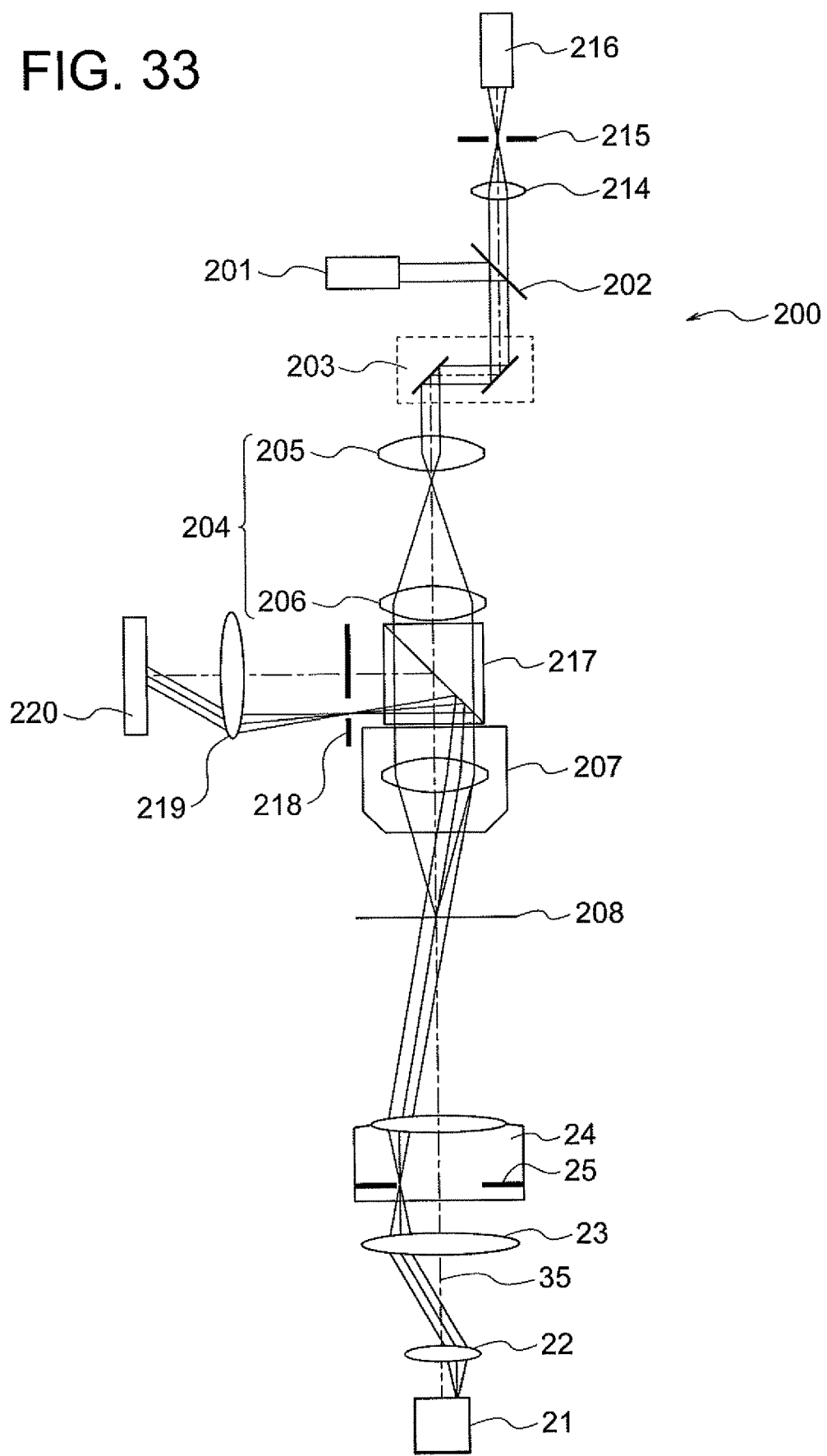
FIG. 33 is a diagram illustrating a structure of another sample shape measuring apparatus according to the present embodiment.

FIG. 33 is a diagram showing an arrangement of another sample shape measuring apparatus of the present embodiment. A sample shape measuring apparatus 200 includes a light source 201, a light-ray separating unit 202, a scanning unit 203, a pupil projection optical system 204, an objective lens 207, a confocal lens 214, a confocal pinhole 215, and a confocal detecting element 216.

Furthermore, the sample shape measuring apparatus 200 includes an aperture member 218, an imaging lens 219, and a detecting element 220. In the sample shape measuring apparatus 200, an arrangement in an optical path from the light source 21 up to the detecting element 220 is same as the arrangement in the sample shape measuring apparatus 20 shown in FIG. 9.

Therefore, according to the sample shape measuring apparatus 200, even for a sample in which the reflectance of the surface is low and the surface shape is smooth, it is possible to measure the amount of tilt in the surface of the sample with high accuracy. Furthermore, it is possible to measure the surface shape of the sample with high accuracy by using the measured amount of tilt.

Moreover, in the sample shape measuring apparatus 200, an optical path from the light source 201 up to the objective lens 207 is formed. The light source 201 is the second light source. Illumination light is emitted from the light source 201. A point light source such as laser is used for the light source 201. The light source itself need not be a point light source. It is possible to realize a point light source by combining a surface light source and a pinhole for example.

The illumination light emitted from the light source 201 is incident on the light-ray separating element 202. At the light-ray separating element 202, incident light (the illumination light) emerges upon being split as transmitted light and reflected light. As a method of splitting into two lights, splitting according to the light intensity, splitting according to a difference of a direction of polarization, and splitting according to a difference of wavelength are available.

Illumination light reflected at the light-ray separating element 202 is incident on the scanning unit 202. The scanning unit 203 includes two light deflecting elements. As light deflecting elements, a galvanometer scanner, a polygon scanner, and an acousto-optical deflection element are available.

Illumination light emerged from the scanning unit 203 is incident on the pupil projection optical system 204. The pupil projection optical system includes a lens 205 and a lens 206. Illumination light emerged from the pupil projection optical system 204 is incident on the objective lens 207. Illumination light emerged from the objective lens 207 is focused on a sample 208. A light spot is generated on the sample 208.

In the scanning unit 203, the light incident on the scanning unit 203 is deflected in two directions that are orthogonal. In other words, a scanning pattern is generated. Moreover, a pupil of the objective lens 207 and the scanning unit 203 are conjugate due to the pupil projection optical system 204.

Accordingly, the scanning pattern generated in the scanning unit 203 is projected on the pupil of the objective lens 207. Moreover, on the basis of the scanning pattern, the light spot moves on the sample 208.

In a case in which the sample 208 is stained with a fluorescent dye, fluorescent light is emitted from the sample 208 in addition to imaging light. A part of the fluorescent light emitted from the sample 208 is incident on the objective lens 207. The fluorescent light incident on the objective lens 207 passes through the pupil projection optical system 204, the scanning unit 203, and the light-ray separating element 202, and is incident on the confocal lens 214.

The fluorescent light is focused on the confocal pinhole 215 by the confocal lens 214. Fluorescent light passed through the confocal pinhole is incident on the confocal detecting element 216. Accordingly, a fluorescent image of the sample is obtained. The fluorescent image is an image with an extremely narrow focal depth, or is a so-called confocal image.

In the sample shape measuring apparatus 200, a light-ray separating element 217 is disposed between the scanning unit 203 and the objective lens 207. When the sample 208 is illuminated from a light source 21 side, imaging light from the sample 208 is incident on the light-separating element 217. A part of the imaging light incident on the light-ray separating element 217 is reflected at the light-ray separating element 217.

By focusing the reflected imaging light at the imaging lens 219, an optical image of the sample is formed. Moreover, since the detecting element 220 that receives an optical image is disposed, it is possible to acquire an image of the sample. In the sample shape measuring apparatus 200, the aperture member 218 is disposed at a pupil position of the objective lens 207. Accordingly, it is possible to measure an amount of tilt in the surface of the sample.

In such manner, according to the sample shape measuring apparatus of the present embodiment, acquisition of the confocal image and measurement of the amount of tilt in the surface of the sample are carried out. Moreover, by using the measured amount of tilt, it is possible to measure the surface shape of the sample with high accuracy. Accordingly, it is possible to carry out the acquisition of the confocal image, and the measurement of the amount of tilt and the measurement of the surface shape.

As mentioned above, in the sample shape measuring apparatus of the present embodiment, it is possible to carry out the measurement of the amount of tilt in the surface of the sample and the measurement of the surface shape of the sample. By using the measurement result, it is possible to calculate a volume of the sample and the number of cells in the sample.

Figure 34:
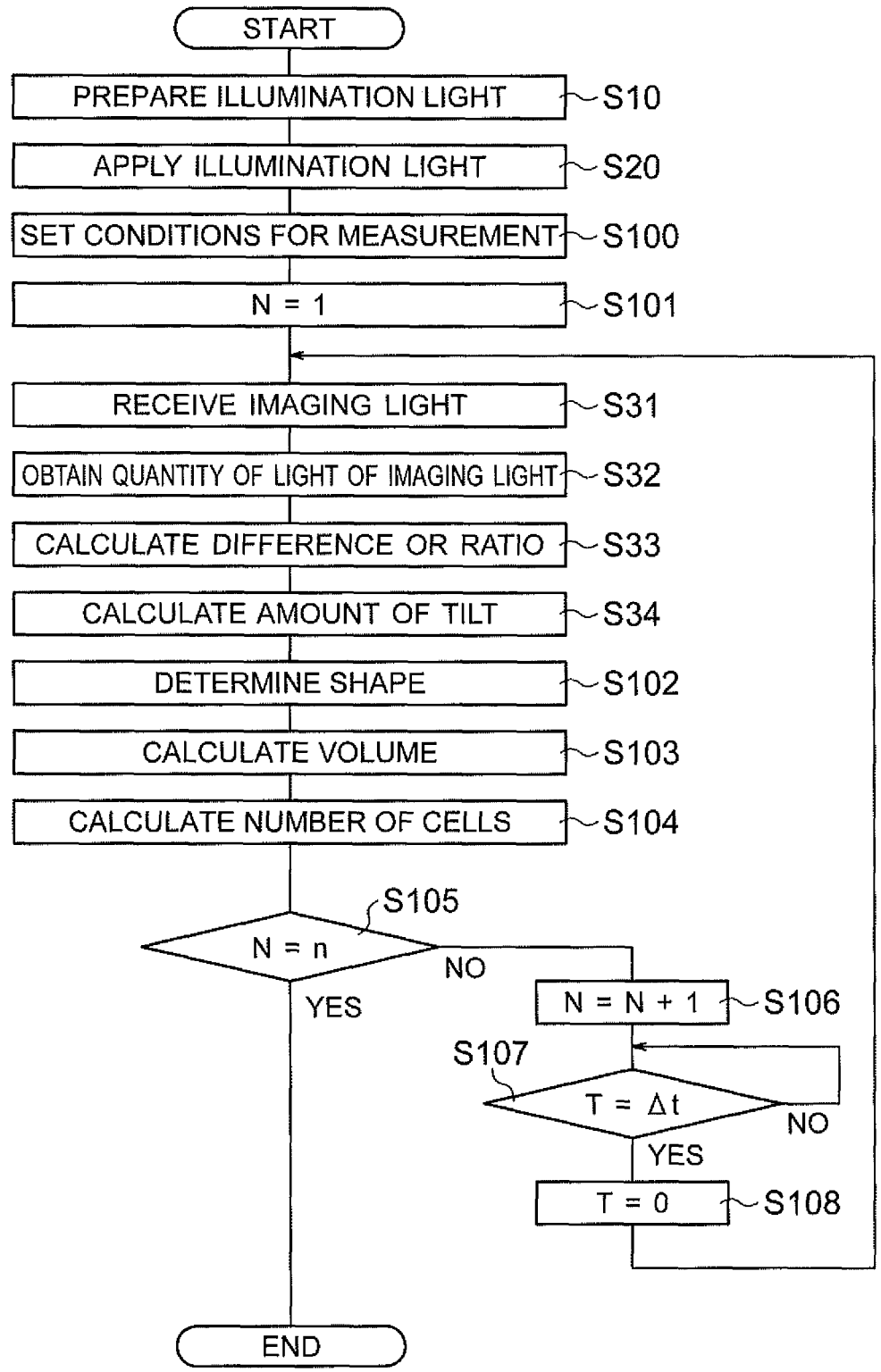
FIG. 34 is a flowchart of a method for calculating a volume and the number of cells of a sample.

FIG. 34 is a flowchart of a method for calculating the volume of the sample and the number of cells in the sample. In this method, steps shown in FIG. 8 are used. Description of steps same as in FIG. 8 is omitted.

In processing of calculating the volume of the sample and calculating the number of cells in the sample, step S100 of setting conditions for measurement, step S101 of initializing a value of a variable N, step S102 of determining the shape, step S103 of calculating the volume, step S104 of calculating the number of cells, step S105 of checking the number of times of the measurement, step S106 of increasing the value of the variable N, step S107 of checking an interval of measurement, and step S108 of initializing a value of a variable T are added to the steps in FIG. 8.

When step S20 is finished, step S100 is executed. Step S100 is a step of setting the conditions for measurement. In step S100, setting of the measurement interval Δt and a setting of the number of times n of the measurement are carried out.

When step S100 is finished, step S101 is executed. Step S101 is a step of initializing the value of the variable N. In step S101, the value of the variable N is set. The variable N is a variable which indicates the number of times for which the measurement was carried out. As step S101 is finished, step S31 to step S34 are executed.

When step S34 is finished, step S102 is executed. Step S102 is a step of determining the shape. In step S102, determining the shape of the sample from the amount of tilt is carried out.

When step S102 is finished, step S103 is executed. Step S103 is a step of calculating the volume. In step S103, calculation of the volume is carried out from the shape of the sample. In the calculation of the volume, the shape of the sample may be integrated for example.

When step S103 is finished, step S104 is executed. Step S104 is a step of calculating the number of cells. In step S104, calculation of the number of cells in the sample is carried out from the volume of the sample.

A colony is a cluster of a plurality of cells. In a case in which the sample is a colony, by assuming a volume of one cell, it is possible to calculate the number of cells in the sample from a ratio of the volume of the sample to the volume of one cell.

In a case in which a structure of a colony is a single-layer structure, the plurality of cells is distributed as a lens array for example. In lens array, when each lens is a convex lens, a height from a bottom surface becomes the maximum at an apex of the lens. Accordingly, it is possible to calculate the number of lenses from the number of lens apices.

Then, in a case in which the structure of the colony is a single-layer structure, a number which is the maximum height is calculated from an overall shape. By doing so, it is possible to calculate the number of cells in the sample.

When step S104 is finished, step S105 is executed. Step S105 is a step of checking the number of times of the measurement. In step S100, the number of times n of measurement is set. In step S105, a comparison of the value of the variable N and the number of times n is carried out.

In a case in which the value of the variable N and the number of times n of the measurement are equal, the measurement is carried out only for the number of times planned. Therefore, the measurement is finished.

In a case in which the value of the variable N and the number of times n of the measurement are not equal, the measurement is not carried out for the number of times planned. In this case, step S106 is executed. Step S106 is a step of increasing the value of the variable N. In step S106, 1 is added to the value of the variable N.

When step S106 is finished, step S107 is executed. Step S107 is a step of checking an interval of measurement. In step S107, a comparison of the value of the variable T and a measurement interval Δt is carried out. The variable T is a variable which indicates a time elapsed after the completion of the previous measurement.

In a case in which the value of the variable T and the measurement interval Δt are equal, only a time of an interval planned is elapsed. In this case, step S108 is executed. Step S108 is a step of initializing the value of the variable T. In step S108, 0 is set for the value of the variable T. When step S108 is finished, step S31 is executed.

In a case in which the value of the variable T and the measurement interval Δt are not equal, a time of the interval is not elapsed. In this case, step S107 is executed.

By step S107 being executed repeatedly, the time is elapsed. It is possible to measure the time by a processing apparatus. A value of the time measured by the processing apparatus is input all the time for the value of the variable T. Accordingly, by step S107 being executed repeatedly, the value of the variable T increases.

In a flowchart shown in FIG. 34, the measurement is carried out by the measurement interval Δt. It is possible to figure out how the volume of the sample varies and how the number of cells in the sample varies with the elapsing of time. It is possible to indicate these variations by a graph.

Figure 35:
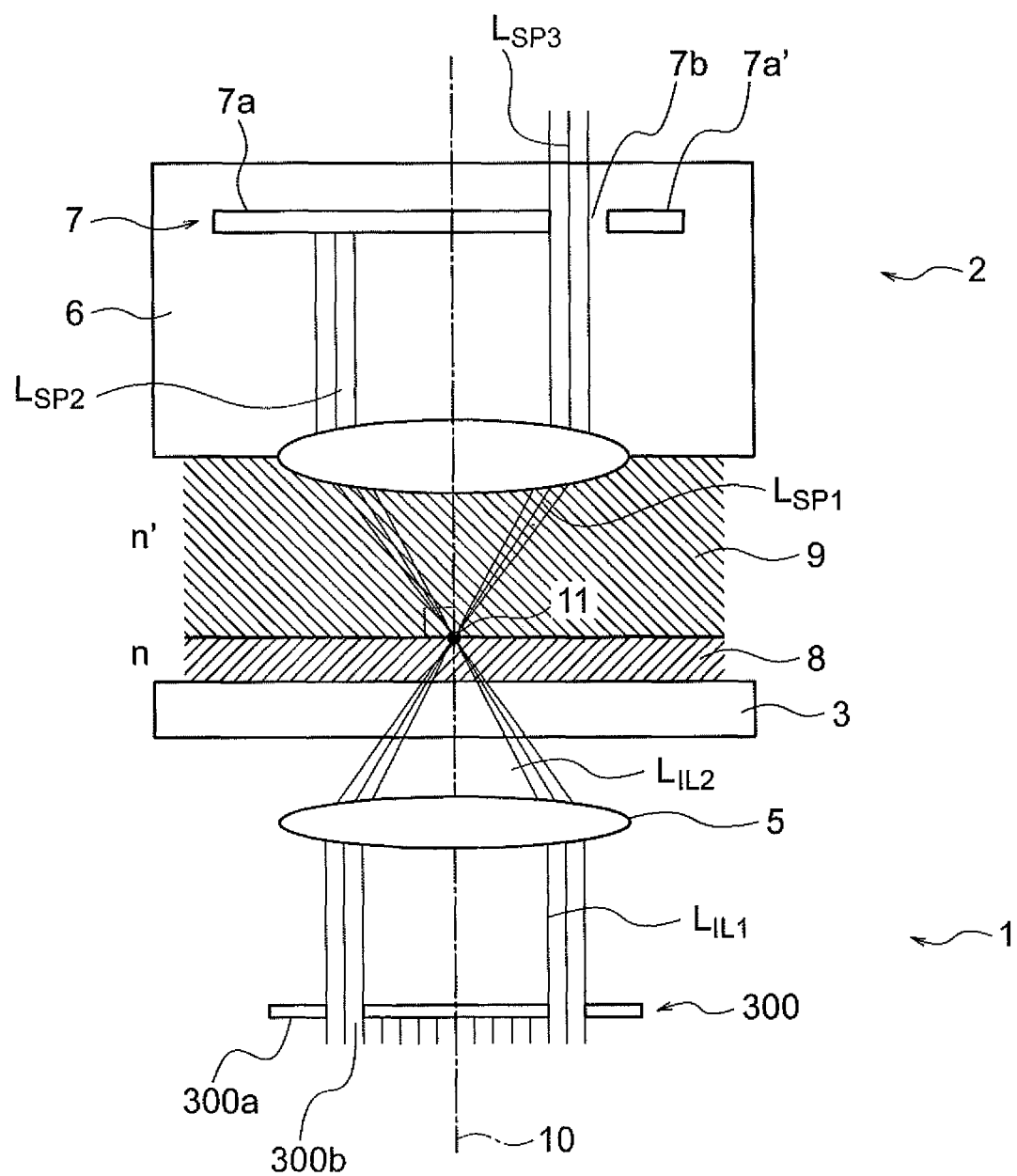
FIG. 35 is a diagram illustrating a stop of a modified example 1.
Figure 36:
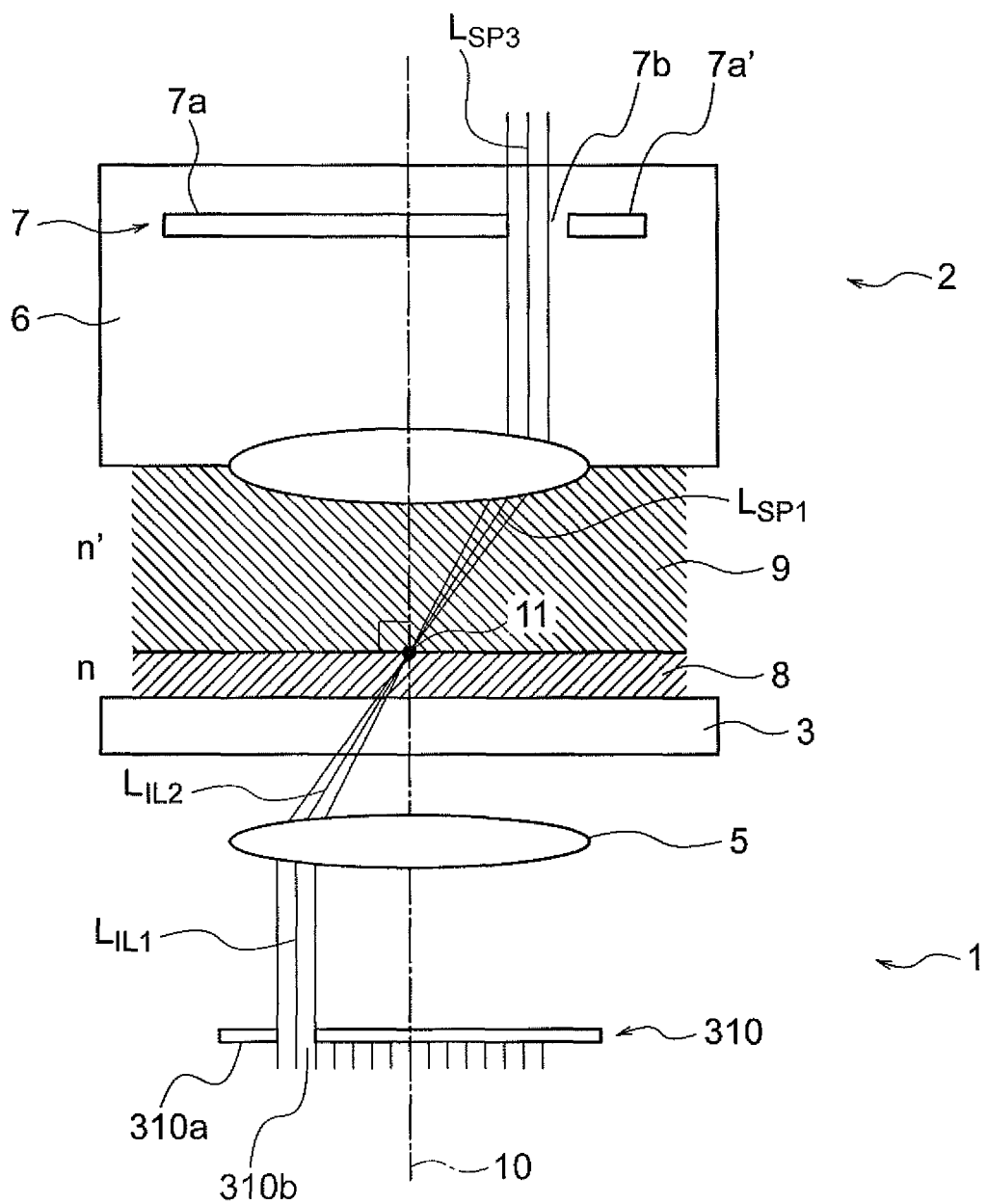
FIG. 36 is a diagram illustrating a stop of a modified example 2.

A stop disposed in an illumination optical system will be described below. FIG. 35 is diagram illustrating a stop of a modified example 1, and FIG. 36 is a diagram illustrating a stop of a modified example 2.

A stop 300 of the modified example 1 has a light-shielding part 300a and a transmission part 300b. A shape of the light-shielding part 300a is circular and a shape of the transmission part 300b is annular. In a state of being disposed in the illumination optical system 1, the light-shielding part 300a is positioned so as to include an optical axis.

A stop 310 of the modified example 2 has a light-shielding part 310a and a transmission part 310b. A shape of the transmission part 310b is arbitrary. In a state of being disposed in the illumination optical system 1, the light-shielding part 310a is positioned so as to include the optical axis.

Figure 37A:
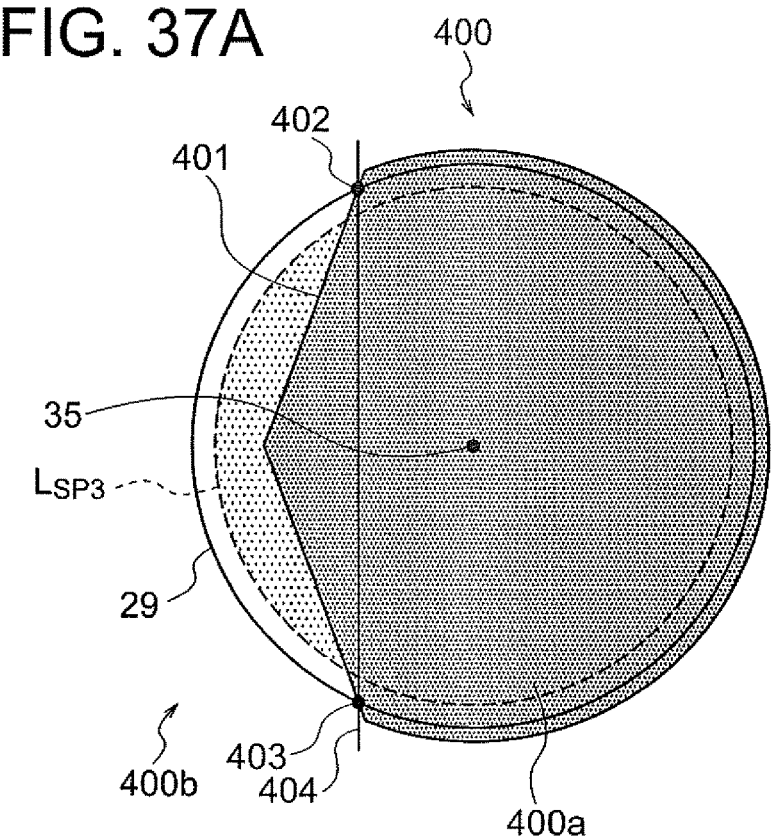
FIG. 37A is a diagram illustrating an aperture member of a modified example 1.

Modified examples of the aperture member will be described below. An aperture member of a modified example 1 is shown in FIG. 37A. An aperture member 400 of the modified example 1 is a modified example of the aperture member 60.

As shown in FIG. 37A, the aperture member 400 has a light-shielding part 400a and a transmission part 400b. In a case in which the aperture member 400 is inserted into the optical path of the observation optical system, the aperture member 400 is disposed such that the light-shielding part 400a includes the optical axis 35. The transmission part 400b is positioned at a location eccentric with respect to the optical axis 35.

A boundary line 401 is formed between the light-shielding part 400a and the transmission part 400b. The light-shielding part 400a and the transmission part 400b are separated by the boundary line 401.

When the pupil 29 of the objective lens is superimposed on the aperture member 400, the boundary line 401 and an outer edge of the pupil 29 of the objective lens cross at a point 402 and a point 403. The point 402 and the point 403 are the predetermined two points. A straight line 404 is a straight line running through the point 402 and the point 403.

The boundary line 401 includes two straight lines. The two straight lines are formed such that the boundary line 401 becomes convex from the light-shielding part 400a toward the transmission part 400b. Accordingly, in the aperture member 400, the straight line 404 is positioned between the boundary line 401 and the optical axis 35.

By using the aperture member 400, it is possible to measure a sample having even a larger amount of tilt of the surface.

Figure 37B:
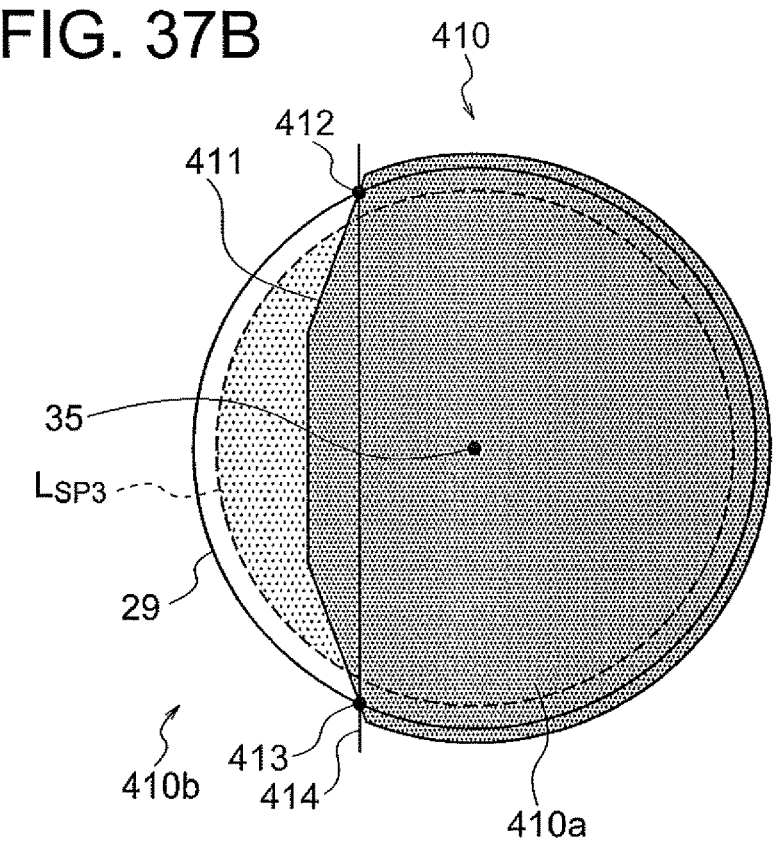
FIG. 37B is a diagram illustrating an aperture member of a modified example 2.

An aperture member of a modified example 2 is shown in FIG. 37B. An aperture member 410 of the modified example 2 is a modified example of the aperture member 60.

As shown in FIG. 37B, the aperture member 410 has a light-shielding part 410a and a transmission part 410b. In a case in which the aperture member 410 is inserted into an optical path of the observation optical system, the aperture member 410 is disposed such that the light-shielding part 410a includes the optical axis 35. The transmission part 410b is positioned at a location eccentric with respect to the optical axis 35.

A boundary line 411 is formed between the light-shielding part 410a and the transmission part 410b. The light-shielding part 410a and the transmission part 410b are separated by the boundary line 411.

When the pupil 29 of the objective lens is superimposed on the aperture member 410, the boundary line 411 and an outer edge of the pupil 29 of the objective lens cross at a point 412 and a point 413. The point 412 and the point 413 are the predetermined two points. A straight line 414 is a straight line running through the point 412 and the point 413.

The boundary line 411 includes three straight lines. The three straight lines are formed such that the boundary line 411 becomes convex from the light-shielding part 410a toward the transmission part 410b. Accordingly, in the aperture member 410, the straight line 414 is positioned between the boundary line 411 and the optical axis 35.

By using the aperture member 410, it is possible to measure a sample having even larger amount of tilt of the surface.

Figure 38A:
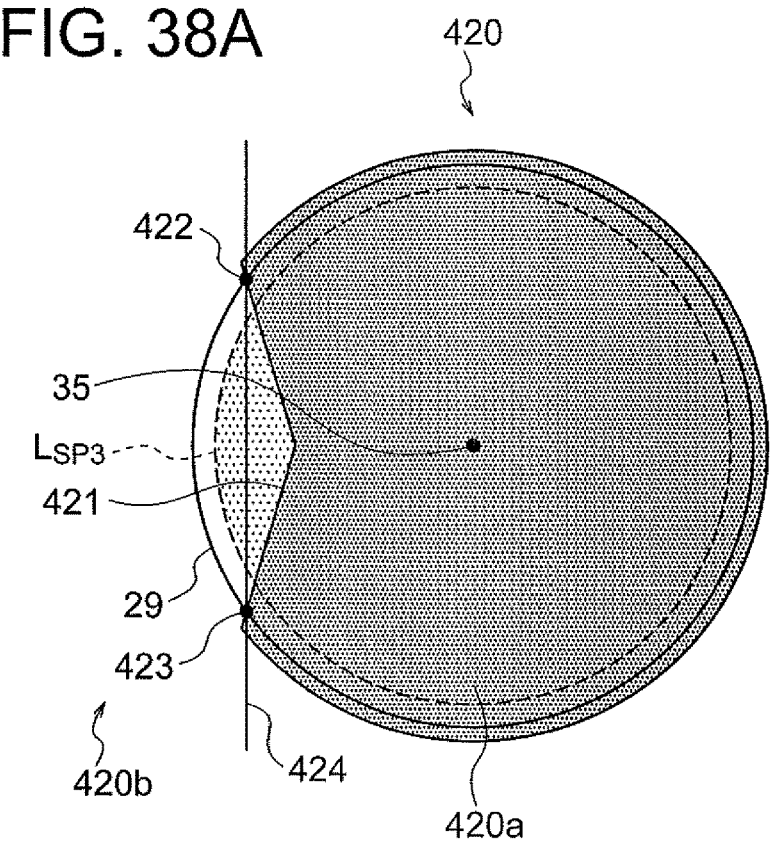
FIG. 38A is a diagram illustrating an aperture member of a modified example 3.

An aperture member of a modified example 3 is shown in FIG. 38A. An aperture member 420 of the modified example 3 is a modified example of the aperture member 70.

As shown in FIG. 38A, the aperture member 420 has a light-shielding part 420a and a transmission part 420b. In a case in which the aperture member 420 is inserted into the optical path of the observation optical system, the aperture member 420 is disposed such that the light-shielding part 420a includes the optical axis 35. The transmission part 420b is positioned at a location eccentric with respect to the optical axis 35.

A boundary line 421 is formed between the light-shielding part 420a and the transmission part 420b. The light-shielding part 420a and the transmission part 420b are separated by the boundary line 421.

When the pupil 29 of the objective lens is superimposed on the aperture member 420, the boundary line 421 and an outer edge of the pupil 29 of the objective lens cross at a point 422 and a point 423. The point 422 and the point 423 are the predetermined two points. A straight line 424 is a straight line running through the point 422 and the point 423.

The boundary line 421 includes two straight lines. The two straight lines are formed such that the boundary line 421 becomes concave from the light-shielding part 420a toward the transmission part 420b. Accordingly, in the aperture member 420, the boundary line 421 is positioned between the straight line 424 and the optical axis 35.

By using the aperture member 420, it is possible to measure a surface of a sample having even smaller amount of tilt.

Figure 38B:
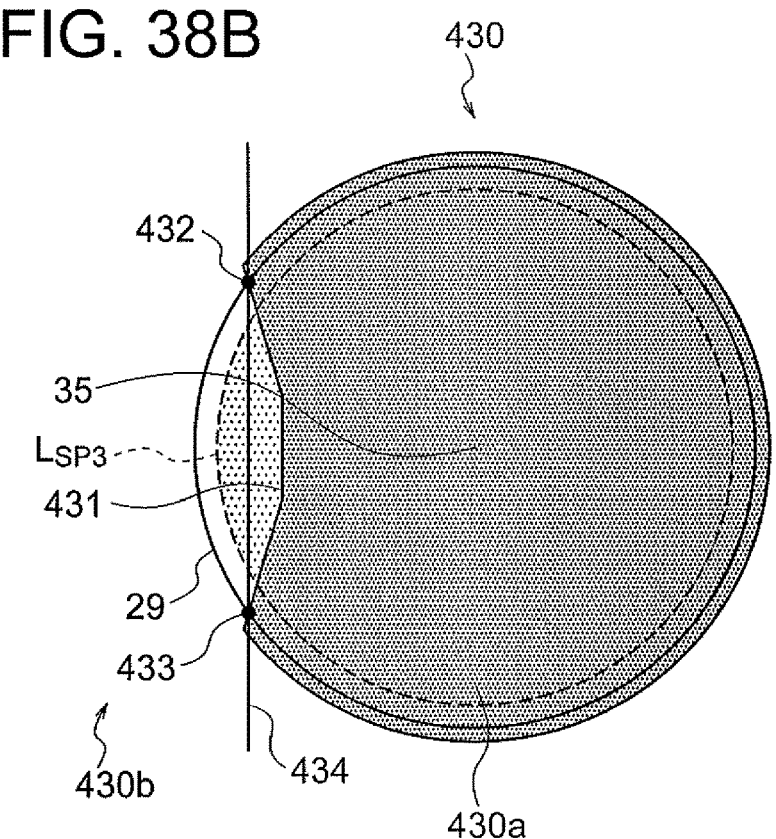
FIG. 38B is a diagram illustrating an aperture member of a modified example 4.

An aperture member of a modified example 4 is shown in FIG. 38B. An aperture member 430 of the modified example 4 is a modified example of the aperture member 70.

As shown in FIG. 38B, the aperture member 430 has a light-shielding part 430a and a transmission part 430b. In a case in which the aperture member 430 is inserted into the optical path of the observation optical system, the aperture member 430 is disposed such that the light-shielding part 430a includes the optical axis 35. The transmission part 430b is positioned at a location eccentric with respect to the optical axis 35.

A boundary line 431 is formed between the light-shielding part 430a and the transmission part 430b. The light-shielding part 430a and the transmission part 430b are separated by the boundary line 431.

When the pupil 29 of the objective lens is superimposed on the aperture member 430, the boundary line 431 and an outer edge of the pupil 29 of the objective lens cross at a point 432 and a point 433. The point 432 and the point 433 are the predetermined two points. A straight line 434 is a straight line running through the point 432 and the point 433.

The boundary line 431 includes three straight lines. The three straight lines are formed such that the boundary line 431 becomes concave from the light-shielding part 430a toward the transmission part 430b. Accordingly, in the aperture member 430, the boundary line 431 is positioned between the straight line 434 and the optical axis 35.

By using the aperture member 430, it is possible to measure a surface of a sample having even smaller amount of tilt.

According to the present embodiment, it is possible to provide a sample shape measuring method and a sample shape measuring apparatus which enable to measure an tilt of a sample surface and to measure a shape of the sample surface with high accuracy, even for a sample in which the reflectance of the surface is low and the surface shape is smooth.

As described heretofore, the present invention is suitable for a sample shape measuring method and a sample shape measuring apparatus which enable to measure an tilt of a sample surface and to determine a shape of the sample surface with high accuracy, even for a sample in which the reflectance of the surface is low and the surface shape is smooth.

What is claimed is:
1. A sample shape measuring apparatus, comprising:
an illumination optical system, an observation optical system, a detecting element, and a processor comprising hardware, wherein
the illumination optical system includes a light source and a condenser lens,
the observation optical system includes an objective lens, an aperture member, and an imaging lens,
a sample is disposed between the illumination optical system and the observation optical system, and
illumination light applied to the sample by the illumination optical system is transmitted through the sample,
light transmitted through the sample is incident on the observation optical system,
the detecting element receives light emerged from the observation optical system, and
the processor is configured to:
obtain a quantity of light based on the received light,
calculate at least one of a difference and a ratio between the quantity of light and a reference quantity of light,
calculate an amount of tilt at a surface of the sample based on at least one of the difference and the ratio, and
calculate a shape of the sample from the amount of tilt,
the aperture member has a first portion that shields light and a second portion that transmits light,
the first portion of the aperture member is provided at least at an optical axis of the objective lens,
the second portion of the aperture member is eccentric with respect to the optical axis, and is provided so as to include apart of an edge of an image of a pupil of the illumination optical system, and
the following conditional expression is satisfied:

$R0 < Rill \times \beta < R1$ where,
R0 denotes a length from the optical axis of the objective lens up to a predetermined position,
R1 denotes a length from the optical axis of the objective lens up to an outer edge of the second portion of the aperture member, and denotes a length on a line connecting the optical axis of the objective lens and the predetermined position, and
the predetermined position is a position at which a length from the optical axis of the objective lens is the minimum, from among positions on an inner edge of the first portion of the aperture member,
Rill denotes a radius of the pupil of the illumination optical system, and
β denotes a value obtained by dividing a focal length of the objective lens by a focal length of the condenser lens.

2. The sample shape measuring apparatus according to claim 1, wherein
the second portion of the aperture member is provided to include an entire edge of an image of a pupil of the illumination optical system.

3. The sample shape measuring apparatus according to claim 1, wherein
the aperture member has a boundary line dividing the first portion of the aperture member and the second portion of the aperture member, and
the boundary line is formed of a line parallel to one straight line orthogonal to the optical axis.

4. The sample shape measuring apparatus according to claim 1, wherein
the illumination optical system has a predetermined illumination region,
a surface light source is disposed or an image of the surface light source is formed on the predetermined illumination region, and
light emerged from the observation optical system is received.

5. The sample shape measuring apparatus according to claim 1, wherein illumination light which passes through the predetermined illumination region is a parallel light flux.

6. The sample shape measuring apparatus according to claim 1, wherein the aperture member is a first aperture member, the sample shape measuring apparatus further comprising:
a second aperture member, the first aperture member and the second aperture member being configured to be inserted into and removed from an optical path, wherein
the second aperture member has a third portion that shields light, the third portion being provided at least at an optical axis of the objective lens and a fourth portion that transmits light, the forth portion being provided at a position eccentric with respect to the optical axis, and
a direction connecting the optical axis and a center of gravity of the second portion of the first aperture member when the first aperture member is inserted into the optical path and a direction connecting the optical axis and a center of gravity of the fourth portion of the first aperture member when the second aperture member is inserted into the optical path intersect.

7. The sample shape measuring apparatus according to claim 1, wherein
the aperture member further has a third portion that transmits light when the aperture member is inserted into an optical path, a direction connecting the optical axis and a center of gravity of the second portion of the aperture member and a direction connecting the optical axis and a center of gravity of the third portion of the aperture member intersect.

8. The sample shape measuring apparatus according to claim 1, wherein
a direction connecting the optical axis and a center of gravity of the second portion of the aperture member is variable.

9. The sample shape measuring apparatus according to claim 1, wherein at least one of a size of the first portion of the aperture member and a numerical aperture on a sample side of the objective lens is variable.

10. The sample shape measuring apparatus according to claim 1, wherein a change in a numerical aperture on a sample side of the objective lens is carried out by one objective lens.

11. The sample shape measuring apparatus according to claim 1, wherein a change in a numerical aperture on a sample side of the objective lens is carried out by switching a plurality of objective lenses.

12. The sample shape measuring apparatus according to claim 1, wherein
a pupil magnification is a ratio of a diameter of a pupil in the illumination optical system and a diameter of a pupil in the observation optical system,
a variation in the pupil magnification occurs according to a sample, and
the processor is further configured to correct an error which occurs due to the variation in the pupil magnification.

13. The sample shape measuring apparatus according to claim 1, further comprising:
a holding member; and
a transparent plane parallel plate, wherein
the holding member has a holding part which holds a liquid, and
the transparent plane parallel plate is disposed in contact with a liquid surface of the liquid.

14. The sample shape measuring apparatus according to claim 1, wherein
a light intensity of illumination light which passes through the second portion of the aperture member differs at a center and at a periphery.

15. The sample shape measuring apparatus according to claim 1, wherein a light intensity of illumination light that passes through the second portion of the aperture member is substantially same at all positions of the second portion of the aperture member.

16. The sample shape measuring apparatus according to claim 1, wherein in calculation of the amount of tilt, the amount of tilt is calculated based on a correspondence relation obtained in advance.

17. The sample shape measuring apparatus according to claim 16, wherein the correspondence relation is represented by a lookup table including a quantity of light and an amount of tilt as parameters.

18. The sample shape measuring apparatus according to claim 16, wherein the correspondence relation is represented by an expression including a quantity of light and an amount of tilt as parameters.

19. The sample shape measuring apparatus according to claim 1, further comprising:
a second light source;
a scanning unit which scans a light spot on the sample;

a pupil projection optical system;
a light-ray separating unit;
a confocal lens;
a confocal pinhole; and
a confocal detector; wherein
light emitted from the second light source passes through the pupil projection optical system and the objective lens, and is incident on the sample,
a part of light from the sample passes through the objective lens, the pupil projection optical system, the scanning unit, the light-ray separating unit, and the confocal lens, and
a part of light emerged from the confocal lens passes through the confocal pinhole, and
the confocal detector receives light that has emerged from the confocal pinhole.

20. A sample shape measuring apparatus, comprising:
an illumination optical system, an observation optical system, a detecting element, and a processor comprising hardware, wherein
the illumination optical system includes a light source and a condenser lens,
the observation optical system includes an objective lens, an aperture member, and an imaging lens,
a sample is disposed between the illumination optical system and the observation optical system, and
illumination light applied to the sample by the illumination optical system is transmitted through the sample,
light transmitted through the sample is incident on the observation optical system,
the detecting element receives light emerged from the observation optical system, and
the processor is configured to:
obtain a quantity of light based on the received light,
calculate at least one of a difference and a ratio between the quantity of light and a reference quantity of light,
calculate an amount of tilt at a surface of the sample based on at least one of the difference and the ratio, and
calculate a shape of the sample from the amount of tilt,
the aperture member has a first portion that shields light and a second portion that transmits light,
the first portion of the aperture member is provided at least at an optical axis of the objective lens,
the second portion of the aperture member is eccentric with respect to the optical axis, and is provided so as to include a part of an edge of an image of a pupil of the illumination optical system,
the aperture member includes a boundary line dividing the first portion of the aperture member and the second portion of the aperture member,
a straight line connecting predetermined two points is located between the boundary line and the optical axis, and
the predetermined two points are two points at which a predetermined line and an outer edge of the pupil of the illumination optical system crosses when the pupil of the illumination optical system is superimposed on the aperture member.

21. A sample shape measuring apparatus, comprising:
an illumination optical system, an observation optical system, a detecting element, and a processor comprising hardware, wherein
the illumination optical system includes a light source and a condenser lens,
the observation optical system includes an objective lens, an aperture member, and an imaging lens,
a sample is disposed between the illumination optical system and the observation optical system, and
illumination light applied to the sample by the illumination optical system is transmitted through the sample,
light transmitted through the sample is incident on the observation optical system,
the detecting element receives light emerged from the observation optical system, and
the processor is configured to:
obtain a quantity of light based on the received light,
calculate at least one of a difference and a ratio between the quantity of light and a reference quantity of light,
calculate an amount of tilt at a surface of the sample based on at least one of the difference and the ratio, and
calculate a shape of the sample from the amount of tilt,
the aperture member has a first portion that shields light and a second portion that transmits light,
the first portion of the aperture member is provided at least at an optical axis of the objective lens,
the second portion of the aperture member is eccentric with respect to the optical axis, and is provided so as to include a part of an edge of an image of a pupil of the illumination optical system,
the aperture member includes a boundary line dividing the first portion of the aperture member and the second portion of the aperture member,
the boundary line is located between a straight line connecting predetermined two points and the optical axis, and
the predetermined two points are two points at which a predetermined line and an outer edge of the pupil of the illumination optical system crosses when the pupil of the illumination optical system is superimposed on the aperture member.

\* \* \* \* \*